(12) United States Patent
Takano et al.

(10) Patent No.: US 12,504,656 B2
(45) Date of Patent: Dec. 23, 2025

(54) OPTICAL WAVEGUIDE ELEMENT, OPTICAL WAVEGUIDE DEVICE, AND OPTICAL TRANSMISSION APPARATUS

(71) Applicants: SUMITOMO OSAKA CEMENT CO., LTD., Tokyo (JP); National Institute of Information and Communications Technology, Koganei (JP)

(72) Inventors: Shingo Takano, Tokyo (JP); Yu Kataoka, Tokyo (JP); Satoshi Oikawa, Tokyo (JP); Junichiro Ichikawa, Tokyo (JP); Yuya Yamaguchi, Tokyo (JP); Atsushi Kanno, Tokyo (JP); Naokatsu Yamamoto, Tokyo (JP); Tetsuya Kawanishi, Tokyo (JP)

(73) Assignees: SUMITOMO OSAKA CEMENT CO., LTD., Tokyo (JP); Naitonal Institute of Information and Communications Technology, Tokyo (JP)

( * ) Notice: Subject to any disclaimer, the term of this patent is extended or adjusted under 35 U.S.C. 154(b) by 220 days.

(21) Appl. No.: 18/250,622

(22) PCT Filed: Oct. 22, 2021

(86) PCT No.: PCT/JP2021/039130
§ 371 (c)(1),
(2) Date: Apr. 26, 2023

(87) PCT Pub. No.: WO2022/091980
PCT Pub. Date: May 5, 2022

(65) Prior Publication Data
US 2023/0400718 A1 Dec. 14, 2023

(30) Foreign Application Priority Data
Oct. 30, 2020 (JP) .................................. 2020-183025

(51) Int. Cl.
*G02F 1/035* (2006.01)
*G02F 1/01* (2006.01)

(52) U.S. Cl.
CPC ............ *G02F 1/035* (2013.01); *G02F 1/0102* (2013.01); *G02F 2201/02* (2013.01); *G02F 2201/18* (2013.01)

(58) Field of Classification Search
CPC .... G02F 1/035; G02F 1/0102; G02F 2201/02; G02F 2201/18; G02F 2201/127; G02F 1/0316; G02F 1/2255; G02F 1/212
See application file for complete search history.

(56) References Cited

U.S. PATENT DOCUMENTS

| 4,797,641 A | 1/1989 | Djupsjöbacka |
| 7,289,686 B2 | 10/2007 | Sugiyama et al. |
| (Continued) | | |

FOREIGN PATENT DOCUMENTS

| CN | 110441928 A | 11/2019 |
| JP | S61-252527 A | 11/1986 |
| (Continued) | | |

OTHER PUBLICATIONS

International Search Report, International Application No. PCT/JP2021/039130, Date of mailing: Dec. 21, 2021, 3 pages.

*Primary Examiner* — John Bedtelyon
(74) *Attorney, Agent, or Firm* — Rankin, Hill & Clark LLP

(57) ABSTRACT

An optical waveguide element includes a substrate, an optical waveguide disposed inside the substrate or on the substrate, and an electrode provided along the optical waveguide, working on the optical waveguide to generate a phase change in a light wave propagating through the optical waveguide. The electrode is a traveling-wave electrode. In a modulation section where the light wave is controlled by the electrode, the electrode and the optical waveguide are con- (Continued)

figured so that the phase change generated in a first modulation section located within a predetermined distance range from a downstream side end portion along a propagation direction of a traveling wave of an electrical signal propagating through the electrode has a sign opposite to a sign of the phase change generated in a second modulation section located within a predetermined distance range from an input end of the electrical signal on an upstream side along the propagation direction.

12 Claims, 29 Drawing Sheets

(56) References Cited

U.S. PATENT DOCUMENTS

| | | | |
|---|---|---|---|
| 11,003,043 B2* | 5/2021 | Ohmori | G02F 1/0316 |
| 2004/0061918 A1 | 4/2004 | Pruneri et al. | |
| 2020/0272021 A1 | 8/2020 | Hara et al. | |

FOREIGN PATENT DOCUMENTS

| | | |
|---|---|---|
| JP | H01-501974 A | 7/1989 |
| JP | H04-243217 A | 8/1992 |
| JP | H05-232417 A | 9/1993 |
| JP | 2005-284129 A | 10/2005 |
| JP | 2008-058436 A | 3/2008 |
| JP | 2017-111338 A | 6/2017 |
| JP | 2020-134876 A | 8/2020 |
| WO | 2017/022246 A1 | 2/2017 |

* cited by examiner

CROSS SECTION TAKEN ALONG LINE XVI-XVI

CROSS SECTION TAKEN ALONG LINE XVII-XVII

CROSS SECTION TAKEN ALONG LINE XIX-XIX

CROSS SECTION TAKEN ALONG LINE XX-XX

CROSS SECTION TAKEN ALONG LINE XXII-XXII

CROSS SECTION TAKEN ALONG LINE XXIII-XXIII

CROSS SECTION TAKEN ALONG LINE XXV-XXV

CROSS SECTION TAKEN ALONG LINE XXVI-XXVI

CROSS SECTION TAKEN ALONG LINE XXVIII-XXVIII

CROSS SECTION TAKEN ALONG LINE XXIX-XXIX

CROSS SECTION TAKEN ALONG LINE XVI-XVI

CROSS SECTION TAKEN ALONG LINE XVII-XVII

OPTICAL WAVEGUIDE ELEMENT, OPTICAL WAVEGUIDE DEVICE, AND OPTICAL TRANSMISSION APPARATUS

TECHNICAL FIELD

The present invention relates to an optical waveguide element that is a functional element using an optical waveguide, for example, such as an optical modulation element, an optical waveguide device, and an optical transmission apparatus using the optical waveguide element.

BACKGROUND ART

In a high-frequency/large-capacity optical fiber communication system, an optical transmission apparatus incorporating a waveguide-type optical modulator is often used. In the optical transmission apparatus, an optical modulation element using a lithium niobate ($LiNbO_3$) (hereinafter, also referred to as LN) crystal having an electro-optic effect as a substrate can realize broadband optical modulation characteristics illustrating less loss of light, compared to an optical modulation element using a semiconductor material such as indium phosphide (InP), silicon (Si), gallium arsenide (GaAs), or the like. Therefore, the optical modulation element using the LN is widely used in the high-frequency/large-capacity optical fiber communication system.

A modulation scheme in the optical fiber communication system accepts a trend of increasing transmission capacity in recent years. A multi-level modulation or a transmission format incorporating polarization multiplexing in the multi-level modulation, such as quadrature phase shift keying (QPSK), dual polarization-quadrature phase shift keying (DP-QPSK), and the like have been mainly used.

On the other hand, in recent years, accelerated spread of the Internet service has led to a further increase in communication traffic, and further reducing a size, widening a broadband, and reducing power consumption of the optical modulation element have been progressively studied so far.

From a viewpoint of the broadband, in an optical modulator for long-distance optical fiber communication, which is currently widely used, a traveling-wave electrode provided along an optical waveguide is used as a control electrode for controlling a light wave propagating inside the optical waveguide. The traveling-wave electrode includes a plurality of conductor patterns disposed to form a distributed constant line, and other end portion facing one end portion to which an electrical signal (modulation signal) is input is terminated with a predetermined impedance. In this manner, in the traveling-wave electrode, the electrical signal becomes a traveling wave, and propagates in one direction. The traveling wave generates an electric field inside the optical waveguide, thereby controlling the light wave propagating inside the optical waveguide.

Compared to a lumped-electrode (pad-type), this traveling-wave electrode has an advantage in that limitation of high frequency characteristics due to a time constant calculated from inductance and capacitance can be ignored.

On the other hand, in traveling-wave electrodes, when an electrical signal propagates inside a conductor pattern forming the traveling-wave electrode, the electrical signal may experience a non-negligible propagation loss. In addition, since this propagation loss depends on a frequency, an effective voltage that contributes to control of the light wave propagating inside the optical waveguide in signal voltages propagating as the traveling wave varies depending on the frequency of the electrical signal. In general, the propagation loss increases as the frequency of the electrical signal is higher. Therefore, in characteristic of the optical modulation element, a drive voltage increases as the frequency is higher. Therefore, as the frequency is higher, response sensitivity decreases, and an operation frequency band is limited.

As a technique for flattening frequency response characteristics of the optical modulation element including the optical waveguide formed on a substrate, in the related art, a technique is known in which flattening means for adjusting a polarization direction of the substrate is provided in a portion of a modulation section where the light wave inside the optical waveguide is controlled by a control electrode (refer to Patent Literature No. 1) In the optical modulation element, the frequency response characteristics are flattened in such a manner that the polarization direction of the flattening means is adjusted as described above and an induced phase amount generated in the modulation section by the control electrode is reduced in the flattening means.

In the optical modulation element in the related art, the frequency response characteristics are flattened by a simple configuration. Therefore, the optical modulation element in the related art can be advantageous in terms of facilitated manufacturing or costs. For example, the polarization direction can be easily adjusted by inserting the modulation section of the substrate between two parallel plate electrodes that generate a high electric field.

However, in the related art, depending on the intended polarization direction, it is necessary to greatly tilt the substrate with respect to the high electric field. For example, in a case of an X-cut substrate including lithium niobate (LN) crystal, a direction of polarization adjustment in the flattening means can be close to a direction parallel to a substrate surface. In this case, in order to secure a sufficient space for inserting the tilted substrate between the parallel plate electrodes, it is necessary to widen a separation distance between the parallel plate electrodes in accordance with a plane size of the substrate.

As a result, it is necessary to apply a higher voltage to the parallel plate electrodes. Accordingly, a manufacturing apparatus needs to increase in size. In some cases, this may be a disadvantage in terms of manufacturing costs. Therefore, in the related art, the polarization direction which can be realized at a desired cost is limited, and thus, designing the flattening means may be restricted. That is, the related art has room for improvement in a viewpoint of a degree of freedom in designing the flattening means.

CITATION LIST

Patent Literature

[Patent Literature No. 1] Japanese Laid-open Patent Application No. 2005-284129

SUMMARY OF INVENTION

Technical Problem

In view of the background, in the optical waveguide element using the optical waveguide formed on the substrate, it is desired to realize a technique capable of easily improving frequency characteristics at low cost even in the substrate having various crystal orientations.

Solution to Problem

According to an aspect of the present invention, there is provided an optical waveguide element including an optical waveguide disposed inside the substrate or on the substrate, and an electrode provided along the optical waveguide and working on the optical waveguide to generate a phase change in a light wave propagating through the optical waveguide. The electrode is a traveling-wave electrode. In a modulation section where the light wave is controlled by the electrode, the electrode and the optical waveguide are configured so that the phase change generated in a first modulation section located within a predetermined distance range from a downstream side end portion along a propagation direction of a traveling wave of an electrical signal propagating through the electrode has a sign opposite to a sign of the phase change generated in a second modulation section located within a predetermined distance range from an input end of the electrical signal on an upstream side along the propagation direction.

According to another aspect of the present invention, wherein a length of apart of the electrode that work on the optical waveguide in the first modulation section is shorter than a length of a part of the electrode that work on the optical waveguide in the second modulation section.

According to another aspect of the present invention, the first modulation section is configured so that an electric field applied to the optical waveguide is inverted to the second modulation section.

According to another aspect of the present invention, the electrode is configured so that a voltage attenuation coefficient of the electrical signal in the first modulation section is different from a voltage attenuation coefficient in the second modulation section.

According to another aspect of the present invention, the optical waveguide is a Mach-Zehnder-type optical waveguide including two parallel waveguides forming a pair, and the modulation section is composed of two parallel waveguides forming the pair.

According to another aspect of the present invention, the modulation section has a first U-turn waveguide in which a light propagation direction is inverted, and the first modulation section is configured as a region between the first U-turn waveguide and the downstream side end portion.

According to another aspect of the present invention, the second modulation section has a second U-turn waveguide in which the light propagation direction is inverted, and the parallel waveguides forming the pair intersect with each other in the second U-turn waveguide.

According to another aspect of the present invention, the parallel waveguides forming the pair have an intersection portion where both intersect with each other, and the first modulation section is configured as a region between the intersection portion and the downstream side end portion.

According to another aspect of the present invention, the electrode is composed of a center electrode and a ground electrode formed along the center electrode at a predetermined distance, and in the modulation section composed of the parallel waveguide formed on the substrate, the center electrode is formed in an upper portion of the parallel waveguide forming the second modulation section, and the ground electrode is formed in an upper portion of the parallel waveguide forming the first modulation section.

According to another aspect of the present invention, the substrate is formed of a ferroelectric substance, a semiconductor, or a polymeric material. The optical waveguide is configured as a part of the substrate or formed of a polymeric material disposed on the substrate, and the electrode causes the optical waveguide to perform an optical modulation operation.

According to another aspect of the present invention, there is provided an optical waveguide device including any one of the optical waveguide elements, and a housing that houses the optical waveguide element.

According to still another aspect of the present invention, there is provided an optical transmission apparatus including the optical waveguide device according to claim 1, and an electronic circuit that outputs an electrical signal for causing the optical waveguide device to perform a modulation operation.

This specification includes all contents of Japanese Patent Application No. 2020-183025 filed on Oct. 30, 2020.

Advantageous Effects of Invention

According to the present invention, in the optical waveguide element using the optical waveguide formed on the substrate, frequency characteristics can be easily improved at low cost even in the substrate having various crystal orientations.

DESCRIPTION OF EMBODIMENTS

Hereinafter, embodiments of the present invention will be described with reference to the drawings.

First Embodiment

Figure 1:
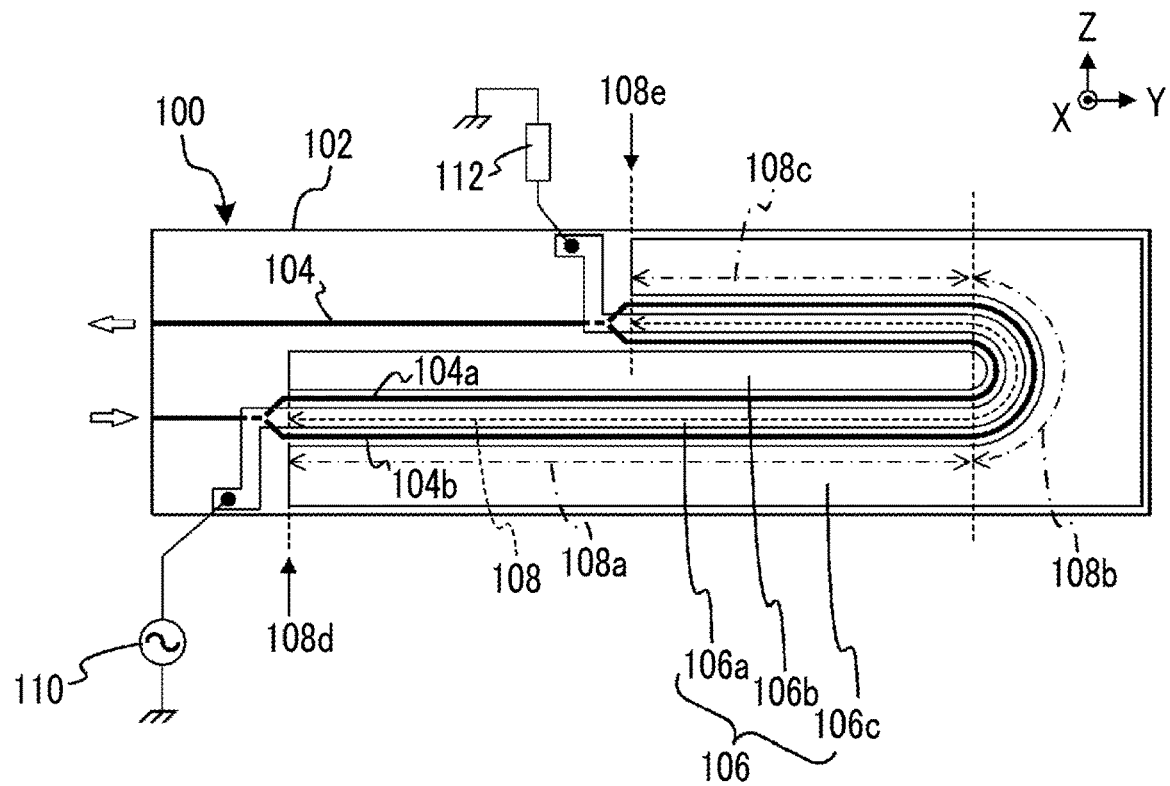
FIG. 1 is a view illustrating a configuration of an optical modulation element according to a first embodiment of the present invention.

First, a first embodiment of the present invention will be described. FIG. 1 is a view illustrating a configuration of an optical waveguide element according to the first embodiment of the present invention. In the present embodiment, the optical waveguide element is an optical modulation element 100 that performs optical modulation by using a Mach-Zehnder-type optical waveguide, for example.

The optical modulation element 100 includes an optical waveguide 104 formed on a substrate 102 and a control electrode 106 that controls a light wave propagating through the optical waveguide 104. The substrate 102 is a substrate having an electro-optic effect. For example, the substrate 102 is an X-cut substrate formed of LN, and is set so that a Z-axis is directed upward in the drawing and a Y-axis is directed rightward in the drawing.

For example, the optical waveguide 104 is the Mach-Zehnder-type optical waveguide, and has two parallel waveguides 104a and 104b forming a pair. The control electrode 106 is a traveling-wave electrode in which an electrical signal (hereinafter, also referred to as a modulation signal) is a traveling wave and propagates in one direction.

The control electrode 106 is provided along a length direction (extending direction) of the two parallel waveguides 104a and 104b, and applies an electric field to the parallel waveguides 104a and 104b to generate a phase change in a light wave propagating through the parallel waveguides 104a and 104b. In this manner, for example, input light (white arrow facing rightward in the drawing) input from an end portion of the optical waveguide 104 on a left side of the substrate 102 in the drawing and on a lower side in the drawing is modulated, and modulated light from an end portion of the optical waveguide 104 on an upper side in the drawing is output (white arrow facing leftward in the drawing).

Specifically, the control electrode 106 is composed of a center electrode 106a and ground electrodes 106b and 106c. One end of the center electrode 106a is connected to a signal source 110 that generates the modulation signal, and the other end is terminated by a terminator 112 having a predetermined impedance. In addition, the center electrode 106a is disposed along the parallel waveguides 104a and 104b at a position pinched between the parallel waveguides 104a and 104b in a plane of the substrate 102. In this manner, the center electrode 106a applies an electric field to each of the parallel waveguides 104a and 104b together with the ground electrodes 106b and 106c facing each other across the parallel waveguides 104a and 104b. In this manner, electric fields in mutually opposite directions are applied to the parallel waveguides 104a and 104b, and phase changes having mutually opposite signs are generated in the light waves propagating through each of the parallel waveguides 104a and 104b.

Here, a portion where the control electrode 106 controls the light waves of the parallel waveguides 104a and 104b, that is, a portion which applies the phase changes to the light waves of the parallel waveguides 104a and 104b forms a modulation section 108 (portion in a range indicated by a dashed arrow illustrated in the center electrode 106a). The modulation section 108 has a first modulation section 108c (range indicated by a dashed-dotted arrow in the drawing) located within a predetermined distance range from a downstream side end portion 108e along a propagation direction of the traveling wave propagating through the control electrode 106, and a second modulation section 108a (range indicated by a dashed-dotted arrow in the drawing) located within a predetermined distance range from an input end 108d of the electrical signal on an upstream side along the propagation direction. Here, the predetermined distance range means a range where the signs of the phase changes of the light generated in each of the parallel waveguides 104a and 104b are the same, when a DC voltage is applied between the center electrode 106a and the ground electrodes 106b and 106c.

In particular, the control electrode 106 and the optical waveguide 104 are configured so that the phase change generated in the light wave of each of the parallel waveguides 104a and 104b in the first modulation section 108c of the modulation section 108 has a sign opposite to a sign of the phase change generated in each of the parallel waveguide 104a and 104b in the second modulation section 108a.

In addition, with regard to lengths of the first modulation section 108c and the second modulation section 108a which are measured along the extending direction of the modulation section 108, the first modulation section 108c is shorter than the second modulation section 108a. That is, in the control electrode 106, the length of a portion working on the parallel waveguides 104a and 104b in the first modulation section 108c is shorter than the length of a portion working on the parallel waveguides 104a and 104b in the second modulation section 108a.

In addition, in the present embodiment, the modulation section 108 includes a U-turn waveguide 108b (range indicated by a dashed-dotted arrow in the drawing) which is a first U-turn waveguide where the light propagation direction is inverted.

Specifically, the second modulation section 108a of the modulation section 108 is configured as a straight portion extending in a +Y-direction from the input end 108d along the propagation direction of the light waves of the parallel waveguides 104a and 104b. In addition, the first modulation section 108c connected to the second modulation section 108a across the U-turn waveguide 108b extends in a −Y-direction along the propagation direction of the light waves of the parallel waveguides 104a and 104b, and is configured as a straight portion terminated in the end portion 108e.

In this manner, in the modulation section 108, the phase change in the first modulation section 108c has the sign opposite to the sign of the phase change in the second modulation section 108a.

For example, when focusing on one parallel waveguide 104a forming the modulation section 108, the electric field directed from the center electrode 106a to the ground electrode 106b is in a +Z-direction in the second modulation section 108a, and is in a −Z-direction in the first modulation section 108c. As a result, in the parallel waveguide 104a, the phase change in the first modulation section 108c has a sign opposite to a sign in the second modulation section 108a. Similarly, focusing on the other parallel waveguide 104b, the electric field directed to the ground electrode 106c from the center electrode 106a is in the −Z-direction at the second modulation section 108a and is in the +Z-direction at the first modulation section 108c. As a result, in the parallel waveguide 104b, the phase change in the first modulation section 108c has a sign opposite to a sign of the phase change in the second modulation section 108a.

The configuration of the control electrode 106 illustrated in FIG. 1 is provided for schematically simplifying and describing the configuration of the modulation section 108. Actually, for example, all including a portion on the signal source 110 side of the center electrode 106a and a portion on the terminator 112 side may be formed as a coplanar transmission line having a predetermined impedance together with the ground electrodes 106b and 106c (the same applies to the following embodiments and modification examples).

Figure 2:
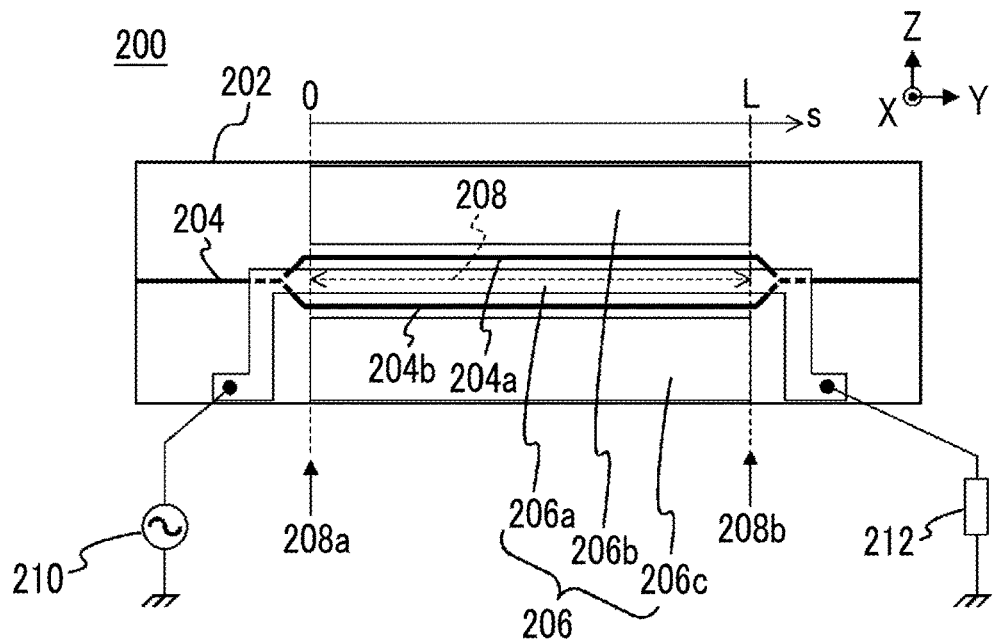
FIG. 2 is a view illustrating a configuration of an optical modulation element in the related art.

Next, an operation of the optical modulation element 100 will be described. First, for later comparison, an operation of an optical modulation element using a general Mach-Zehnder-type optical waveguide in the related art having a linear (non-folded) parallel waveguide will be described. FIG. 2 is a view illustrating an example of a configuration of an optical modulation element 200 in the related art. For example, the optical modulation element 200 has an optical waveguide 204 formed on a substrate 202 formed of X-cut LN, and a control electrode 206. The optical waveguide 204 is the Mach-Zehnder-type optical waveguide including two linear parallel waveguides 204a and 204b extending in a Y-axis direction. The control electrode 206 has a center electrode 206a provided along the parallel waveguides 204a and 204b, and ground electrodes 206b and 206c.

The center electrode 206a is provided along and between the parallel waveguides 204a and 204b. In addition, the ground electrodes 206b and 206c each are disposed at positions facing the center electrode 206a across the parallel waveguides 204a and 204b. The control electrode 206 is a traveling-wave electrode. One end of the center electrode 206a is connected to a signal source 210 that generates a modulation signal, and the other end is terminated by a terminator 212 having a predetermined impedance. A portion where the light wave is controlled by the control electrode 206 in the parallel waveguides 204a and 204b forms a modulation section 208 (range indicated by a dashed arrow in the drawing) having a length L. Here, in the modulation section 208, an upstream end portion along the propagation direction of the traveling wave propagating through the control electrode 206 will be referred to as an input end 208a, and a downstream side end portion will be referred to as an end portion 208b.

In the above-described configuration, as expressed by the following equation, an induced phase difference amount φ1 generated between the parallel waveguides 204a and 204b in the entire length direction of the modulation section 208 is obtained by integrating a phase difference amount generated in a minute section ds along an axis s (upper portion in the drawing) extending in the extending direction of the modulation section 208.

$$\phi_1 = \int_0^L \Delta\phi \cdot V_0 \exp(-\alpha s)\,ds \qquad (1)$$
$$= \Delta\phi \frac{V_0}{\alpha}\{1 - \exp(-\alpha L)\}$$
$$= \Delta\phi \frac{V_0}{\alpha}(1 - A)$$

Here, $$A = \exp(-\alpha L) \qquad (2)$$

In the above equation, $V_0$ is a voltage amplitude of the electrical signal in the input end 208a of the modulation section 208, $\alpha$ is a voltage attenuation coefficient (attenuation ratio per unit length) of the electrical signal in the control electrode 206, and $\Delta\phi$ is an induced phase difference amount per unit voltage and unit length generated between the parallel waveguides 204a and 204b. In addition, A indicates a voltage attenuation ratio in the end portion 208b with respect to the input end 208a in the control electrode

206 (ratio of a signal voltage output from the end portion 208*b* with respect to a signal voltage input to the input end 208*a*).

Figure 3:
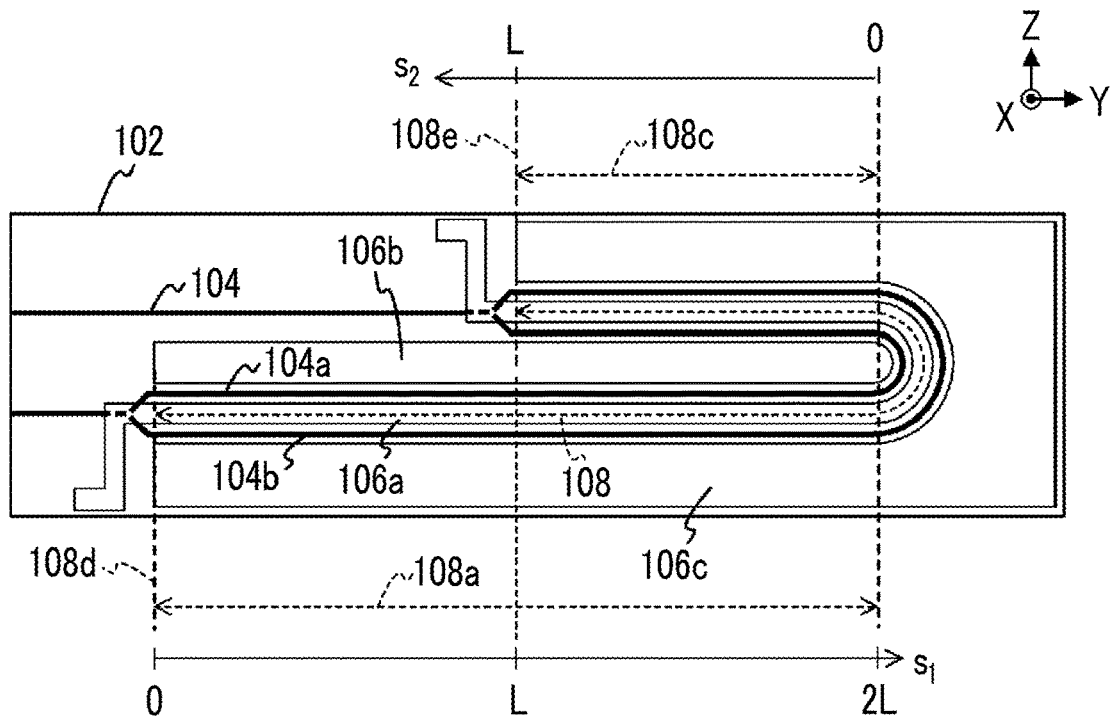
FIG. 3 is a diagram for explaining the operation of the optical modulation element illustrated in FIG. 1.

FIGS. 3A and 3B are views for describing the operation of the optical modulation element 100. FIG. 3 illustrates the length of the modulation section 108 forming the optical modulation element 100 illustrated in FIG. 1, which is measured along the modulation section 108.

In the following description, the "length" of the optical waveguide, the control electrode, and the modulation section means the length measured along each of the optical waveguide, the control electrode, and the modulation section. In addition, an "induced phase difference" means a phase difference generated between the two parallel waveguides by the control electrode, and a phase change generated in the parallel waveguides means a change in an optical phase generated in each of the parallel waveguides by the control electrode. That is, the induced phase difference is generated between the two parallel waveguides, as a result of the phase change generated in each of the parallel waveguides by the control electrode.

As illustrated in FIG. 3, the modulation section 108 is configured so that the first modulation section 108*c* has a length L and the second modulation section 108*a* has a length 2L. The first modulation section 108*c* has an opposite sign of the phase change compared to the second modulation section 108*a*. Accordingly, in a direct current operation where a loss of the control electrode 106 is negligible, the induced phase difference generated in a region the length L of the illustrated right half portion of the second modulation section 108*a* is offset by the induced phase difference generated in the first modulation section 108*c*. Therefore, in the direct current operation, the optical modulation element 100 is equivalent to the optical modulation element 200 illustrated in FIG. 2.

However, the control electrode 106 has a propagation loss for a high-frequency electrical signal. Accordingly, the induced phase amount in the first modulation section 108*c* does not completely offset the induced phase amount in a portion of the length L on the illustrated right side of the second modulation section 108*a*. Therefore, the optical modulation element 100 illustrated in FIG. 3 exhibits frequency characteristics different from those of the optical modulation element 200 illustrated in FIG. 2.

In FIG. 3, when the control electrode 106 has a voltage attenuation coefficient α as in the control electrode 206, an induced phase difference $\varphi_2$ generated between the parallel waveguides 104*a* and 104*b* is expressed by the following equation.

$$\phi_2 = \int_0^{2L} \Delta\phi V_0 \cdot \exp(-\alpha s_1 x) \, ds - \qquad (3)$$

$$\int_0^L \Delta\phi V_0 \cdot \exp(-2\alpha L) \cdot \exp(-\alpha s_2) ds_2$$

$$= \Delta\phi \frac{V_0}{\alpha} [1 - 2\exp(-2\alpha L) + \exp(-3\alpha L)]$$

$$= \Delta\phi \frac{V_0}{\alpha} (1 - 2A^2 + A^3)$$

In a first line of Equation (3), integration of a first term indicates integration along an axis s1 (axis illustrated in a lower portion of the drawing) extending in the extending direction of the second modulation section 108*a* of the modulation section 108. Integration of a second term indicates integration along an axis s2 (axis illustrated in an upper portion of the drawing) extending in the extending direction of the first modulation section 108*c* of the modulation section 108. The U-turn waveguide 108*b* in the modulation section 108 is a portion where the sign of the phase change is opposite in each of the parallel waveguides 104*a* and 104*b*, and the generation amount of the phase difference is smaller, compared to the second modulation section 108*a* and the first modulation section 108*c*. Accordingly, the induced phase amount generated in the U-turn waveguide 108*b* is ignored in Equation (3).

Here, when a ratio $\varphi_2/\varphi_1$ between $\varphi_2$ in Equation (3) and $\varphi_1$ in Equation (1) is taken to quantitatively recognize a difference in the generation amount of the induced phase difference in the optical modulation element 100 in FIG. 3 with respect to the optical modulation element 200 in FIG. 2, the following equation is obtained.

$$\frac{\phi_2}{\phi_1} = \frac{1 - 2A^2 + A^3}{1 - A} \qquad (4)$$

$$= 1 + A - A^2$$

Figure 4:
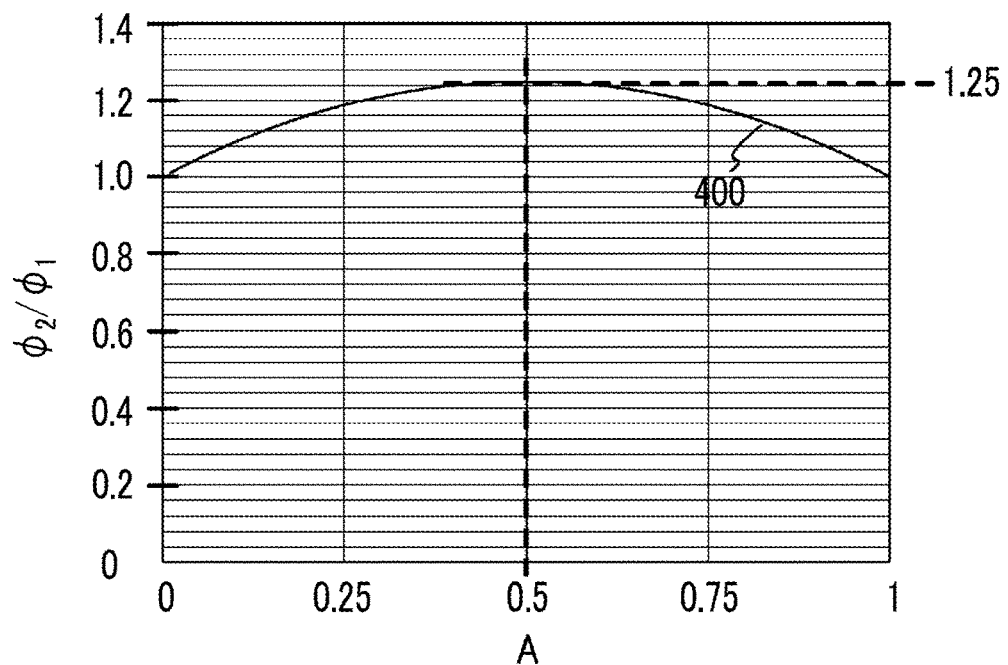
FIG. 4 is a view for describing an improved effect in the optical modulation element illustrated in FIG. 1, compared to the optical modulation element in the related art illustrated in FIG. 2.

FIG. 4 is a view illustrating a relationship between $\varphi_2/\varphi_1$ and A in Equation (4). In FIG. 4, a horizontal axis represents A, a vertical axis represents $\varphi_2/\varphi_1$, and a line 400 indicates $\varphi_2/\varphi_1$ expressed by Equation (4). As illustrated, $\varphi_2/\varphi_1$ has a maximum value of 1.25 in A=0.5. That is, in the optical modulation element 100 illustrated in FIG. 3, the induced phase difference amount at the frequency where the voltage attenuation coefficient α of the control electrode 106 satisfies A=0.5 (that is, response at the frequency) is improved by 1.25 times, compared to the optical modulation element 200 illustrated in FIG. 2.

Here, A is a voltage attenuation ratio per length L of the control electrodes 106 and 206, and A=0.5 corresponds to a state where an S21 component is −6 dB (=20 log(0.5)) as a transfer function in S-parameter notation. In addition, $\varphi_2/\varphi_1$=1.25 corresponds to improvement of 2 dB (=20 log(1.25)) as the frequency response.

Figure 5:
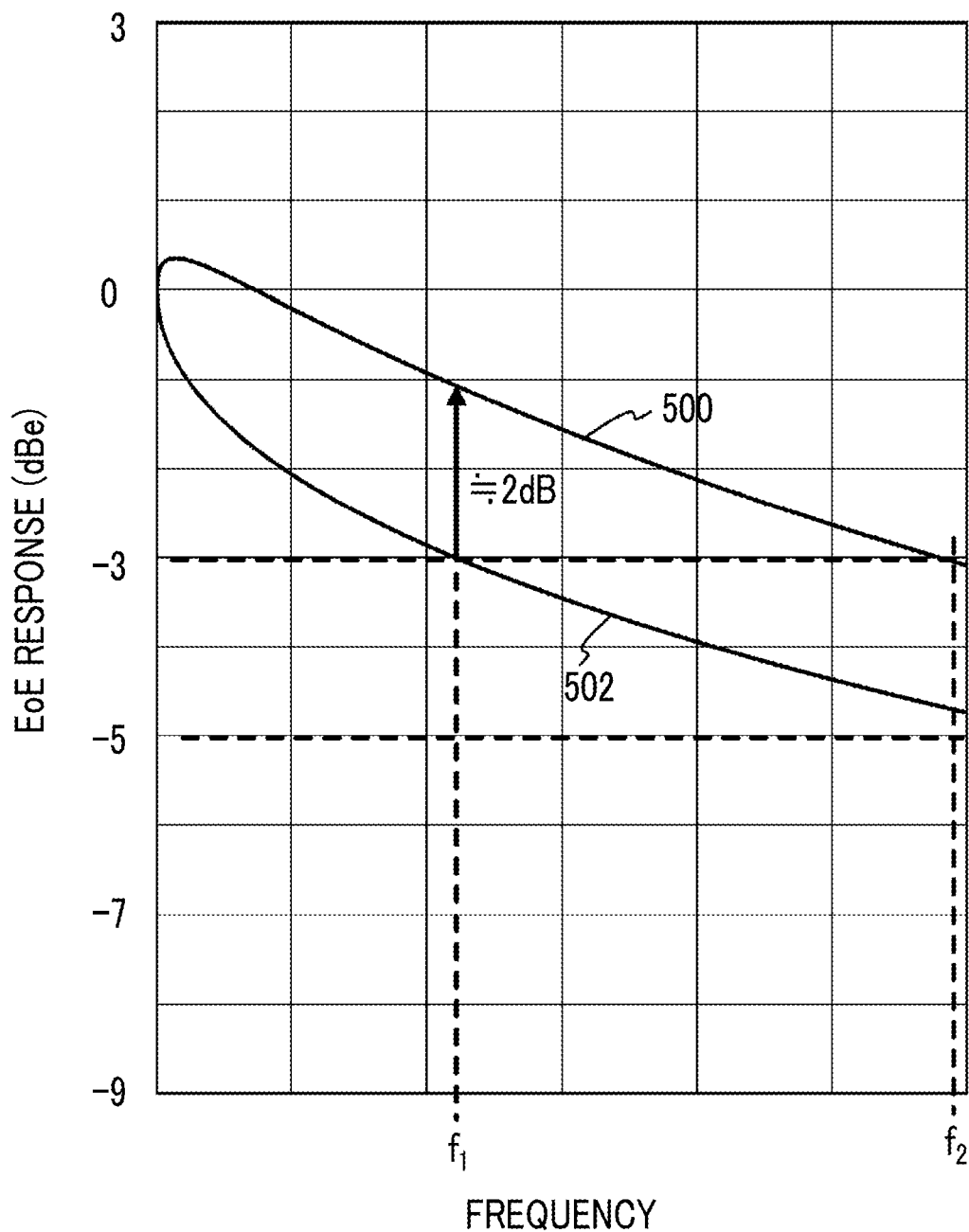
FIG. 5 is a view for describing an improved effect of a frequency response in the optical modulation element illustrated in FIG. 1, compared to the optical modulation element in the related art illustrated in FIG. 2.

FIG. 5 illustrates a simulation result of the frequency response in the optical modulation element 100 illustrated in FIG. 3. The horizontal axis represents the frequency of the electrical signal input to control electrode 106. The vertical axis represents a so-called EOE response, that is, a ratio of power of modulated light output from the optical waveguide 104 with respect to power of the electrical signal applied to the control electrode 106. The EOE response illustrated in FIG. 5 is normalized by a value of the EOE response at a frequency of 0 Hz, that is, a direct current signal. In addition, in the calculation in FIG. 5, the voltage attenuation coefficient α of the control electrode 106 is approximated by the following equation. Here, $\alpha_0$ is a constant, and f is the frequency.

$$\alpha = \alpha_0 \sqrt{f} \qquad (5)$$

A line 500 and a line 502 in FIG. 5 each represent response characteristics of the optical modulation element 100 illustrated in FIG. 3 and response characteristic of the optical modulation element 200 illustrated in FIG. 2. In an example in FIG. 5, at a frequency f1 providing a 3 dB band of the EOE response in the optical modulation element 200 having a configuration in the related art illustrated in FIG. 2, $\alpha_0$ in Equation (5) is adjusted so that an A value of the optical modulation element 100 illustrated in FIG. 3 is 0.5. For example, the value of $\alpha_0$ can be adjusted by adjusting a cross-sectional area of the center electrode 106a of the control electrode 106, for example.

As illustrated in FIG. 5, in the optical modulation element 100 illustrated in FIG. 3, the EOE response is improved by 2 dB at the frequency $f_1$. As a result, a frequency $f_2$ providing the 3 dB band (that is, an operation frequency band) of the EOE response of the optical modulation element 100 is improved by approximately three times $f_1$ of the optical modulation element 200 in the related art.

As illustrated in FIG. 5, in the optical modulation element 100 illustrated in FIG. 3, the EOE response is improved in a region other than the direct current. In particular, it can be understood that the EOE response is improved by approximately 2 dB in a wide range from approximately the frequency f1 to a broadband. As a result, the 3 dB band of the EOE response of the optical modulation element 100 is widened to a 5 dB band in the optical modulation element 200 in the related art.

When the configuration of the optical modulation element 200 in the related art illustrated in FIG. 2 and the configuration of the optical modulation element 100 illustrated in FIG. 3 are compared with each other, the first modulation section 108c is added to the modulation section 108 of the optical modulation element 100, and the length of the second modulation section 108a is extended by the length the same as the length of the first modulation section 108c. The improved effect of the frequency response described above is achieved by the extended portion of the second modulation section 108a and the first modulation section 108c. In other words, the length of the first modulation section 108c needs to be shorter than the length of the second modulation section 108a. Therefore, in the control electrode 106, the length in the first modulation section 108c needs to be shorter than the length in the second modulation section 108a.

In the optical modulation element 100 having the above-described configuration, the control electrode 106 and the parallel waveguides 104a and 104b are configured so that the phase change of the light generated in the parallel waveguides 104a and 104b in the first modulation section 108c of the modulation section 108 has a sign opposite to a sign of the phase change of the light generated in the parallel waveguides 104a and 104b in the second modulation section 108a. Therefore, in the optical modulation element 100, the induced phase difference amount generated between the parallel waveguides 104a and 104b in the second modulation section 108a is reduced by the induced phase difference generated in the first modulation section 108c. In the optical modulation element 100, the induced phase difference offset by the first modulation section 108c out of the induced phase difference amount in the second modulation section 108a has the frequency characteristics. As a result, the operation frequency band realized by the whole modulation section 108 is widened.

The improved effect of the frequency band described above is achieved by disposing the control electrode 106 and the parallel waveguides 104a and 104b which form the modulation section 108, and a polarization direction of the substrate does not need to be adjusted unlike the optical modulation element in the related art. Therefore, in the optical modulation element 100, the frequency characteristics can be easily improved at low cost even in the substrate having various crystal orientations.

In addition, in the optical modulation element 100, the first modulation section 108c is folded back by 180 degrees with respect to the second modulation section 108a in a plane of the substrate 102. In this manner, the optical modulation element 100 is configured so that the phase change in the first modulation section 108c has a sign opposite to a sign of the phase change in the second modulation section 108a. In this manner, the optical modulation element 100 can enlarge the operation frequency band with a simple configuration.

In the optical modulation element 100 illustrated in FIG. 3, a ratio of the length of the first modulation section 108c and the length of the second modulation section 108a which form the modulation section 108 is set to 1:2. However, the configuration of the optical waveguide element according to the present invention is not limited thereto. Hereinafter, modification examples of the optical modulation element 100 will be described.

First Modification Example

First, a first modification example of the optical modulation element 100 according to the first embodiment of the present invention will be described. The optical waveguide element according to the present modification example has the same configuration as the optical modulation element 100 according to the first embodiment. However, a length ratio between the first modulation section and the length of the second modulation section which form the modulation section is r:(1+r) instead of 1:2. Here, r is any real number.

Figure 6:
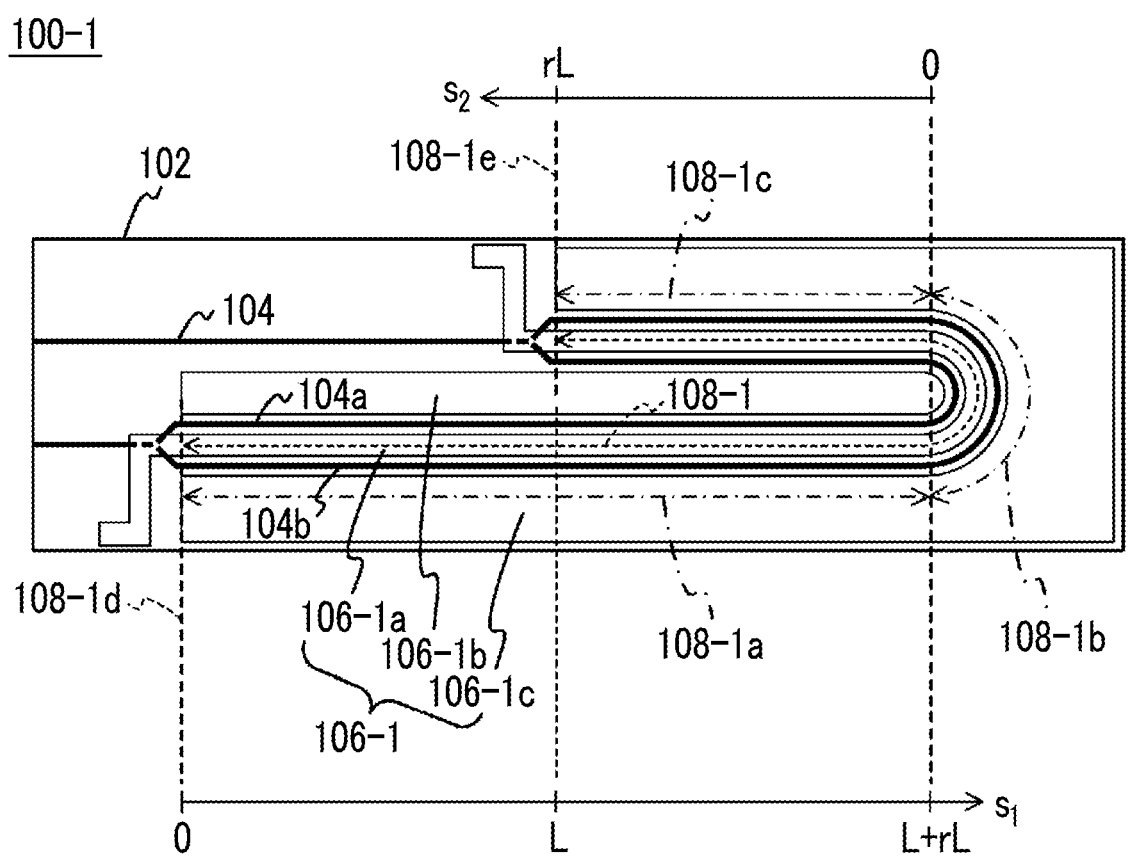
FIG. 6 is a view illustrating a configuration of an optical modulation element according to a first modification example of the first embodiment.

FIG. 6 is a view illustrating a configuration of an optical modulation element 100-1 according to the first modification example. In FIG. 6, the same reference numerals as those illustrated in FIGS. 1 and 3 will be used to denote the same configuration elements as those of the optical modulation element 100 illustrated in FIGS. 1 and 3, description in FIGS. 1 and 3 described above will be incorporated by reference.

The optical modulation element 100-1 has the same configuration as the optical modulation element 100, but is different in that a control electrode 106-1 is provided instead of the control electrode 106. The control electrode 106-1 has the same configuration as the control electrode 106, but instead of the control electrode 106 having the center electrode 106a and the ground electrodes 106b and 106c, a center electrode 106-1a and ground electrodes 106-1b and 106-1c are provided.

The center electrode 106-1a and the ground electrodes 106-1b and 106-1c have the same configuration as the center electrode 106a and the ground electrodes 106b and 106c. However, the length extending along the parallel waveguides 104a and 104b is different from the length of the center electrode 106-1a and the ground electrodes 106-1b and 106-1c.

In this manner, a modulation section 108-1 serving as a portion where the control electrode 106-1 controls the light waves of the parallel waveguides 104a and 104b is different from the modulation section 108 of the optical modulation element 100 illustrated in FIG. 1, and is configured so that the length of the first modulation section 108-1c is rL and the length of the second modulation section 108-1a is L+rL. That is, the length ratio between the first modulation section 108-1c and the second modulation section 108-1a is r:(r+1).

Here, as in the first modulation section 108c and the second modulation section 108a of the modulation section 108 illustrated in FIG. 1, each of the first modulation section 108-1c and the second modulation section 108-1a is located within a predetermined distance range (range indicated by a dashed-dotted arrow in the drawing) from an end portion 108-1e which is a downstream side end portion along a propagation direction of a traveling wave propagating through the control electrode 106-1 and a predetermined distance range (range indicated by a dashed-dotted arrow in the drawing) from an input end 108-1*d* of the electrical signal on the upstream side along the propagation direction. In addition, the modulation section 108-1 also has a U-turn waveguide 108-1*b* which is the same as the U-turn waveguide 108*b* of the modulation section 108. Here, the predetermined distance range means a range where the signs of the phase changes of the generated light are the same in each of the parallel waveguides 104*a* and 104*b*, when a direct current voltage is applied between the center electrode 106-1*a* and the ground electrodes 106-1*b* and 106-1*c*.

In FIG. 6, an induced phase difference $\varphi_{2\text{-}1}$ generated between the parallel waveguides 104*a* and 104*b* is expressed by the following equation.

$$\phi_{2\text{-}1} = \int_0^{L+rL} \Delta\phi V_0 \cdot \exp(-\alpha s_1 x)\, ds_1 - \int_0^{rL} \Delta\phi V_0 \exp(-2\alpha L(1+r)) \cdot \exp(-\alpha s_2)\, ds_2 \qquad (6)$$

$$= \Delta\phi \frac{V_0}{\alpha}[1 - 2\exp\{-\alpha L(1+r)\} + \exp\{-\alpha L(1+2r)\}]$$

Figure 7:
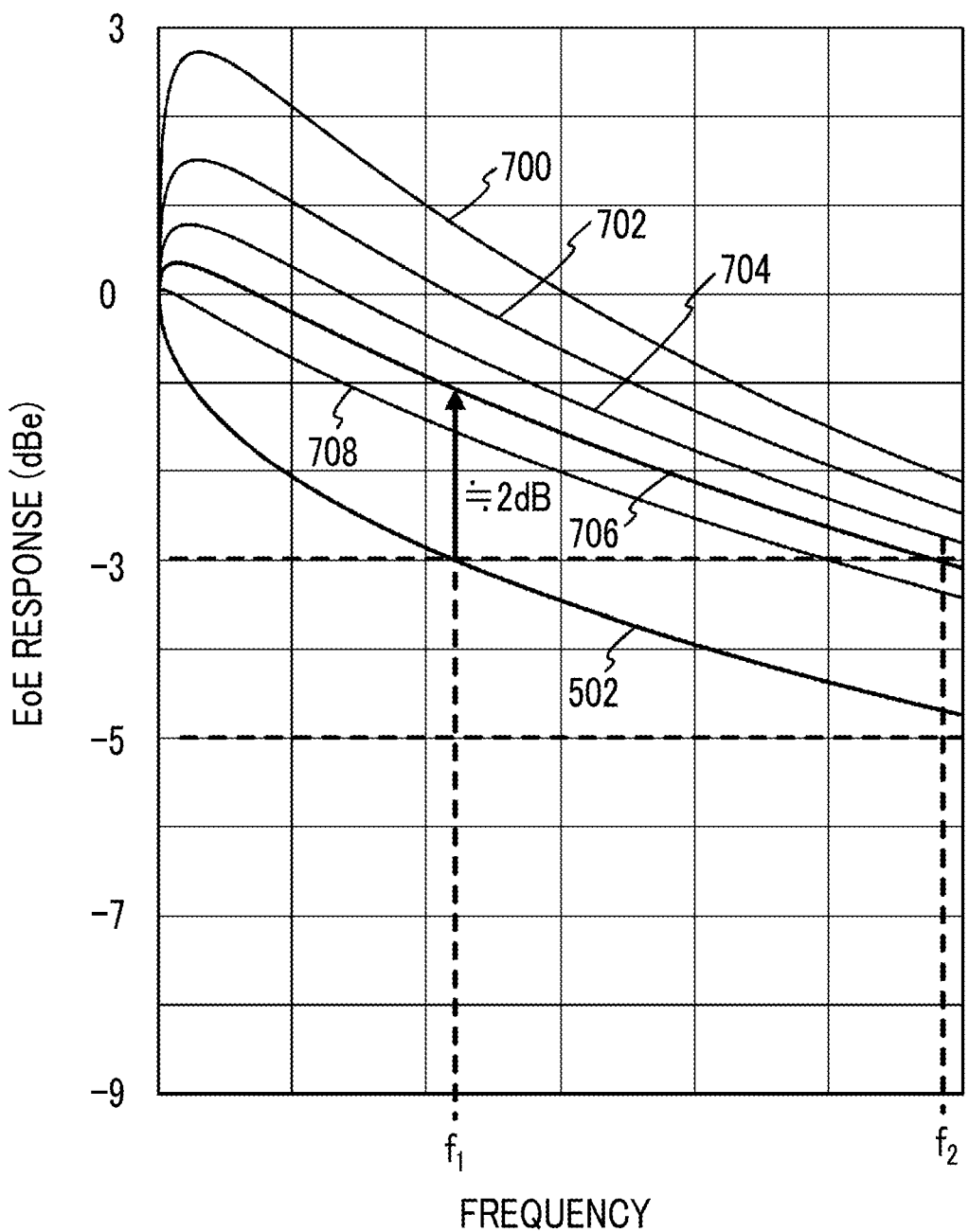
FIG. 7 is a view illustrating an improved effect of the frequency response in the optical modulation element illustrated in FIG. 6.

FIG. 7 illustrates a simulation result of the frequency response in the optical modulation element 100-1 illustrated in FIG. 6. As in FIG. 5, the horizontal axis represents the frequency of the electrical signal input to the control electrode 106, and the vertical axis represents the EOE response. In addition, in FIG. 7, as in FIG. 5, α conforms to equation (5). At the frequency $f_1$ providing the 3 dB band of the optical modulation element 200 having the configuration in the related art illustrated in FIG. 2, $\alpha_0$ of Equation (5) is adjusted so that the A value (that is, the voltage attenuation ratio in a range of the length L from the input end 108-1*d* of the second modulation section 108-1*a*) of the optical modulation element 100-1 illustrated in FIG. 6 is 0.5.

Each of lines 700, 702, 704, 706, and 708 illustrated in FIG. 7 indicates the EOE response when it is set as r=2, 1.5, 1.2, 1.0, and 0.8. Here, the line 706 indicating the EOE response of r=1 indicates the EOE response when the length ratio between the first modulation section 108-1*c* and the second modulation section 108-1*a* is 1:2, that is, in a case of the same configuration as the optical modulation element 100 illustrated in FIG. 3, and corresponds to the line 500 illustrated in FIG. 5. In addition, the line 502 illustrated in FIG. 7 is the same as the line 502 in FIG. 5, and indicates the EOE response of the optical modulation element 200 in the related art illustrated in FIG. 2.

The following can be understood from FIG. 7. As a value of r increases, the EOE response generates greater peaking on the low frequency side. That is, the value of r is appropriately selected at the time of designing. In this manner, the operation frequency band can be widened by controlling a magnitude of peaking.

Second Modification Example

Next, a second modification example of the optical waveguide element according to the first embodiment of the present invention will be described. The optical waveguide element according to the present modification example has the same configuration as the optical modulation element 100 according to the first embodiment. However, the voltage attenuation coefficient α of the control electrode forming the modulation section is not constant in the whole modulation section, and is different between the first modulation section and the second modulation section.

Figure 8:
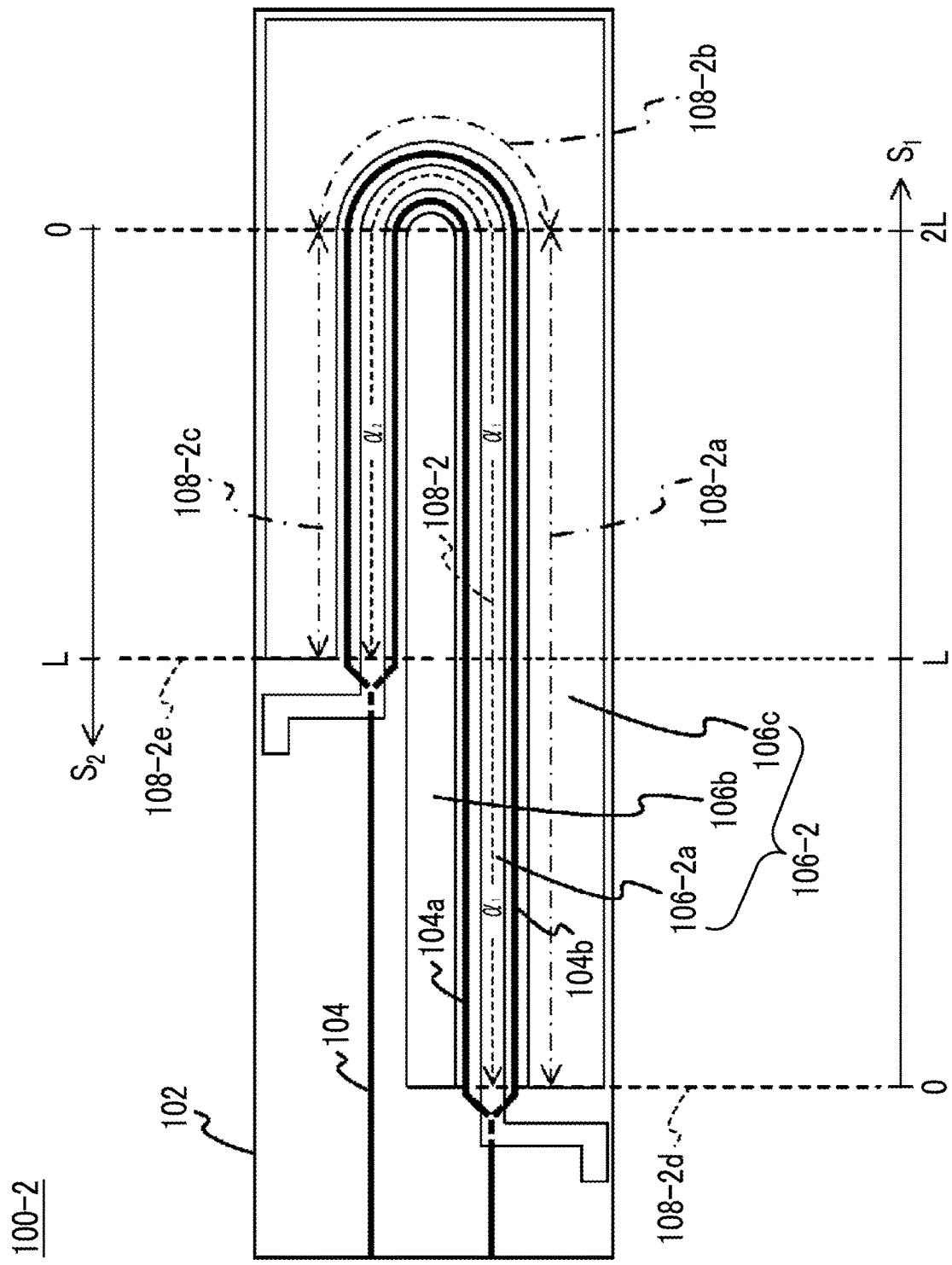
FIG. 8 is a view illustrating a configuration of an optical modulation element according to a second modification example of the first embodiment.

FIG. 8 is a view illustrating a configuration of an optical modulation element 100-2 according to the second modification example. In FIG. 8, the same reference numerals as those illustrated in FIGS. 1 and 3 are used to denote the same configuration elements as those of the optical modulation element 100 illustrated in FIGS. 1 and 3, description in FIGS. 1 and 3 described above will be incorporated by reference.

The optical modulation element 100-2 has the same configuration as the optical modulation element 100. However, a control electrode 106-2 is provided instead of the control electrode 106. The optical modulation element 100-2 includes a modulation section 108-2 composed of a control electrode 106-2 and parallel waveguides 104*a* and 104*b* instead of the modulation section 108 composed of the control electrode 106 and the parallel waveguides 104*a* and 104*b*. The modulation section 108-2 has the same configuration as the modulation section 108. However, instead of the second modulation section 108*a*, the U-turn waveguide 108*b*, and the first modulation section 108*c*, a second modulation section 108-2*a*, a U-turn waveguide 108-2*b*, and a first modulation section 108-2*c* are provided.

The second modulation section 108-2*a* and the first modulation section 108-2*c* have the same configuration as the second modulation section 108*a* and the first modulation section 108*c*. However, the voltage attenuation coefficients α of the control electrode 106-2 in the second modulation section 108-2*a* and the first modulation section 108-2*c* are different from each other. That is, the control electrode 106-2 has the same configuration as the control electrode 106, but includes a center electrode 106-2*a* instead of the center electrode 106*a*. A voltage attenuation coefficient $\alpha_1$ of a portion corresponding to the second modulation section 108-2*a* is configured to be different from a voltage attenuation coefficient α2 of a portion corresponding to the first modulation section 108-2*c*.

For example, this configuration can be realized by differently dividing a cross-sectional area of the center electrode 106-2*a* forming the control electrode 106-2 into a portion corresponding to the second modulation section 108-2*a* and a portion corresponding to the first modulation section 108-2*c*, or the like. Here, out of end portions of the modulation section 108-2, an upstream end portion along the propagation direction of the traveling wave propagating through the control electrode 106-2 will be referred to as an input end 108-2*d*, and a downstream end portion will be referred to as an end portion 108-2*e*.

In FIG. 8, an induced phase difference $\varphi_{2\text{-}2}$ generated between the parallel waveguides 104*a* and 104*b* is expressed by the following equation.

$$\phi_{2\text{-}2} = \int_0^{2L} \Delta\phi V_0 \cdot \exp(-\alpha_1 s_1 x)\, ds_1 - \int_0^{L} \Delta\phi V_0 \exp(-2\alpha_1 L) \cdot \exp(-\alpha_2 s_2)\, ds_2 \qquad (7)$$

$$= \Delta\phi \frac{V_0}{\alpha}\left[1 - \exp(-2\alpha_1 L) - \frac{1}{m}\exp(-2\alpha_1 L) + \frac{1}{m}\exp\{-(2+m)\alpha_1 L\}\right]$$

Here, $$m \equiv \frac{\alpha_2}{\alpha_1} \quad (8)$$

Figure 9:
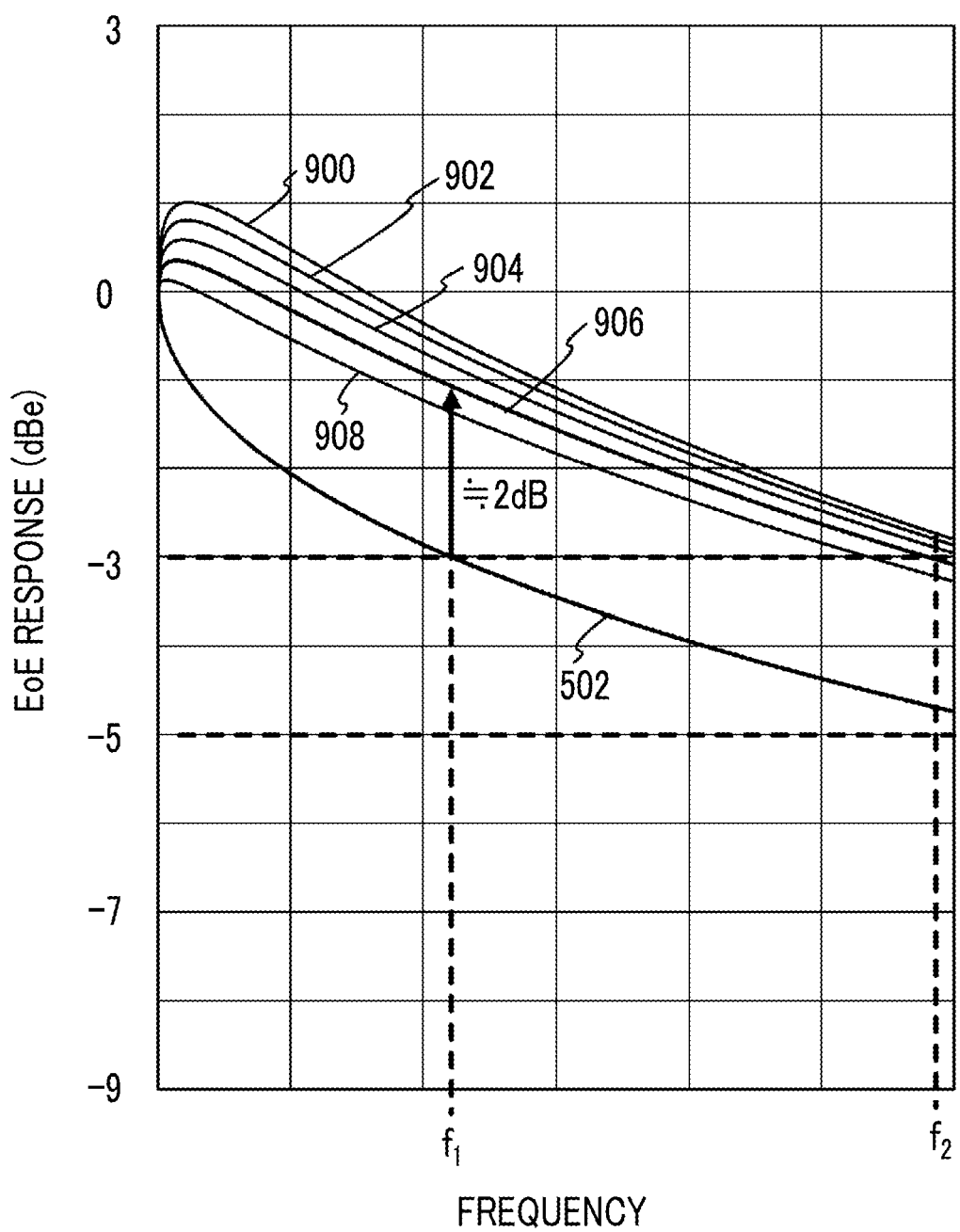
FIG. 9 is a view illustrating an improved effect of the frequency response in the optical modulation element illustrated in FIG. 8.

FIG. 9 illustrates a simulation result of frequency response in the optical modulation element 100-2 illustrated in FIG. 8. As in FIG. 5, the horizontal axis represents the frequency of the electrical signal input to the control electrode 106-2, and the vertical axis represents the EOE response. In addition, in FIG. 9, as in FIG. 5, each of $\alpha_1$ and $\alpha_2$ is proportional to a square root of the frequency of the electrical signal. Therefore, m can be provided as a parameter having no frequency dependence.

In addition, $\alpha_1$ is equal to $\alpha$ in FIGS. 1, 3, and 6, and conforms to Equation (5). At the frequency $f_1$ providing the 3 dB band of the optical modulation element 200 having the configuration in the related art illustrated in FIG. 2, $\alpha_0$ of Equation (5) is adjusted so that the A value (that is, the voltage attenuation ratio in a range of the length L from the input end 108-2d of the second modulation section 108-2a) of the optical modulation element 100-2 illustrated in FIG. 8 is 0.5.

Each of lines 900, 902, 904, 906, and 908 illustrated in FIG. 9 indicates the EOE response when it is set as m=2.5, 2.0, 1.5, 1.0, and 0.5. Here, the line 906 indicating the EOE response of m=1 indicates the EOE response when the voltage attenuation coefficient $\alpha 2$ in the first modulation section 108-2c is equal to the voltage attenuation coefficient $\alpha 1$ (=$\alpha$) in the second modulation section 108-2a, that is, in a case of the same configuration as the optical modulation element 100 illustrated in FIG. 3, and corresponds to the line 500 illustrated in FIG. 5.

The following can be understood from FIG. 9. As a value of m increases, the EOE response generates greater peaking on the low frequency side. That is, the value of m is appropriately selected at the time of designing. In this manner, the operation frequency band can be widened by controlling a magnitude of peaking.

Third Modification Example

Next, a third modification example of the optical waveguide element according to the first embodiment of the present invention will be described. The optical waveguide element according to the present modification example has the same configuration as the optical modulation element 100-2 illustrated in FIG. 8.

Furthermore, the first modulation section and the second modulation section of the modulation section have different clearances (gaps) between a center conductor and a ground conductor. A ratio between the length of the first modulation section and the length of the second modulation section is 1:n instead of 1:2. Here, n is any real number.

Figure 10:
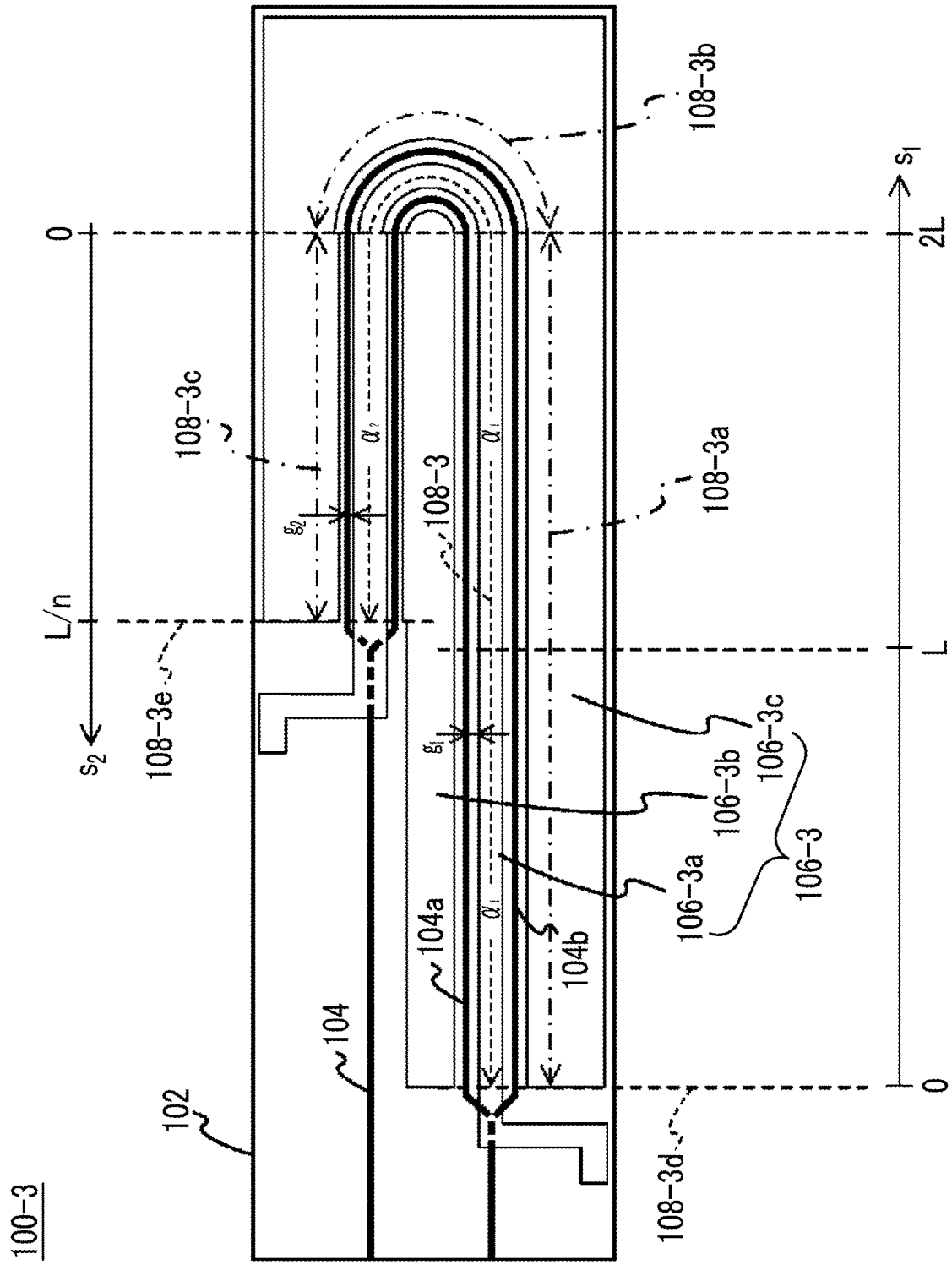
FIG. 10 is a view illustrating a configuration of an optical modulation element according to a third modification example of the first embodiment.

FIG. 10 is a view illustrating a configuration of an optical modulation element 100-3 according to the third modification example. In FIG. 10, the same reference numerals as those illustrated in FIG. 8 are used to denote the same configuration elements as those of the optical modulation element 100-2 illustrated in FIG. 8, description in FIG. 8 described above will be incorporated by reference.

The optical modulation element 100-3 has the same configuration as the optical modulation element 100-2 illustrated in FIG. 8, but includes a modulation section 108-3 including a control electrode 106-3 instead of the modulation section 108-2 including the control electrode 106-2.

The control electrode 106-3 includes a center electrode 106-3a and ground electrodes 106-3b and 106-3c which are the same as the center electrode 106-2a and the ground electrodes 106b and 106c which are included in the control electrode 106-2.

In addition, the modulation section 108-3 includes a second modulation section 108-3a, a U-turn waveguide 108-3b, and a first modulation section 108-3c which have the same configurations as the second modulation section 108-2a, the U-turn waveguide 108-2b, and the first modulation section 108-2c which are included in the modulation section 108-2.

However, a gap (clearance) $g_1$ between the center electrode 106-3a of the control electrode 106-3 and the ground electrodes 106-3b and 106-3c in the second modulation section 108-3a and a gap $g_2$ between the center electrode 106-3a and the ground electrodes 106-3b and 106-3c in the first modulation section 108-3c have mutually different values.

In addition, whereas the length of the second modulation section 108-3a is 2L, the length of the first modulation section 108-3c is L/n. Here, n is any real number. As in the optical modulation element 100-2 illustrated in FIG. 8, the voltage attenuation coefficient of the control electrode 106-3 in the second modulation section 108-3a is $\alpha 1$, and the voltage attenuation coefficient of the control electrode 106-3 in the first modulation section 108-3c is $\alpha 2$. For example, the voltage attenuation coefficient can be adjusted by adjusting a thickness of the center electrode 106-3a.

Out of the end portions of the modulation section 108-3, an upstream end portion along the propagation direction of the traveling wave propagating through the control electrode 106-3 will be referred to as an input end 108-3d, and a downstream end portion will be referred to as an end portion 108-3e.

In FIG. 10, an induced phase difference $\varphi_{2\text{-}3}$ generated between the parallel waveguides 104a and 104b is expressed by the following equation.

$$\begin{aligned} \phi_{2-3} &= \int_0^{2L} \Delta\phi V_0 \cdot \exp(-\alpha_1 s_1)\, ds_1 - \int_0^{L/n} \left(\frac{g_1}{g_2}\Delta\phi\right) V_0 \exp(-2\alpha_1 L) \cdot \\ &\quad \exp(-\alpha_2 s_2)\, ds_2 \\ &= \Delta\phi \frac{V_0}{\alpha}\left[1 - \exp(-2\alpha_1 L) - \frac{g}{m}\exp(-2\alpha_1 L) + \right. \\ &\quad \left. \frac{g}{m}\exp\left\{-\left(2+\frac{m}{n}\right)\alpha_1 L\right\}\right] \end{aligned} \quad (9)$$

Here, $$g \equiv \frac{g_1}{g_2} \quad (10)$$

Figure 11:
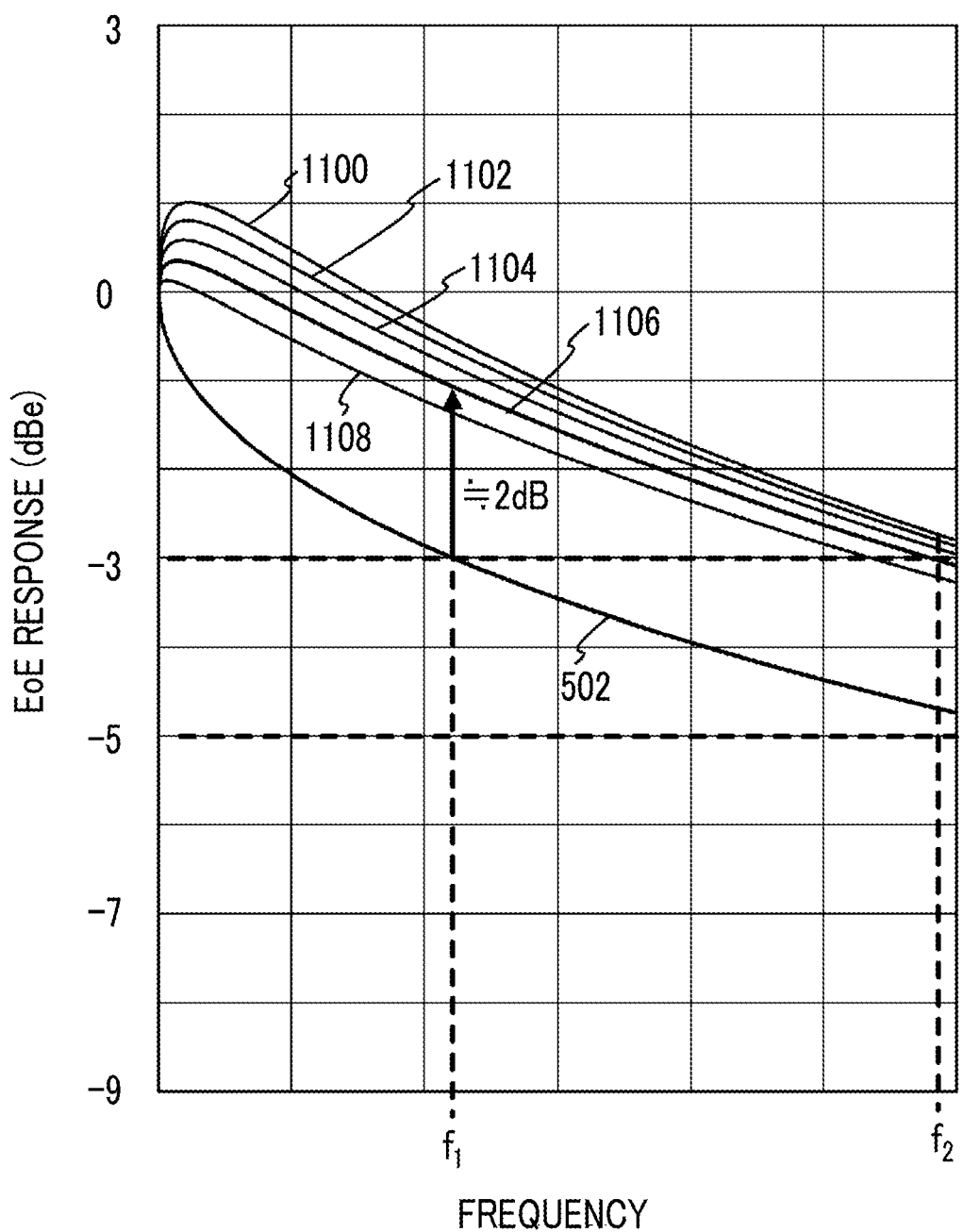
FIG. 11 is a first view illustrating an improved effect of the frequency response in the optical modulation element illustrated in FIG. 6.
Figure 12:
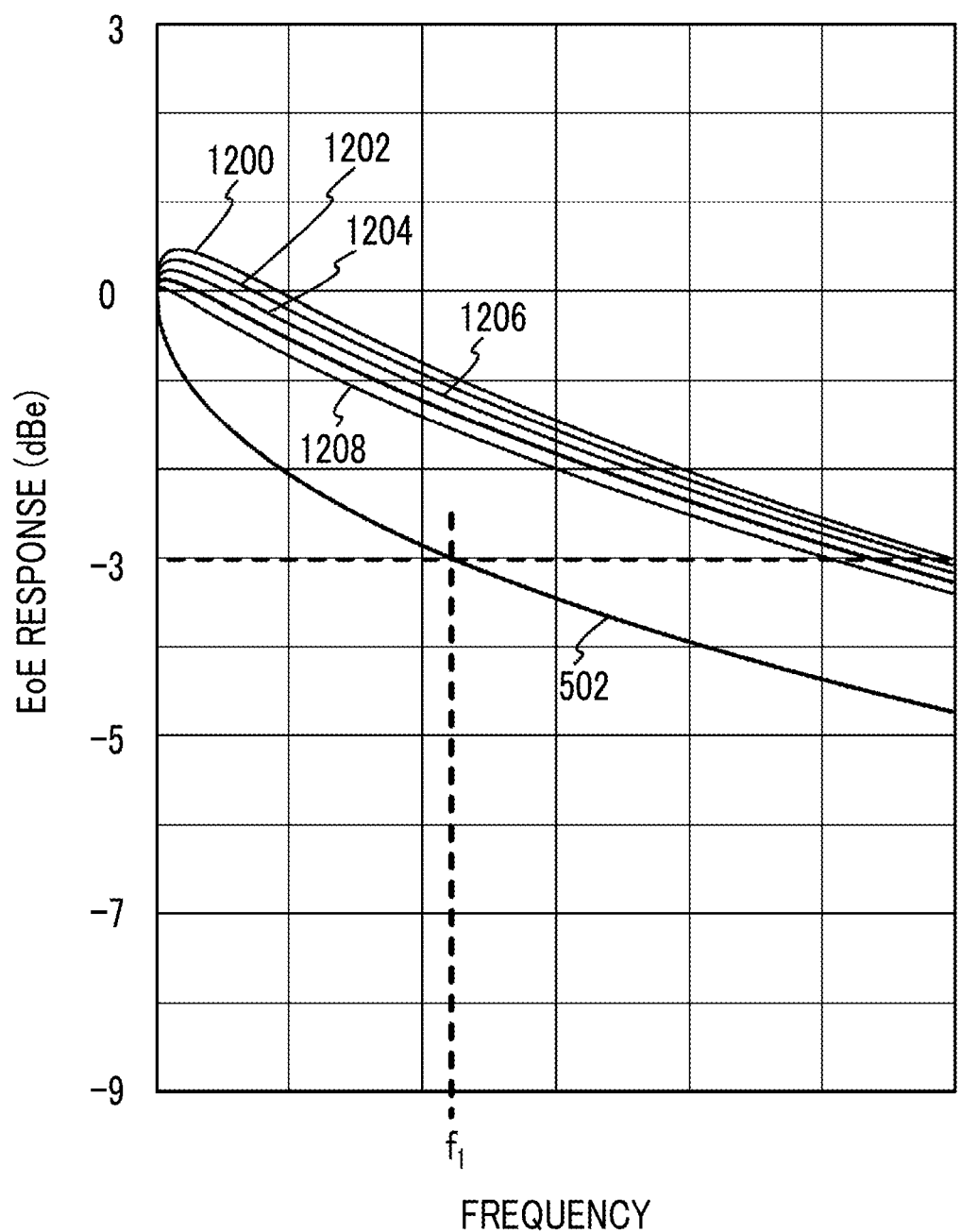
FIG. 12 is a second view illustrating an improved effect of the frequency response in the optical modulation element illustrated in FIG. 6.
Figure 13:
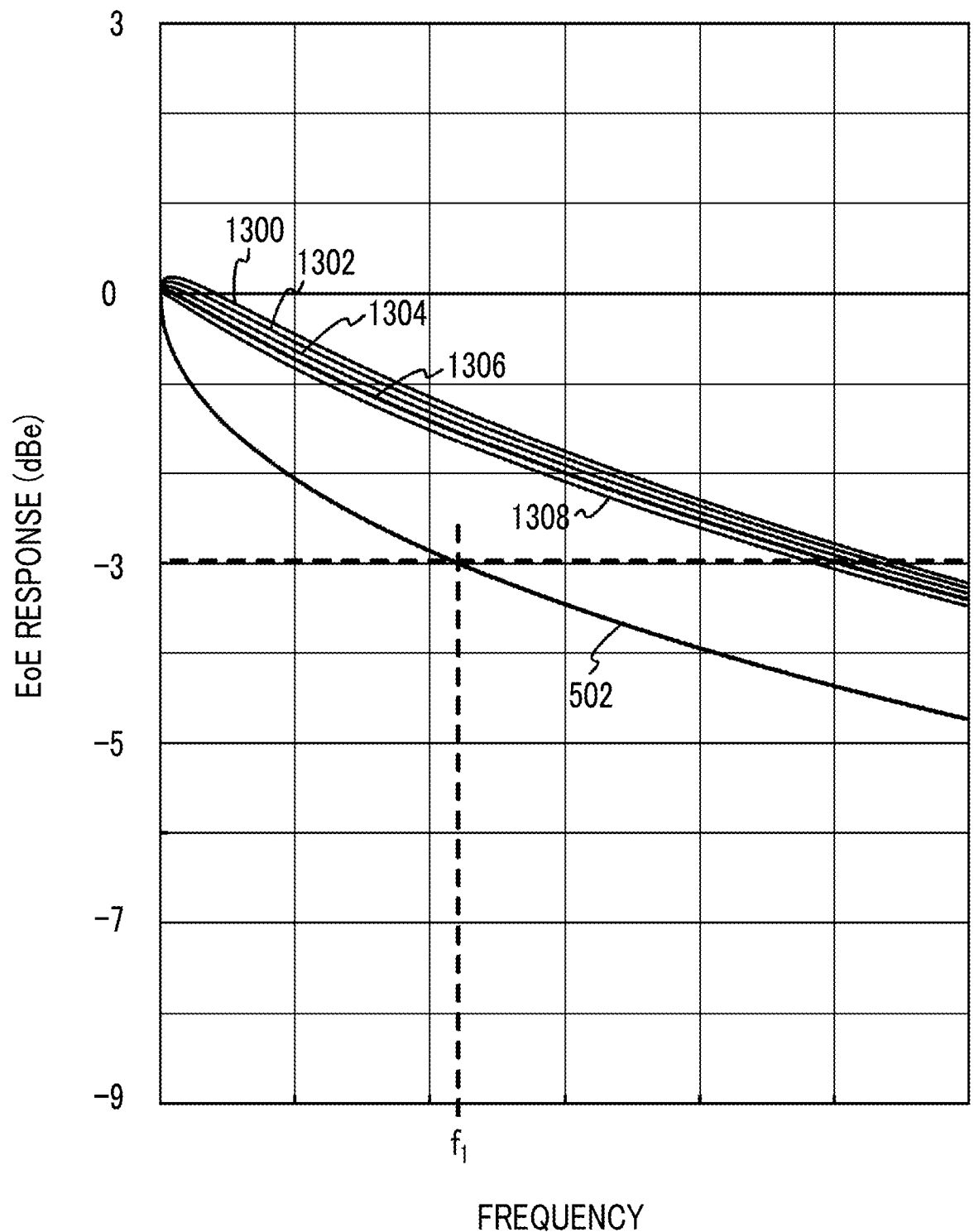
FIG. 13 is a third view illustrating an improved effect of the frequency response in the optical modulation element illustrated in FIG. 6.

FIGS. 11, 12, and 13 illustrate simulation results of the frequency response of the optical modulation element 100-2 illustrated in FIG. 10, and each illustrates the frequency response in a case of g=n=1, 2, and 4. As in FIG. 5, the horizontal axis in FIGS. 11, 12, and 13 represents the frequency of the electrical signal input to the control electrode 106-3, and the vertical axis represents the EOE response. In addition, in FIGS. 11, 12, and 13, as in FIG. 5, each of $\alpha 1$ and $\alpha 2$ is proportional to the square root of the frequency of the electrical signal. Therefore, m is a parameter having no frequency dependence.

In addition, a1 is equal to $\alpha$ in FIGS. 1, 3, and 6, and conforms to Equation (5). At the frequency $f_1$ providing the 3 dB band of the optical modulation element 200 having the configuration in the related art illustrated in FIG. 2, $\alpha_0$ of Equation (5) is adjusted so that the A value (that is, the voltage attenuation ratio in a range of the length L from the input end 108-3d of the second modulation section 108-3a) of the optical modulation element 100-3 illustrated in FIG. 10 is 0.5.

Each of lines 1100, 1102, 1104, 1106, and 1108 illustrated in FIG. 11 indicates the EOE response when it is set as m=2.5, 2.0, 1.5, 1.0, and 0.5 in a case of g=n=1. FIG. 11 illustrates the EOE response when it is set as g=n=1, that is, the EOE response when the optical modulation element 100-3 illustrated in FIG. 10 has the same configuration as the optical modulation element 100-2 illustrated in FIG. 8. Accordingly, the lines 1100, 1102, 1104, 1106, and 1108 are the same as the lines 900, 902, 904, 906, and 908 illustrated in FIG. 9. Here, the line 1106 indicating the EOE response of m=1 in FIG. 11 corresponds to the line 500 illustrated in FIG. 5.

Each in FIGS. 12 and 13 illustrates the EOE response when it is set as g=n=2 and g=n=4. Specifically, each of lines 1200, 1202, 1204, 1206, and 1208 illustrated in FIG. 12 indicates the EOE response when it is set as m=2.5, 2.0, 1.5, 1.0, and 0.5 in a case of g=n=2. Each of lines 1300, 1302, 1304, 1306, and 1308 illustrated in FIG. 13 indicates the EOE response when it is set as m=2.5, 2.0, 1.5, 1.0, and 0.5 in a case of g=n=4.

As is clear from the comparison in FIGS. 11, 12, and 13, as a value of g (or n) is set to be a greater value while a relationship g=n is maintained, the frequency response less depends on an m value. That is, the frequency response is stabilized with respect to fluctuations in the m value.

Second Embodiment

Next, a second embodiment of the present invention will be described. An optical modulation element according to the present embodiment has the same configuration as the optical modulation element 100 according to the first embodiment illustrated in FIG. 1, but is different in that the second modulation section of the modulation section has a U-turn waveguide.

Figure 14:
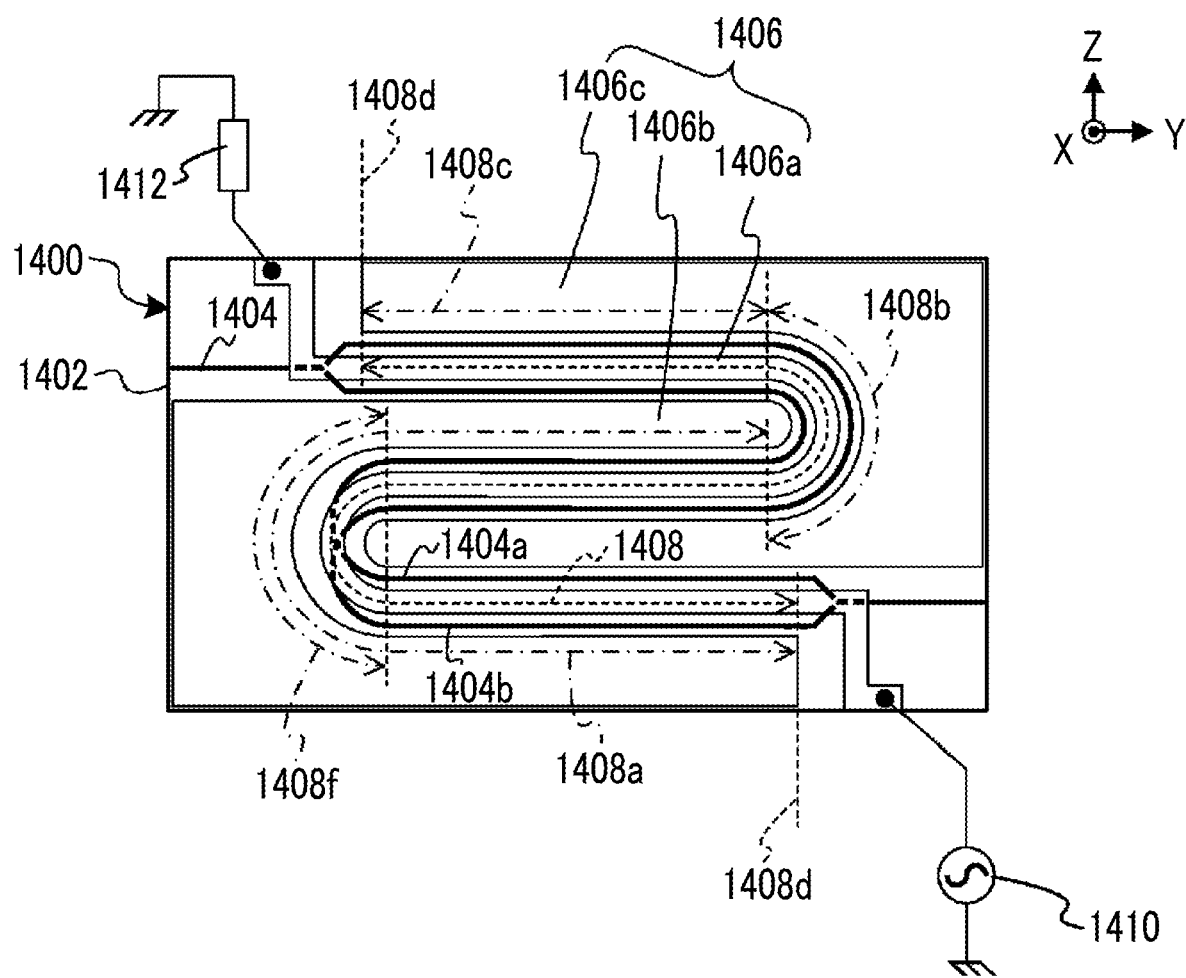
FIG. 14 is a view illustrating a configuration of an optical modulation element according to a second embodiment of the present invention.

FIG. 14 is a view illustrating a configuration of an optical modulation element 1400 according to the second embodiment of the present invention. The optical modulation element 1400 includes an optical waveguide 1404 formed on a substrate 1402 and a control electrode 1406 that controls the light wave propagating through the optical waveguide 1404. As in the substrate 102 of the optical modulation element 100 illustrated in FIG. 1, the substrate 1402 is the X-cut substrate formed of LN, for example. The Z-axis is directed in an upward direction in the drawing, and the Y-axis is directed in a rightward direction in the drawing.

As in the optical waveguide 104 of the optical modulation element 100 illustrated in FIG. 1, the optical waveguide 1404 is the Mach-Zehnder-type optical waveguide, for example, and has two parallel waveguides 1404a and 1404b forming a pair. The control electrode 1406 is a traveling-wave electrode in which an electrical signal (hereinafter, also referred to as a modulation signal) is a traveling wave and propagates in one direction.

The control electrode 1406 is provided along an extending direction of the two parallel waveguides 1404a and 1404b, applies an electric field to the parallel waveguides 1404a and 1404b, and generates a phase change in the light wave propagating through the parallel waveguides 1404a and 1404b. In this manner, for example, input light input from a lower right end portion in the drawing of the substrate 1402 of the optical waveguide 1404 is modulated, and the modulated light is output from an upper left end portion in the drawing.

The control electrode 1406 is composed of a center electrode 1406a and ground electrodes 1406b and 1406c. One end of the center electrode 1406a is connected to a signal source 1410 that generates the modulation signal, and the other end is terminated by a terminator 1412 having a predetermined impedance. In addition, the center electrode 1406a is disposed along the parallel waveguides 1404a and 1404b at a position pinched between the parallel waveguides 1404a and 1404b in a plane of the substrate 102. In this manner, the center electrode 1406a applies the electric field to the parallel waveguides 1404a and 1404b together with the ground electrodes 1406b and 1406c facing each other across the parallel waveguides 1404a and 1404b. In this manner, the electric fields in mutually opposite directions are applied to the parallel waveguides 1404a and 1404b, and phase changes in mutually opposite directions are generated in the light waves propagating through each of the parallel waveguides 1404a and 1404b.

Here, a portion where the control electrode 1406 controls the light waves of the parallel waveguides 1404a and 1404b, that is, a portion which applies the phase changes to the light waves of the parallel waveguides 1404a and 1404b forms a modulation section 1408 (portion in a range indicated by a dashed arrow in the drawing in the center electrode 1406a). The modulation section 1408 has a first modulation section 1408c located within a predetermined distance range (range indicated by a dashed-dotted arrow in the drawing) from an end portion 1408e which is a downstream side end portion along the propagation direction of the traveling wave propagating through the control electrode 1406, and a second modulation section 1408a located within a predetermined distance range (range indicated by a dashed-dotted arrow in the drawing) from an input end 1408d of the upstream side electrical signal along the propagation direction. Here, the predetermined distance range means a range where the signs of the phase changes of the generated light are the same in each of the parallel waveguides 1404a and 1404b, when the direct current voltage is applied between the center electrode 1406a and the ground electrodes 1406b and 1406c.

In addition, as in the modulation section 108 of the optical modulation element 100 illustrated in FIGS. 1 and 3, the modulation section 1408 includes a U-turn waveguide 1408b (range indicated by a dashed-dotted arrow in the drawing) which is a first U-turn waveguide in which the light propagation direction is inverted. In this manner, the control electrode 1406 and the optical waveguide 1404 are configured so that the phase change generated in the light wave of the parallel waveguides 1404a and 1404b in the first modulation section 1408c of the modulation section 1408 has a sign opposite to a sign of the phase change generated in the second modulation section 1408a.

In particular, in the optical modulation element 1400, the second modulation section 1408a of the modulation section 1408 includes a U-turn waveguide 1408f (range indicated by a dashed-dotted arrow in the drawing) which is a second U-turn waveguide where the light propagation direction is inverted. The parallel waveguides 1404a and 1404b forming a pair intersect with each other in the U-turn waveguide 1408f. In this manner, in the second modulation section 1408a, the signs of the phase changes generated in the light waves of the parallel waveguides 1404a and 1404b before and after the U-turn waveguide 1408f are not opposite to each other. The phase change in each constant direction is induced in the parallel waveguides 1404a and 1404b by the control electrode 1406.

Therefore, as in the optical modulation element 100, in the optical modulation element 1400, the phase change in the constant direction is also generated in the parallel waveguides 1404a and 1404b in the second modulation section 1408a of the modulation section 1408, and the phase change in which the sign is opposite to the sign of the phase changes is generated in the parallel waveguides 1404a and 1404b in the first modulation section 1408c.

As in the optical modulation element 100, the optical modulation element 1400 having the above-described configuration is configured so that the phase change generated in the light waves of the parallel waveguides 1404a and 1404b in the first modulation section 1408c of the modulation section 1408 has the sign opposite to the sign of the phase change generated in the second modulation section 1408a. Therefore, according to a principle the same as that of the optical modulation element 100, the operation frequency band is widened, compared to the optical modulation element 200 in the related art illustrated in FIG. 2.

In addition, in the optical modulation element 1400, the second modulation section 1408a of the modulation section 1408 is composed of the U-turn waveguide 1408f. Therefore, a size in a rightward-leftward direction in the drawing can be reduced, compared to the optical modulation element 100 (FIG. 1) according to the first embodiment.

Third Embodiment

Next, a third embodiment of the present invention will be described. Unlike the optical modulation element 100 according to the first embodiment illustrated in FIG. 1, in an optical modulation element according to the present embodiment, the modulation section does not include the U-turn waveguide, and is configured to linearly extend. The two parallel waveguides forming the pair intersect with each other in an intermediate portion of the modulation section. In this manner, a configuration is adopted so that the phase changes generated in each of the two parallel waveguides have signs opposite to each other across the intersecting location.

Figure 15:
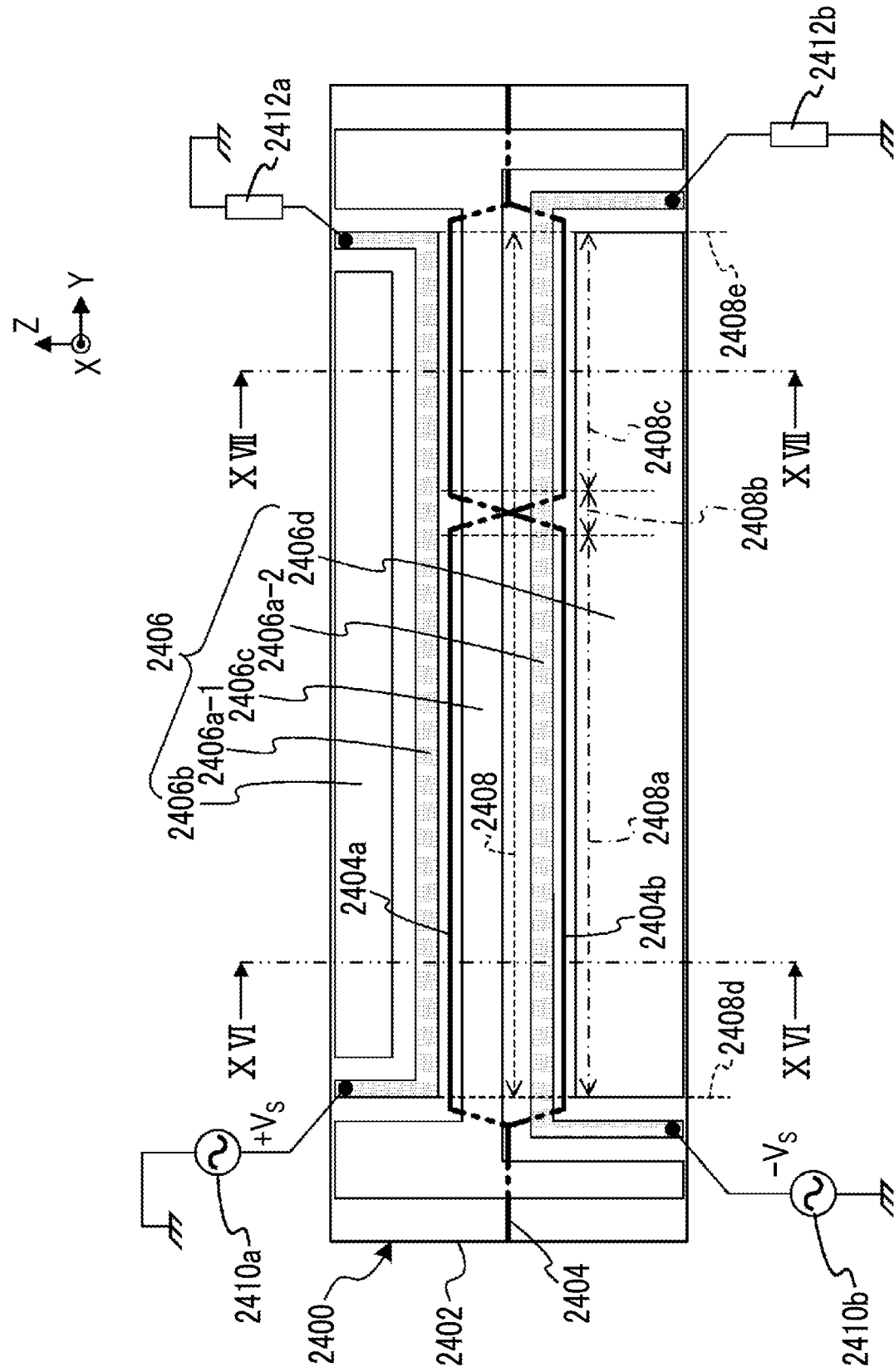
FIG. 15 is a view illustrating a configuration of an optical modulation element according to a third embodiment of the present invention.

FIG. 15 is a view illustrating a configuration of an optical modulation element 2400 according to the third embodiment of the present invention. The optical modulation element 2400 includes an optical waveguide 2404 formed on a substrate 2402 and a control electrode 2406 that controls the light wave propagating through the optical waveguide 2404. As in the substrate 102 of the optical modulation element 100 illustrated in FIG. 1, the substrate 2402 is the X-cut substrate formed of LN, for example. The Z-axis is directed in the upward direction in the drawing, and the Y-axis is directed in the rightward direction in the drawing.

As in the optical waveguide 104 of the optical modulation element 100 illustrated in FIG. 1, the optical waveguide 2404 is the Mach-Zehnder-type optical waveguide, for example, and has two parallel waveguides 2404a and 2404b forming a pair. Unlike the parallel waveguides 104a and 104b, the parallel waveguides 2404a and 2404b do not have the U-turn waveguide, and linearly extend in the Y-axis direction.

The control electrode 2406 is composed of center electrodes 2406a-1 and 2406a-2 and ground electrodes 2406b, 2406c, and 2406d. The ground electrodes 2406b, 2406c, and 2406d are formed at a predetermined constant distance from the center electrodes 2406a-1 and 2406a-2. In this manner, the center electrode 2406a-1 forms a distributed constant line together with the ground electrodes 2406b and 2406c, and the center electrode 2406a-2 forms a distributed constant line together with the ground electrodes 2406c and 2406d.

One end of the center electrode 2406a-1 is connected to a signal source 2410a that generates the modulation signal, and the other end is terminated by a terminator 2412a having a predetermined impedance. In addition, one end of the center electrode 2406a-2 is connected to a signal source 2410b that generates a modulation signal, and the other end is terminated by a terminator 2412b having a predetermined impedance. In this manner, the control electrode 2406 forms a traveling-wave electrode in which the electrical signal (hereinafter, also referred to as the modulation signal) is the traveling wave and propagates in one direction in each of the center electrodes 2406a-1 and 2406a-2. Here, the signal sources 2410a and 2410b output the same modulation signal. However, the signal voltage of the modulation signal output by the signal source 2410b is −Vs in which a curve is inverted with respect to a signal voltage +Vs of the modulation signal output by the signal source 2410a.

The center electrodes 2406a-1 and 2406a-2 are provided along the extending direction of the two parallel waveguides 2404a and 2404b, apply the electric field to each of the parallel waveguides 2404a and 2404b, and generate the phase changes in the light waves propagating through the parallel waveguides 2404a and 2404b. In this manner, for example, the input light input from the left end portion in the drawing of the substrate 2402 of the optical waveguide 2404 is modulated, and the modulated light is output from an end portion on the right side in the drawing.

Here, a portion where the control electrode 2406 controls the light waves of the parallel waveguides 2404a and 2404b, that is, a portion which applies the phase changes to the light waves of the parallel waveguides 2404a and 2404b forms the modulation section 2408 (portion in a range indicated by a dashed arrow in the drawing in the center electrode 2406a). The modulation section 2408 has a first modulation section 2408c located within a predetermined distance range (range indicated by a dashed-dotted arrow in the drawing) from an end portion 2408e which is a downstream side end portion along the propagation direction of the traveling wave propagating through the control electrode 2406, and a second modulation section 2408a located within a predetermined distance range (range indicated by a dashed-dotted arrow in the drawing) from an input end 2408d of the electrical signal on the upstream side along the propagation direction. Here, the predetermined distance range means a range where the signs of the phase changes of the generated light are the same in each of the parallel waveguides 2404a and 2404b, when the direct current voltage is applied between the center electrodes 2406a-1 and 2406a-2 and the ground electrodes 2406b, 2406c, and 2406d.

In addition, the modulation section 2408 has an intersection portion 2408b where the parallel waveguides 2404a and 2404b intersect with each other, between the second modulation section 2408a and the first modulation section 2408c. In this manner, the optical modulation element 2400 is configured so that the phase change generated in the parallel waveguides 2404a and 2404b by the control electrode 2406 in the first modulation section 2408c has a sign opposite to a sign of the phase change in the second modulation section 2408a.

Figure 16:
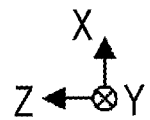
FIG. 16 is a sectional view taken along line XVI-XVI in the optical modulation element illustrated in FIG. 15.
Figure 16:
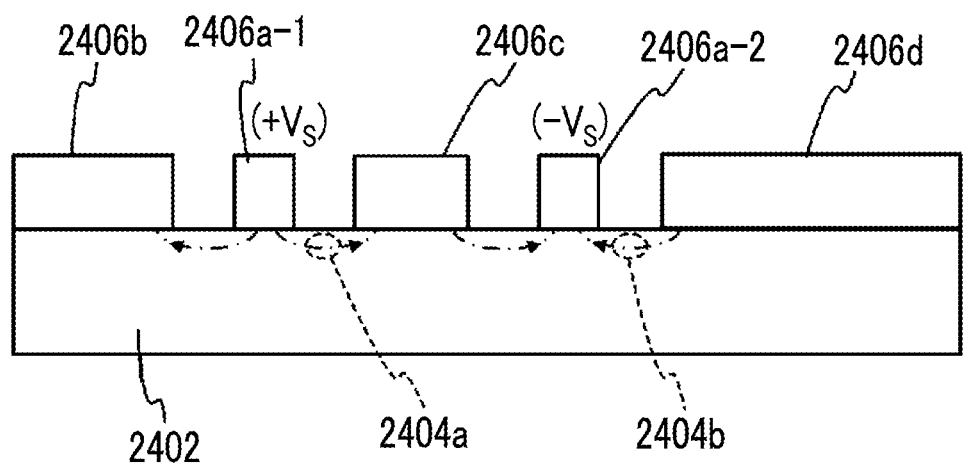
Figure 17:
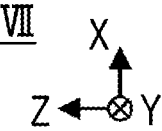
FIG. 17 is a sectional view taken along line XVII-XVII in the optical modulation element illustrated in FIG. 15.
Figure 17:
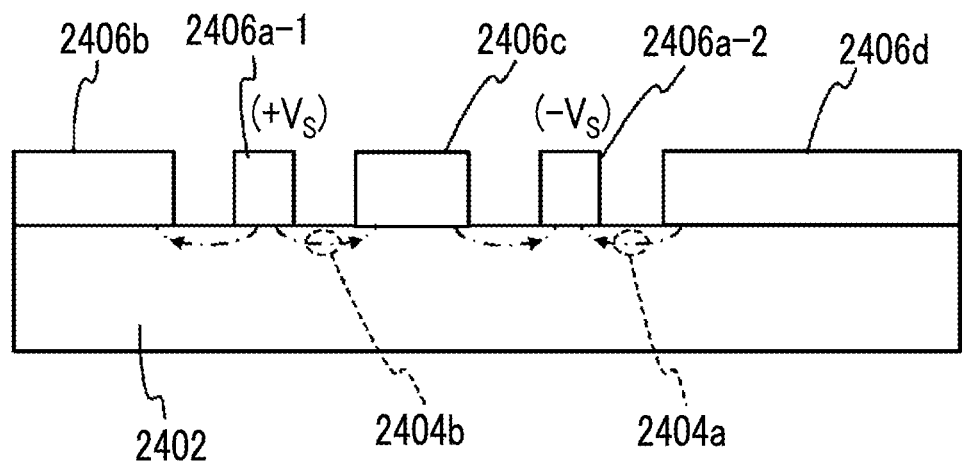

FIG. 16 is a sectional view taken along line XVI-XVI in the optical modulation element 2400 in FIG. 15, that is, a sectional view of the optical modulation element 2400 in the second modulation section 2408a. In addition, FIG. 17 is a sectional view taken along line XVII-XVII in the optical modulation element 2400 in FIG. 15, that is, a sectional view of the optical modulation element 2400 in the first modulation section 2408c.

As illustrated in FIG. 16, in the second modulation section 2408a, each of the parallel waveguides 2404a and 2404b is formed in a portion between the center electrode 2406a-1 and the ground electrode 2406c in the substrate 2402 and a portion between the center electrode 2406a-2 and the ground electrode 2406d. In contrast, in the first modulation section 2408c, on the contrary, as illustrated in FIG. 17, each of the parallel waveguides 2404b and 2404a is formed in a portion between the center electrode 2406a-1 and the ground electrode 2406c in the substrate 2402 and a portion between the center electrode 2406a-2 and the ground electrode 2406d.

In this manner, for example, in the parallel waveguide 2404a, in the second modulation section 2408a, the electric field (dashed-dotted arrow in the drawing) directed rightward in the drawing, that is, directed in the −Z-direction is applied by the center electrode 2406a-1 through which a modulation signal of a signal voltage +Vs propagates as illustrated in FIG. 16. On the other hand, in the first modulation section 2408c, the electric field directed leftward in the drawing, that is, directed in the +Z-direction is applied by the center electrode 2406a-2 through which a modulation signal of a signal voltage −Vs propagates as illustrated in FIG. 17. In this manner, in the parallel waveguide 2404a, the phase change generated in the first modulation section 2408c has a sign opposite to a sign of the phase change generated in the second modulation section 2408a.

Similarly, in the parallel waveguide 2404b, in the second modulation section 2408a, the electric field directed leftward in the drawing, that is, directed in the +Z-direction is applied by the center electrode 2406a-2 through which the modulation signal of the signal voltage −Vs propagates (FIG. 16). On the other hand, in the first modulation section 2408c, the electric field directed rightward in the drawing, that is, directed in the −Z-direction is applied by the center electrode 2406a-1 through which the modulation signal of the signal voltage +Vs propagates (FIG. 17). In this manner, in the parallel waveguide 2404b, the phase change generated in the first modulation section 2408c has a sign opposite to a sign of the phase change generated in the second modulation section 2408a.

As in the optical modulation element 100, the optical modulation element 2400 having the above-described configuration is configured so that the phase change generated in the light waves of the parallel waveguides 2404a and 2404b in the first modulation section 2408c of the modulation section 2408 has the sign opposite to the sign of the phase change generated in the second modulation section 2408a. Therefore, according to a principle the same as that of the optical modulation element 100, the operation frequency band is widened, compared to the optical modulation element 200 in the related art illustrated in FIG. 2.

In addition, in the optical modulation element 2400, the control electrode 2406 and the parallel waveguides 2404a and 2404b which form the modulation section 2408 are formed to linearly extend. Therefore, no bending loss occurs in the electrical signal propagating through the control electrode 2406 and the light wave propagating through the parallel waveguides 2404a and 2404b, and an efficient optical modulation operation having less loss in the electrical signal and the light waves can be realized.

In the configuration in FIG. 15, the control electrode 2406 has the two center electrodes 2406a-1 and 2406a-2, and each of the signal voltages of +Vs and −Vs is applied. The configuration of the control electrode is not limited thereto. For example, as in the control electrode 106 illustrated in FIG. 1, the control electrodes can be composed of one center electrode.

Figure 18:
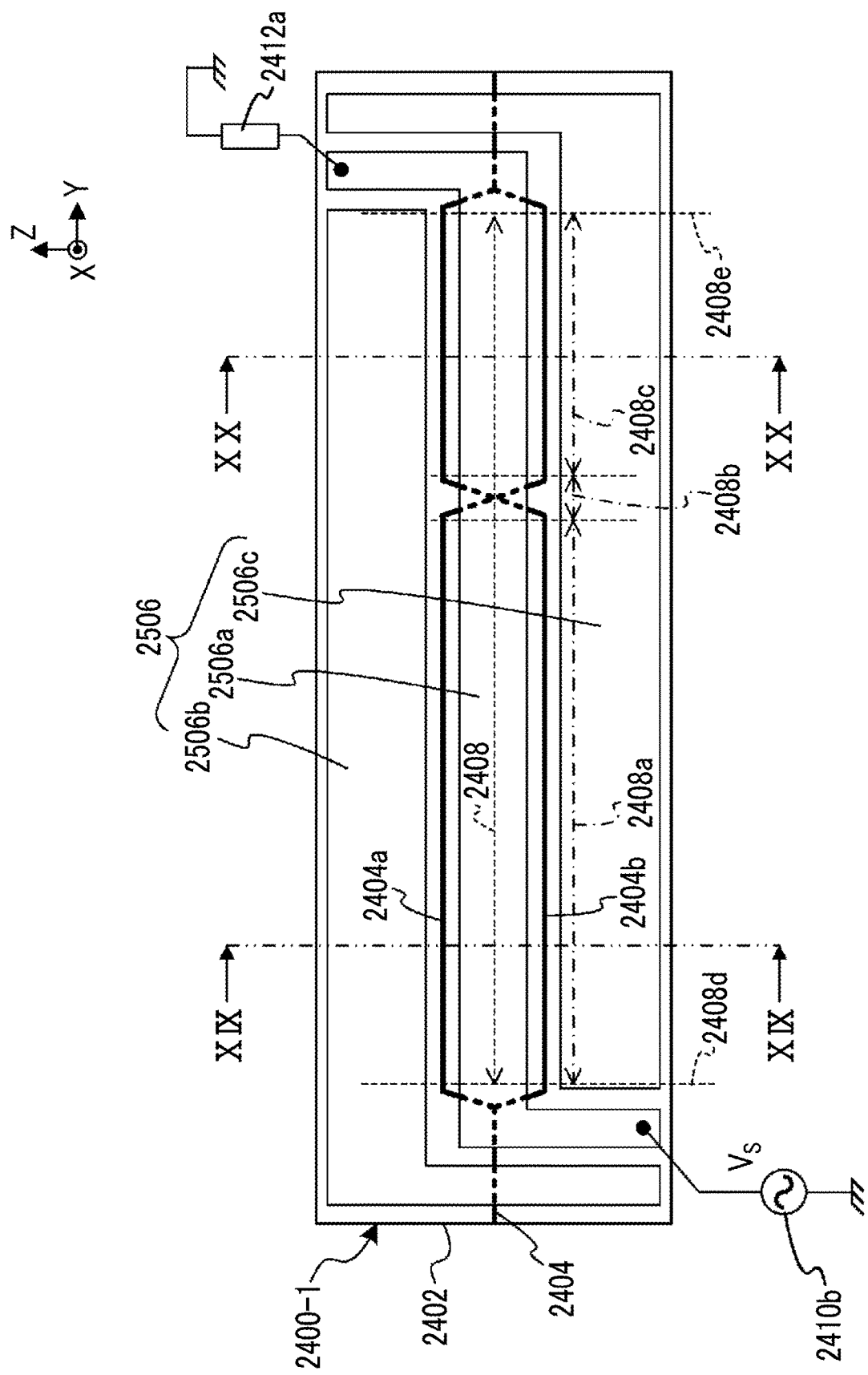
FIG. 18 is a view illustrating a configuration of an optical modulation element according to a modification example of the third embodiment.

An optical modulation element 2400-1 illustrated in FIG. 18 is a modification example of the optical modulation element 2400 according to the third embodiment illustrated in FIG. 15, and includes a control electrode 2506 composed of one center electrode 2506a and two ground electrodes 2506b and 2506c. In FIG. 18, the same reference numerals as those illustrated in FIG. 15 are used to denote the same configuration elements as those of the optical modulation element 2400 illustrated in FIG. 15, description in FIG. described above will be incorporated by reference.

Figure 19:
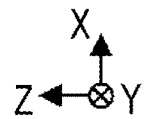
FIG. 19 is a sectional view taken along line XIX-XIX in the optical modulation element illustrated in FIG. 18.
Figure 19:
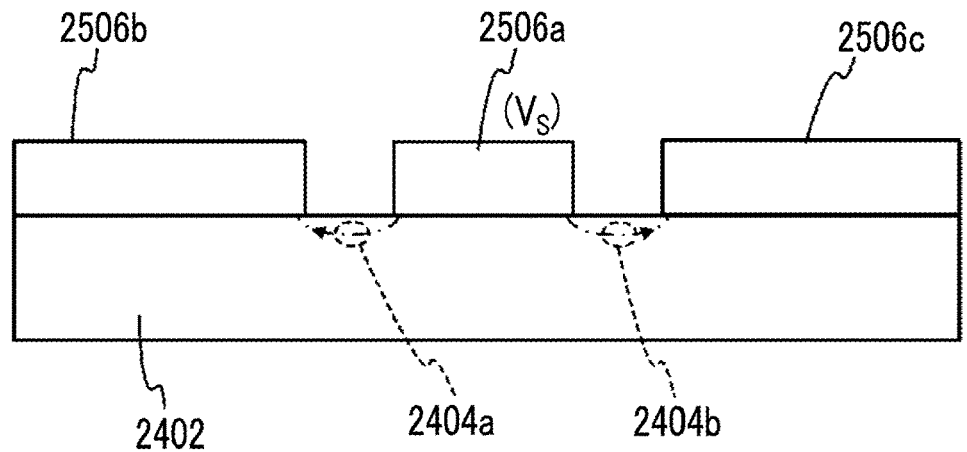
Figure 20:
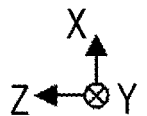
FIG. 20 is a sectional view taken along line XX-XX in the optical modulation element illustrated in FIG. 18.
Figure 20:
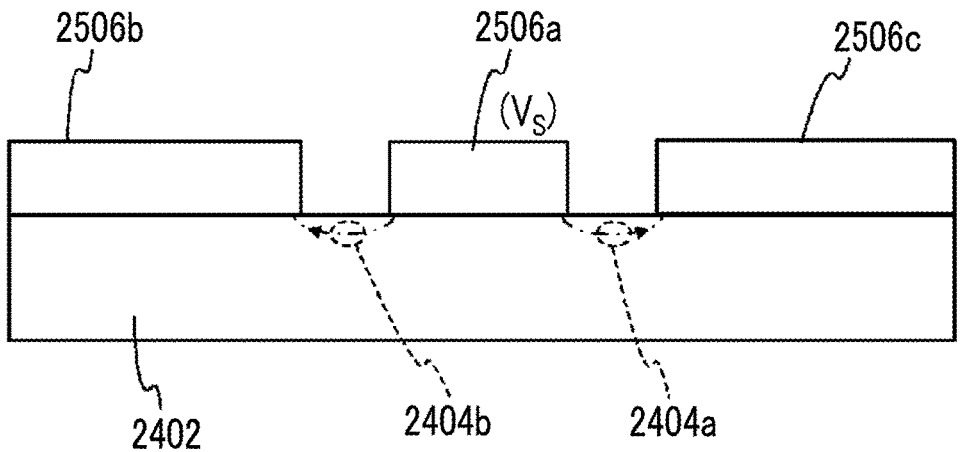

FIG. 19 is a sectional view taken along line XIX-XIX in an optical modulation element 2400-1 in FIG. 18, that is, a sectional view of the optical modulation element 2400-1 in the second modulation section 2408a. In addition, FIG. 20 is a sectional view taken along line XX-XX in the optical modulation element 2400-1 in FIG. 18, that is, a sectional view of the optical modulation element 2400 in the first modulation section 2408c.

As in the optical modulation element 2400, the optical modulation element 2400-1 has an intersection portion 2408b where the parallel waveguides 2404a and 2404b intersect with each other. Therefore, the phase change generated in the parallel waveguides 2404a and 2404b by the control electrode 2506 in the first modulation section 2408c has the sign opposite to the sign of the phase change in the second modulation section 2408a.

Specifically, in the parallel waveguide 2404a, in the second modulation section 2408a illustrated in FIG. 19, the electric field (dashed-dotted arrow in the drawing) directed leftward in the drawing, that is, directed in the +Z-direction is applied between the center electrode 2506a and the ground electrode 2506b. On the other hand, in the first modulation section 2408c illustrated in FIG. 20, the electric field directed rightward in the drawing, that is, directed in the −Z-direction is applied between the center electrode 2506a and the ground electrode 2506c.

In addition, on the other hand, in the parallel waveguide 2404b, on the contrary to parallel waveguide 2404a, in the second modulation section 2408a illustrated in FIG. 19, the electric field directed rightward in the drawing (−Z-direction) is applied. On the other hand, in the first modulation section 2408c illustrated in FIG. 20, the electric field directed leftward in the drawing (+Z-direction) is applied.

As a result, as in the optical modulation element 2400, in the optical modulation element 2400-1, according to a principle the same as that of the optical modulation element 100, the operation frequency band is widened, compared to the optical modulation element 200 in the related art illustrated in FIG. 2.

Fourth Embodiment

Next, a fourth embodiment of the present invention will be described. As in the optical modulation element 2400 according to the third embodiment illustrated in FIG. 18, an optical modulation element according to the present embodiment is configured so that two parallel waveguides forming the modulation section linearly extend without including the U-turn waveguide, and the control electrode composed of two center electrodes and three ground electrodes is also linearly formed in the modulation section. However, in the optical modulation element according to the present embodiment, unlike the optical modulation element 2400 according to the third embodiment, the two parallel waveguides do not include portions which intersect with each other, and each is composed of two portions in which application directions of the electric fields applied from the control electrode are opposite to each other.

Figure 21:
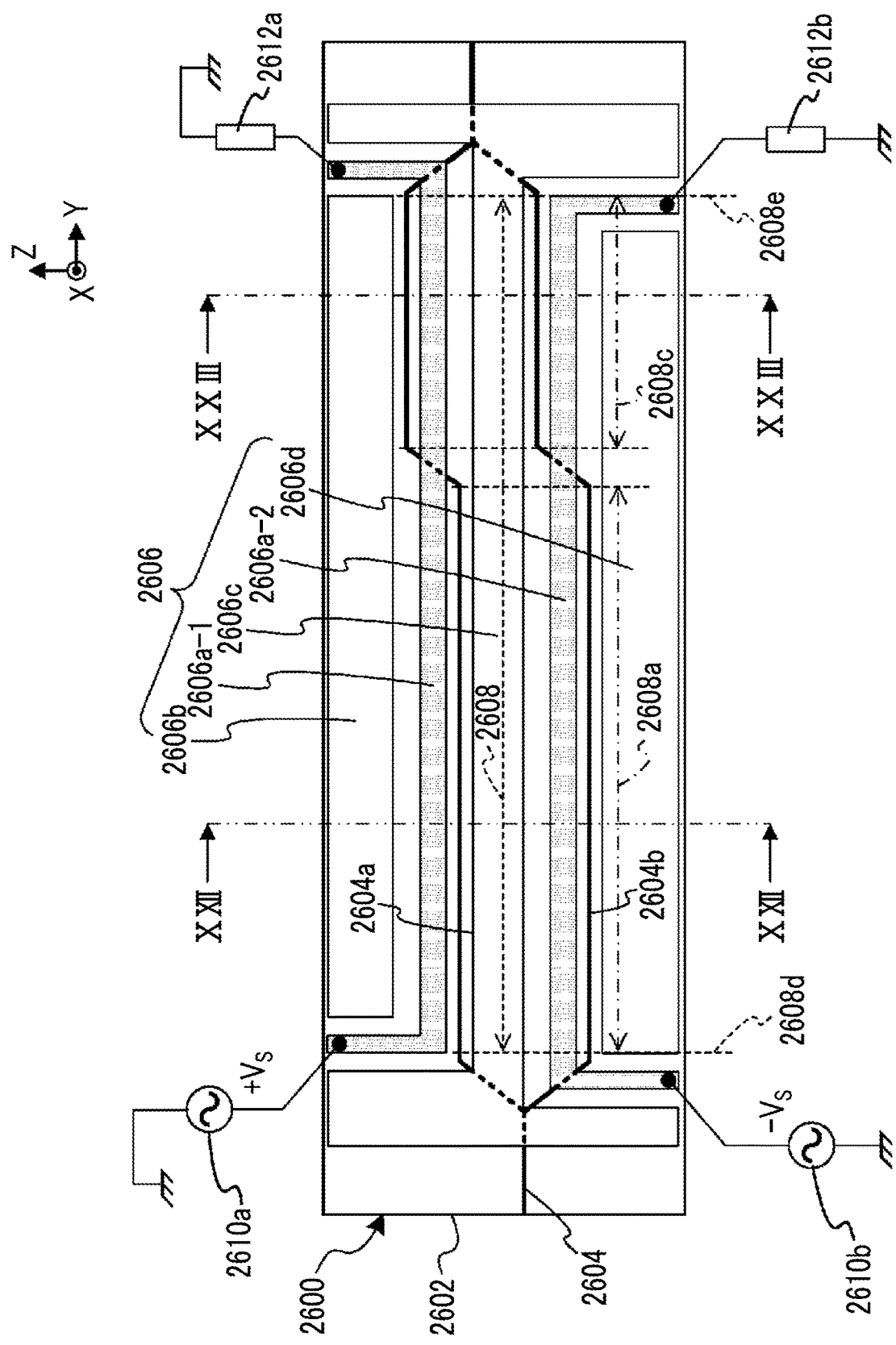
FIG. 21 is a view illustrating a configuration of an optical modulation element according to a fourth embodiment of the present invention.

FIG. 21 is a view illustrating a configuration of an optical modulation element 2600 according to the fourth embodiment of the present invention. The optical modulation element 2600 includes an optical waveguide 2604 formed on a substrate 2602 and a control electrode 2606 that controls the light wave propagating through the optical waveguide 2604. As in the substrate 102 of the optical modulation element 100 illustrated in FIG. 1, the substrate 2602 is the X-cut substrate formed of LN, for example. The Z-axis is directed in the upward direction in the drawing, and the Y-axis is directed in the rightward direction in the drawing.

As in the optical waveguide 104 of the optical modulation element 100 illustrated in FIG. 1, the optical waveguide 2604 is the Mach-Zehnder-type optical waveguide, for example, and has two parallel waveguides 2604a and 2604b forming a pair. However, unlike the parallel waveguides 104a and 104b, the parallel waveguides 2604a, 2604b do not have the intersection portion.

The control electrode 2606 is composed of two center electrodes 2606a-1 and 2606a-2 and three ground electrodes 2606b, 2606c, and 2606d. The ground electrodes 2606b, 2606c, and 2606d are formed at a predetermined constant distance from the center electrodes 2606a-1 and 2606a-2. In this manner, the center electrode 2606a-1 forms a distributed constant line together with the ground electrodes 2606b and 2606c, and the center electrode 2606a-2 forms a distributed constant line together with the ground electrodes 2606c and 2606d.

One end of the center electrode 2606a-1 is connected to a signal source 2610a that generates the modulation signal, and the other end is terminated by a terminator 2612a having a predetermined impedance. In addition, one end of the center electrode 2606a-2 is connected to a signal source 2610b that generates the modulation signal, and the other end is terminated by a terminator 2612b having a predetermined impedance. In this manner, the control electrode 2606 forms the traveling-wave electrode in which the electrical signal (hereinafter, also referred to as the modulation signal) is the traveling wave and propagates in one direction in each of the center electrodes 2606a-1 and 2606a-2. Here, the signal sources 2610a and 2610b output the same modulation signal. However, the signal voltage of the modulation signal output by the signal source 2610b is −Vs in which a curve is inverted with respect to the signal voltage +Vs of the modulation signal output by the signal source 2610a.

The center electrodes 2606a-1 and 2606a-2 are linearly provided along the extending direction of the two parallel waveguides 2604a and 2604b, apply the electric field to each of the parallel waveguides 2604a and 2604b, and generate the phase changes in the light waves propagating through the parallel waveguides 2604a and 2604b. In this manner, for example, the input light input from the left end portion in the drawing of the substrate 2602 of the optical waveguide 2604 is modulated, and the modulated light is output from an end portion on the right side in the drawing.

Here, a portion where the control electrode 2606 controls the light waves of the parallel waveguides 2604a and 2604b, that is, a portion which applies the phase changes to the light waves of the parallel waveguides 2604a and 2604b forms the modulation section 2608 (portion in a range indicated by a dashed arrow in the drawing in the center electrode 2606a). The modulation section 2608 has a first modulation section 2608c located within a predetermined distance range (range indicated by a dashed-dotted arrow in the drawing) from an end portion 2608e which is a downstream side end portion along the propagation direction of the traveling wave propagating through the control electrode 2606, and a second modulation section 2608a located within a predetermined distance range (range indicated by a dashed-dotted arrow in the drawing) from an input end 2608d of the electrical signal on the upstream side along the propagation direction. Here, the predetermined distance range means a range where the signs of the phase changes of the generated light are the same in each of the parallel waveguides 2604a and 2604b, when the direct current voltage is applied between the center electrodes 2606a-1 and 2606a-2 and the ground electrodes 2606b, 2606c, and 2606d.

In the present embodiment, the two parallel waveguides 2604a and 2604b do not include portions which intersect with each other, and each is composed of two portions each formed at two positions on the substrate 2602 in which application directions of the electric fields applied from the control electrode 2606 are opposite to each other.

Specifically, the parallel waveguide 2604a is formed along the center electrode 2606a-1 to which the signal voltage +Vs is applied, and has a portion intersecting with the center electrode 2606a-1 by changing the light propagation direction between the second modulation section 2608a and the first modulation section 2608c. In this manner, the parallel waveguide 2604a is composed of a portion formed between the center electrode 2606a-1 and the ground electrode 2606c in the second modulation section 2608a and in which the electric field is applied downward in the drawing (−Z-direction), and a portion formed between the center electrode 2606a-1 and the ground electrode 2606b in the first modulation section 2608c and in which the electric field is applied upward in the drawing (+Z-direction).

In addition, the parallel waveguide 2604b is formed along the center electrode 2606a-2 to which the signal voltage −Vs is applied, and has a portion intersecting with the center electrode 2606a-2 by changing the light propagation direction between the second modulation section 2608a and the first modulation section 2608c. In this manner, the parallel waveguide 2604b is composed of a portion formed between the center electrode 2606a-2 and the ground electrode 2606d in the second modulation section 2608a and in which the electric field is applied upward in the drawing (+Z-direction), and a portion formed between the center electrode 2606a-2 and the ground electrode 2606c in the first modulation section 2608c and in which the electric field is applied downward in the drawing (−Z-direction).

According to the above-described configuration, the optical modulation element 2600 is configured so that the phase change generated in the parallel waveguides 2604a and 2604b by the control electrode 2606 in the first modulation section 2608c has the sign opposite to the sign of the phase change in the second modulation section 2608a.

Figure 22:
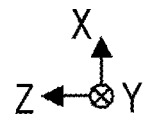
FIG. 22 is a sectional view taken along line XXII-XXII in the optical modulation element illustrated in FIG. 21.
Figure 22:
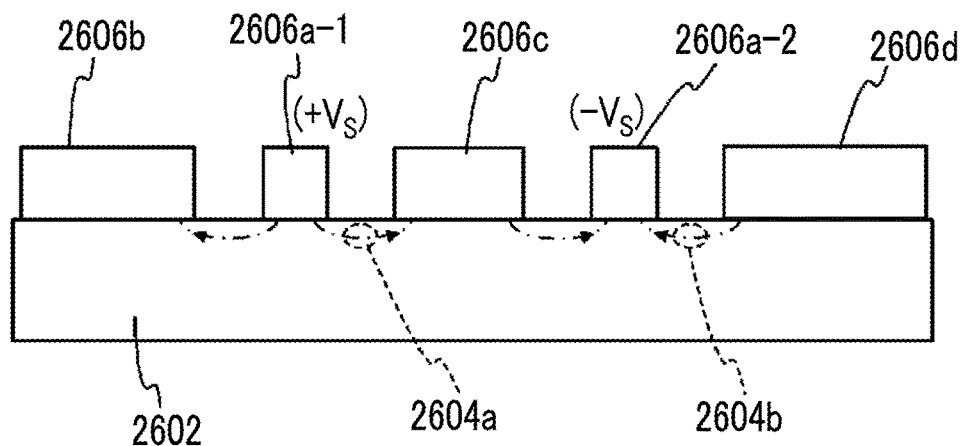

FIG. 22 is a sectional view taken along line XXII-XXII in the optical modulation element 2600 in FIG. 21, that is, a sectional view of the optical modulation element 2600 in the second modulation section 2608a. In addition, FIG. 23 is a sectional view taken along line XXIII-XXIII in the optical modulation element 2600 in FIG. 21, that is, a sectional view of the optical modulation element 2600 in the first modulation section 2608c.

Figure 23:
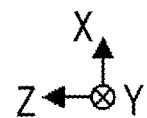
FIG. 23 is a sectional view taken along line XXIII-XXIII in the optical modulation element illustrated in FIG. 21.
Figure 23:
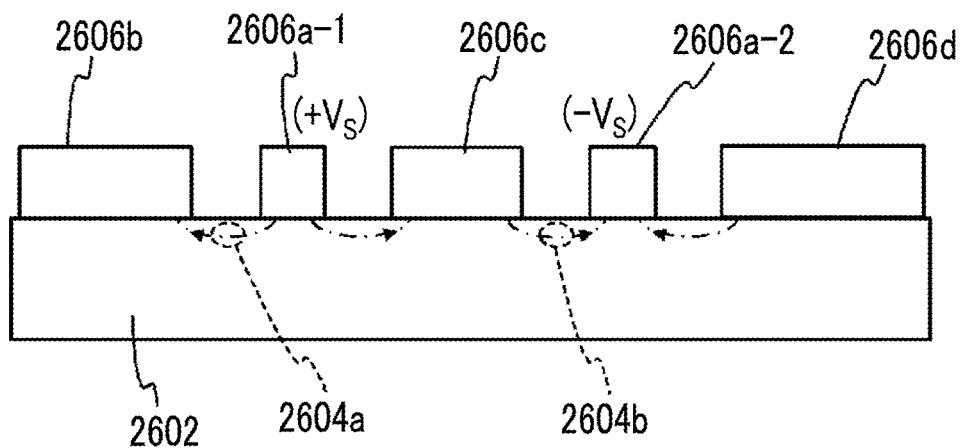

In the parallel waveguide 2604a, in the second modulation section 2608a, the electric field is applied rightward in the drawing (−Z-direction) to a portion between the center electrode 2606a-1 and the ground electrode 2606c as illustrated in FIG. 22, and in the first modulation section 2608c, the electric field is applied leftward in the drawing (+Z-direction) to a portion between the center electrode 2606a-1 and the ground electrode 2606b as illustrated in FIG. 23. In this manner, in the parallel waveguide 2604a, the phase change generated in the first modulation section 2608c has the sign opposite to the sign of the phase change generated in the second modulation section 2608a.

On the other hand, the parallel waveguide 2604b, on the contrary, in the second modulation section 2608a, the electric field is applied leftward in the drawing (+Z-direction) to a portion between the center electrode 2606a-2 and the ground electrode 2606d as illustrated in FIG. 22, and in the first modulation section 2608c, the electric field is applied rightward in the drawing (−Z-direction) to a portion between the center electrode 2606a-2 and the ground electrode 2606c as illustrated in FIG. 23. In this manner, in the parallel waveguide 2604b, the phase change generated in the first modulation section 2608c also has the sign opposite to the sign of the phase change generated in the second modulation section 2608a.

As in the optical modulation element 100, the optical modulation element 2600 having the above-described configuration is configured so that the phase change generated in the light waves of the parallel waveguides 2604a and 2604b in the first modulation section 2608c of the modulation section 2608 has the sign opposite to the sign of the phase change generated in the second modulation section 2608a. Therefore, according to a principle the same as that of the optical modulation element 100, the operation frequency band is widened, compared to the optical modulation element 200 in the related art illustrated in FIG. 2.

In addition, in the optical modulation element 2600, as in the optical modulation element 2400 according to the third embodiment, the control electrode 2606 and the parallel waveguides 2604a and 2604b which form the modulation section 2608 are formed to linearly extend. Therefore, no bending loss occurs in the electrical signal propagating through the control electrode 2606 and the light waves propagating through the parallel waveguides 2604a and 2604b, and an efficient optical modulation operation having less loss in the electrical signal and the light waves can be realized. Furthermore, in the optical modulation element, the parallel waveguides 2604a and 2604b do not include a portion where both intersect with each other, and the propagating lights do not interfere with each other. Therefore, a more satisfactory optical modulation operation can be realized by maintaining a high extinction ratio of the modulated light.

Fifth Embodiment

Next, a fifth embodiment of the present invention will be described. In an optical modulation element according to the present embodiment, as in the optical modulation element 2600 according to the fourth embodiment illustrated in FIG. 21, two parallel waveguides forming the modulation section are configured to linearly extend without including the intersection portion. The control electrode composed of two center electrodes and three ground electrodes is also linearly formed in the modulation section.

However, in the optical modulation element according to the present embodiment, unlike the optical modulation element 2600 according to the fourth embodiment, the two parallel waveguides do not include a portion that changes the light propagation direction. Each of the two center electrodes of the control electrode is formed to intersect one of the parallel waveguides by changing the propagation direction of the electrical signal between the second modulation section and the first modulation section. In this manner, in the optical modulation element according to the present embodiment, as in the optical modulation element 2600 according to the fourth embodiment, each of the two parallel waveguides is composed of two portions where the electric fields applied from the control electrodes are directed in mutually opposite directions.

Figure 24:
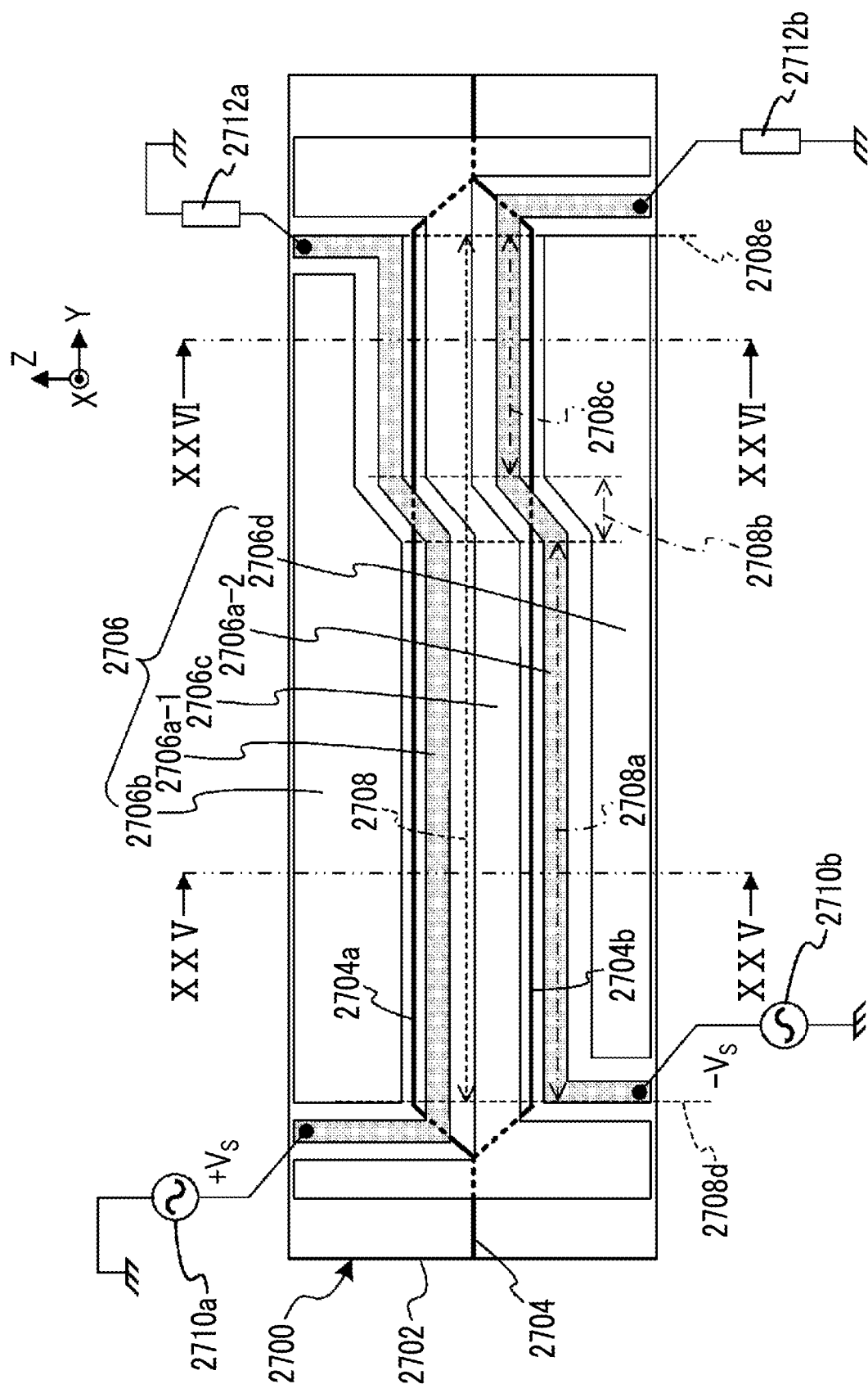
FIG. 24 is a view illustrating a configuration of an optical modulation element according to a fifth embodiment of the present invention.

FIG. 24 is a view illustrating a configuration of an optical modulation element 2700 according to the fifth embodiment of the present invention. The optical modulation element 2700 includes an optical waveguide 2704 formed on a substrate 2702 and a control electrode 2706 that controls the light wave propagating through the optical waveguide 2704. As in the substrate 102 of the optical modulation element 100 illustrated in FIG. 1, the substrate 2702 is the X-cut substrate formed of LN, for example. The Z-axis is directed in the upward direction in the drawing, and the Y-axis is directed in the rightward direction in the drawing.

As in the optical waveguide 104 of the optical modulation element 100 illustrated in FIG. 1, the optical waveguide 2704 is the Mach-Zehnder-type optical waveguide, for example, and has two parallel waveguides 2704a and 2704b forming a pair. The parallel waveguides 2704a and 2704b do not have the intersection portion, unlike the parallel waveguides 104a and 104b.

The control electrode 2706 is composed of two center electrodes 2706a-1 and 2706a-2 and three ground electrodes 2706b, 2706c, and 2706d. The ground electrodes 2706b, 2706c, and 2706d are formed at a predetermined constant distance from the center electrodes 2706a-1 and 2706a-2. In this manner, the center electrode 2706a-1 forms a distributed constant line together with the ground electrodes 2706b and 2706c, and the center electrode 2706a-2 forms a distributed constant line together with the ground electrodes 2706c and 2706d.

One end of the center electrode 2706a-1 is connected to a signal source 2710a that generates the modulation signal, and the other end is terminated by a terminator 2712a having a predetermined impedance. In addition, one end of the center electrode 2706a-2 is connected to a signal source 2710b that generates the modulation signal, and the other end is terminated by a terminator 2712b having a predetermined impedance. In this manner, the control electrode 2706 forms a traveling-wave electrode in which the electrical signal (hereinafter, also referred to as the modulation signal) is a traveling wave and propagates in one direction in each of the center electrodes 2706a-1 and 2706a-2. Here, the signal sources 2710a and 2710b output the same modulation signal. However, the signal voltage of the modulation signal output by the signal source 2710b is −Vs in which a curve is inverted with respect to the signal voltage +Vs of the modulation signal output by the signal source 2710a.

The center electrodes 2706a-1 and 2706a-2 are linearly provided along the extending direction of the two parallel waveguides 2704a and 2704b, apply the electric field to each of the parallel waveguides 2704a and 2704b, and generate the phase change in the light waves propagating through the parallel waveguides 2704a and 2704b. In this manner, for example, the input light input from the left end portion in the drawing of the substrate 2702 of the optical waveguide 2704 is modulated, and the modulated light is output from an end portion on the right side in the drawing.

Here, a portion where the control electrode 2706 controls the light waves of the parallel waveguides 2704a and 2704b, that is, a portion which applies the phase change to the light waves of the parallel waveguides 2704a and 2704b forms a modulation section 2708 (portion in a range indicated by a dashed arrow in the drawing in the center electrode 2706a). The modulation section 2708 has a first modulation section 2708c located within a predetermined distance range (range indicated by a dashed-dotted arrow in the drawing) from an end portion 2708e which is a downstream side end portion along the propagation direction of the traveling wave propagating through the control electrode 2706, and a second modulation section 2708a located within a predetermined distance range (range indicated by a dashed-dotted arrow in the drawing) from an input end 2708d of the electrical signal on the upstream side along the propagation direction. Here, the predetermined distance range means a range where the signs of the phase changes of the generated light are the same in each of the parallel waveguides 2704a and 2704b, when the direct current voltage is applied between the center electrodes 2706a-1 and 2706a-2 and the ground electrodes 2706b, 2706c, and 2706d.

However, in the optical modulation element according to the present embodiment, unlike the optical modulation element 2600 according to the fourth embodiment, the two parallel waveguides 2704a and 2704b do not include a portion that changes the light propagation direction. Each of the two center electrodes 2706a-1 and 2706a-2 of the control electrode 2706 is formed to intersect one of the parallel waveguides 2704a and 2704b by changing the propagation direction of the electrical signal between the second modulation section 2708a and the first modulation section 2708c. In this manner, in the optical modulation element 2700 according to the present embodiment, as in the optical modulation element 2600 according to the fourth embodiment, each of the two parallel waveguides 2704a and 2704b is composed of two portions where the electric fields applied from the control electrodes 2706 are directed in mutually opposite directions.

Specifically, the center electrode 2706a-1 to which the signal voltage +Vs is applied is formed along the parallel waveguide 2704a. The center electrode 2706a-1 is formed to intersect with the parallel waveguide 2704a by changing the propagation direction of the electrical signal in a transition portion 2708b between the second modulation section 2708a and the first modulation section 2708c. In this manner, in the parallel waveguide 2704a, in the second modulation section 2708a, the electric field is applied upward (+Z-direction) in the drawing in FIG. 24 between the center electrode 2706a-1 and the ground electrode 2706b, and in the first modulation section 2708c, the electric field is applied downward (−Z-direction) in the drawing between the center electrode 2706a-1 and the ground electrode 2706c.

On the other hand, the center electrode 2706a-2 to which the signal voltage −Vs is applied is formed along the parallel waveguide 2704b, and is formed to intersect with the parallel waveguide 2704b by changing the propagation direction of the electrical signal in the transition portion 2708b. In this manner, in the parallel waveguide 2704b, 2706c in the second modulation section 2708a, the electric field is applied downward (−Z-direction) in the drawing between the center electrode 2706a-2 and the ground electrode and, and in the first modulation section 2708c, the electric field is applied upward (+Z-direction) between the center electrode 2706a-2 and the ground electrode 2706d.

As a result, the optical modulation element 2700 is configured so that the phase change generated in the parallel waveguides 2704a and 2704b by the control electrode 2706 in the first modulation section 2708c has the sign opposite to the sign of the phase change in the second modulation section 2708a.

Figure 25:
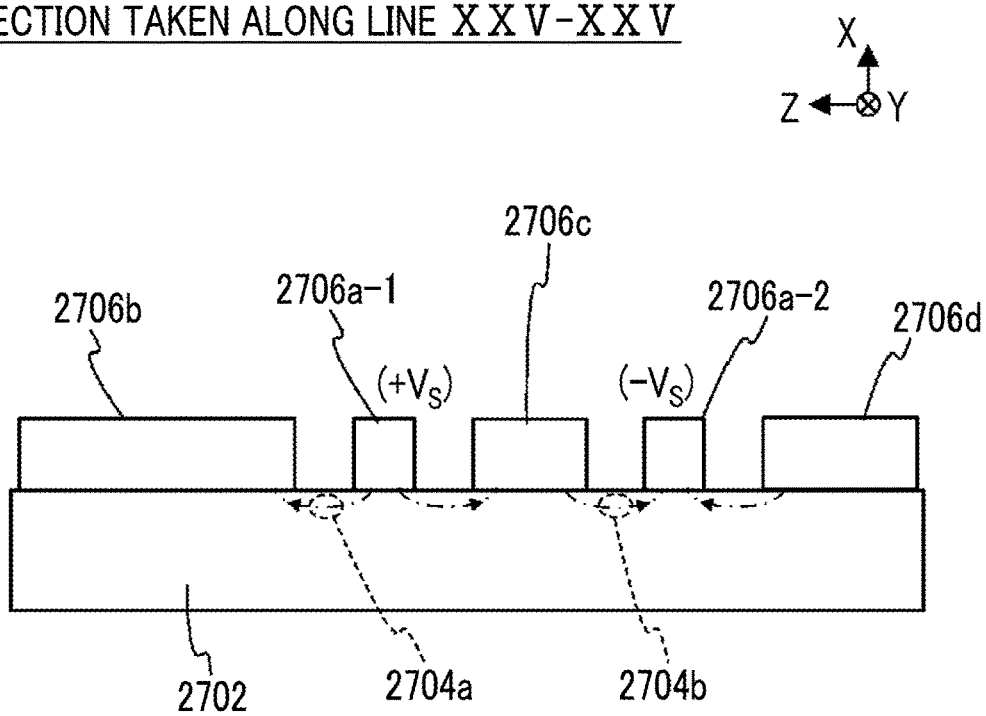
FIG. 25 is a sectional view taken along line XXV-XXV in the optical modulation element illustrated in FIG. 24.
Figure 26:
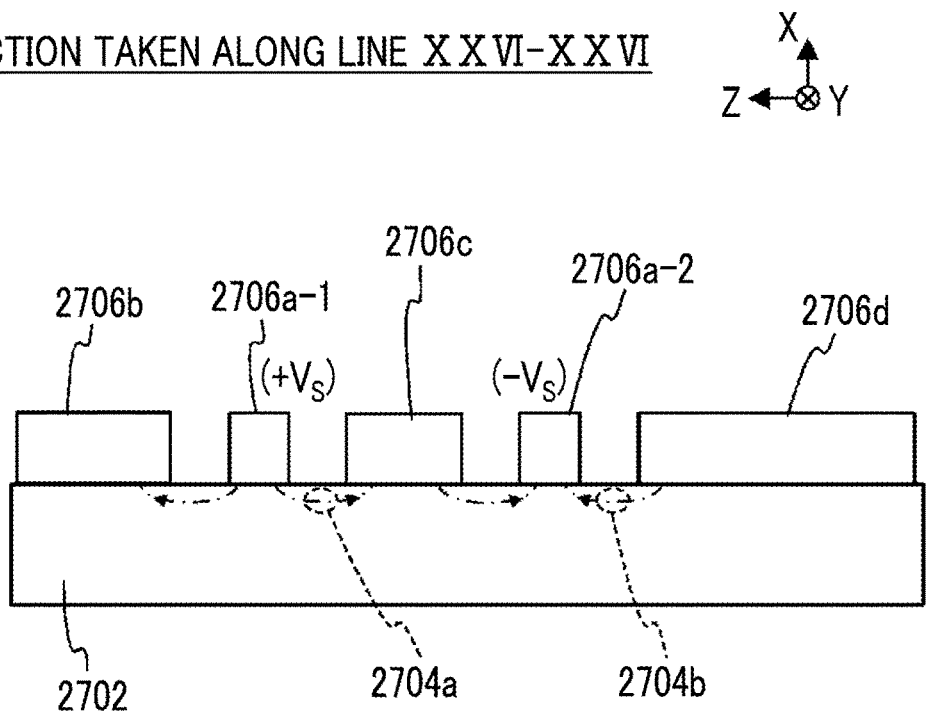
FIG. 26 is a sectional view taken along line XXVI-XXVI in the optical modulation element illustrated in FIG. 24.

FIG. 25 is a sectional view taken along line XXV-XXV in the optical modulation element 2700 in FIG. 24, that is, a sectional view of the optical modulation element 2700 in the second modulation section 2708a. FIG. 26 is a sectional view taken along line XXVI-XXVI in the optical modulation element 2700 in FIG. 24, that is, a sectional view of the optical modulation element 2700 in the first modulation section 2708c.

In the parallel waveguide 2704a, in the second modulation section 2708a, the electric field is applied leftward (+Z-direction) in the drawing between the center electrode 2706a-1 and the ground electrode 2706b as illustrated in FIG. 25, and in the first modulation section 2708c, the electric field is applied rightward (−Z-direction) in the drawing between the center electrode 2706a-1 and the ground electrode 2706c as illustrated in FIG. 26. In this manner, in the parallel waveguide 2704a, the phase change generated in the first modulation section 2708c has the sign opposite to the sign of the phase change generated in the second modulation section 2708a.

On the other hand, in the parallel waveguide 2704b, on the contrary, in the second modulation section 2708a, the electric field is applied rightward (−Z-direction) in the drawing between the center electrode 2706a-2 and the ground electrode 2706c as illustrated in FIG. 25, and in the first modulation section 2708c, the electric field is applied leftward (+Z-direction) in the drawing between the center electrode 2706a-2 and the ground electrode 2706d as illustrated in FIG. 26. In this manner, in the parallel waveguide 2704b, the phase change generated in the first modulation section 2708c has the sign opposite to the sign of the phase change generated in the second modulation section 2708a.

As in the optical modulation element 100, the optical modulation element 2700 having the above-described configuration is configured so that the phase change generated in the light waves of the parallel waveguides 2704a and 2704b in the first modulation section 2708c of the modulation section 2708 has the sign opposite to the sign of the phase change generated in the second modulation section 2708a. Therefore, according to a principle the same as that of the optical modulation element 100, the operation frequency band is widened, compared to the optical modulation element 200 in the related art illustrated in FIG. 2.

In addition, in the optical modulation element 2700, as in the optical modulation element 2400 according to the fourth embodiment, the parallel waveguides 2704a and 2704b do not include the portion where both intersect with each other, and the propagating lights do not interfere with each other. Therefore, a more satisfactory optical modulation operation can be realized by maintaining a high extinction ratio of the modulated light.

Sixth Embodiment

Next, a sixth embodiment of the present invention will be described. An optical modulation element according to the present embodiment is configured so that the two parallel waveguides forming the modulation section linearly extend without including the U-turn waveguide. In addition, each of the two parallel waveguides is composed of two portions formed to pass through each of two portions on the substrate in which polarization directions are opposite to each other.

Figure 27:
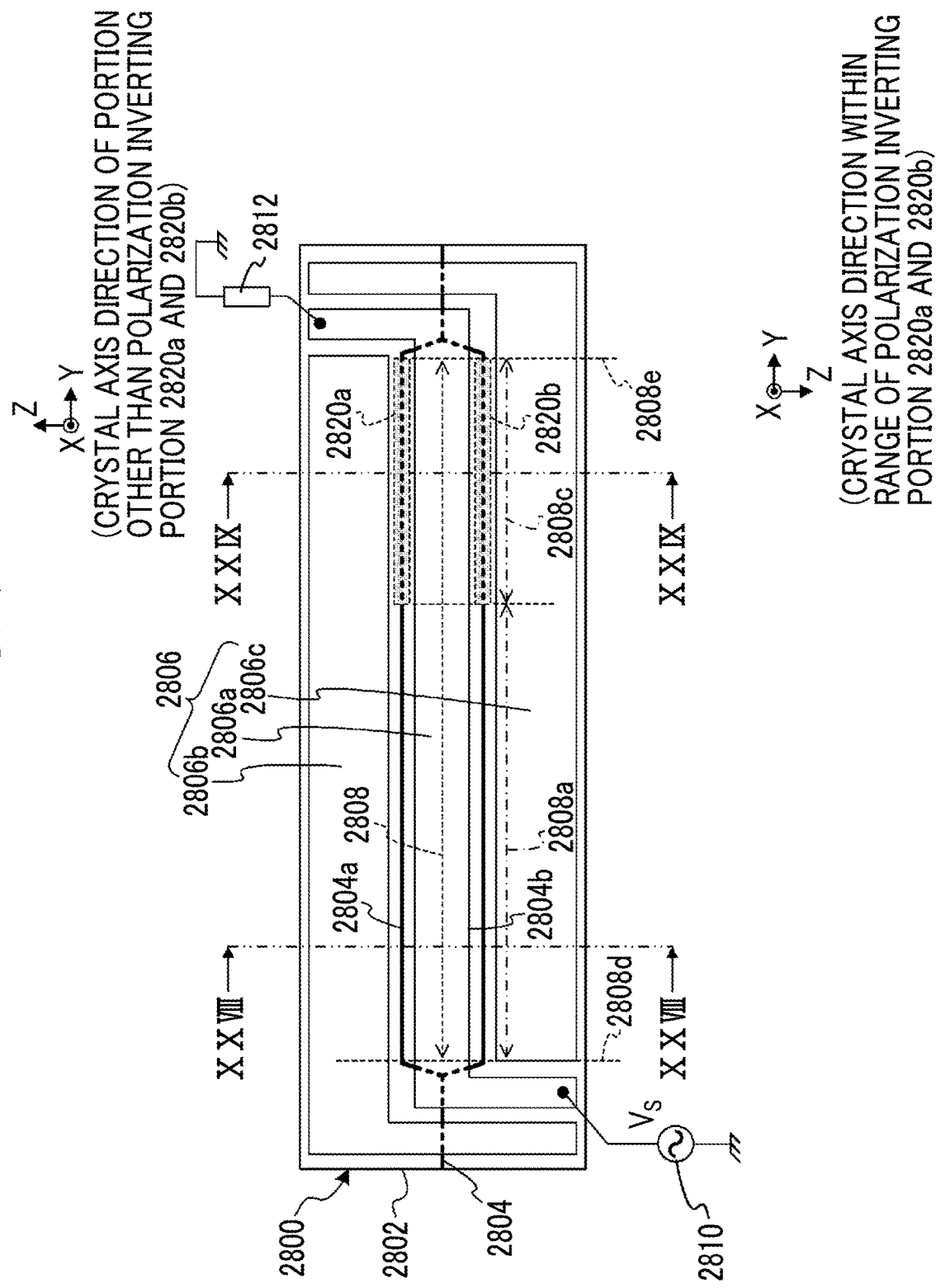
FIG. 27 is a view illustrating a configuration of an optical modulation element according to a sixth embodiment of the present invention.
Figure 28:
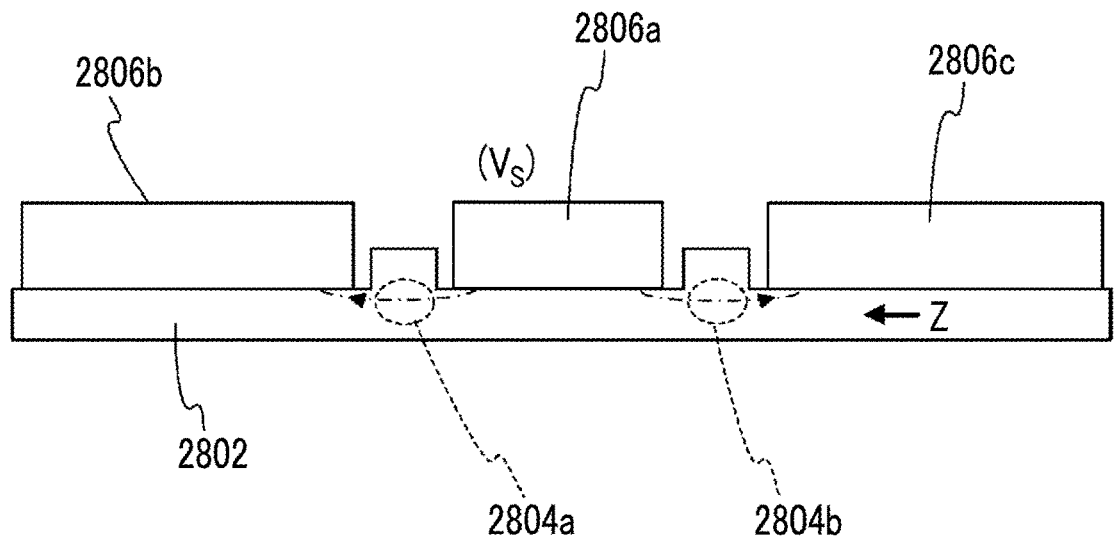
FIG. 28 is a sectional view taken along line XXVIII-XXVIII in the optical modulation element illustrated in FIG. 27.
Figure 29:
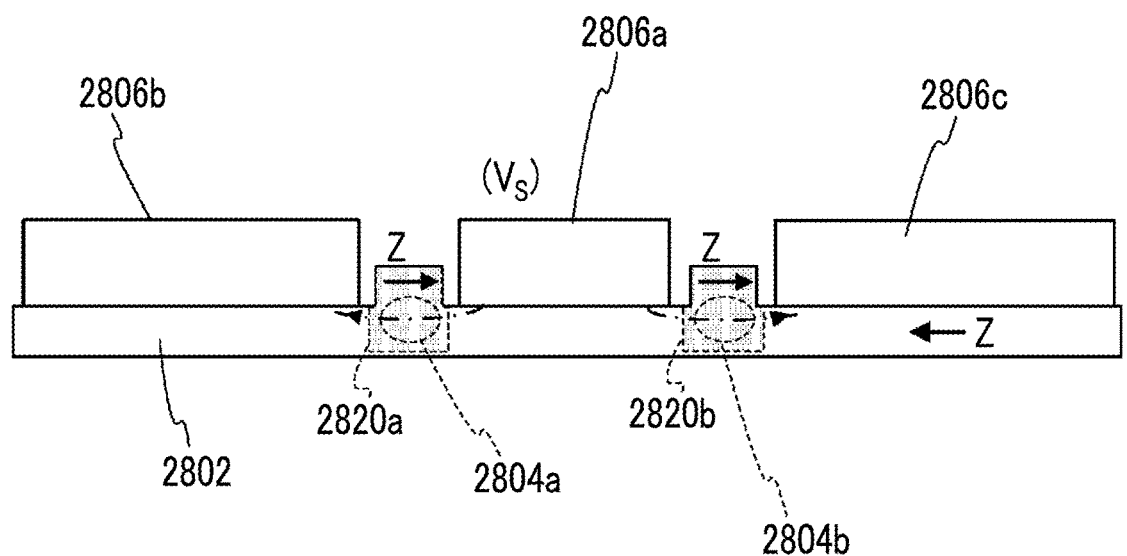
FIG. 29 is a sectional view taken along line XXIX-XXIX in the optical modulation element illustrated in FIG. 27.

FIG. 27 is a view illustrating a configuration of an optical modulation element 2800 according to a sixth embodiment of the present invention, and FIG. 28 is a sectional view taken along line XXVIII-XXVIII in the optical modulation element 2800 in FIG. 27, that is, a sectional view of the optical modulation element 2800 in the second modulation section 2808a. In addition, FIG. 29 is a sectional view taken along line XXIX-XXIX in the optical modulation element 2800 in FIG. 27, that is, a sectional view of the optical modulation element 2800 in the first modulation section 2808c.

The optical modulation element 2800 includes an optical waveguide 2804 formed on a substrate 2802 and a control electrode 2806 that controls the light wave propagating through the optical waveguide 2804. As in the substrate 102 of the optical modulation element 100 illustrated in FIG. 1, the substrate 2802 is the X-cut substrate formed of LN, for example. The Z-axis is directed in the upward direction in FIG. 27, and the Y-axis is directed in the rightward direction in the drawing.

In addition, the substrate 2802 is a thin plate substrate processed to have a thickness of 10 μm or smaller (for example, 1 μm). The optical waveguide 2804 is a protruding optical waveguide configured to have a protruding portion extending on a plane of the substrate 2802. For example, the optical waveguide 2804 is a rib-type optical waveguide or a ridge-type optical waveguide.

As in the optical waveguide 104 of the optical modulation element 100 illustrated in FIG. 1, the optical waveguide 2804 is the Mach-Zehnder-type optical waveguide, for example, and has two parallel waveguides 2804a and 2804b forming a pair. The parallel waveguides 2804a and 2804b are linearly formed, and do not have the intersection portion or the U-turn waveguide.

The control electrode 2806 is composed of a center electrode 2806a and two ground electrodes 2806b and 2806c. The ground electrodes 2806b and 2806c are formed at a predetermined constant distance from the center electrode 2806a. In this manner, the center electrode 2806a forms a distributed constant line together with the ground electrodes 2806b and 2806c.

One end of the center electrode 2806a is connected to a signal source 2810 that generates the modulation signal Vs, and the other end is terminated by a terminator 2812 having a predetermined impedance. In this manner, the control electrode 2806 forms a traveling-wave electrode in which the electrical signal (hereinafter, also referred to as the modulation signal) is a traveling wave and propagates in one direction.

The center electrode 2806a is linearly provided along the extending direction of the two parallel waveguides 2804a and 2804b, applies the electric field to each of the parallel waveguides 2804a and 2804b, and generates the phase change in the light waves propagating through the parallel waveguides 2804a and 2804b. In this manner, for example, the input light input from the left end portion in the drawing of the substrate 2802 of the optical waveguide 2804 is modulated, and the modulated light is output from an end portion on the right side in the drawing.

Here, a portion where the control electrode 2806 controls the light waves of the parallel waveguides 2804a and 2804b, that is, a portion which applies the phase change to the light waves of the parallel waveguides 2804a and 2804b forms a modulation section 2808 (portion in a range indicated by a dashed arrow in the drawing in the center electrode 2806a). The modulation section 2808 has a first modulation section 2808c located within a predetermined distance range (range indicated by a dashed-dotted arrow in the drawing) from an end portion 2808e which is a downstream side end portion along the propagation direction of the traveling wave propagating through the control electrode 2806, and a second modulation section 2808a located within a predetermined distance range (range indicated by a dashed-dotted arrow in the drawing) from an input end 2808d of the electrical signal on the upstream side along the propagation direction. Here, the predetermined distance range means a range where the signs of the phase changes of the generated light are the same in each of the parallel waveguides 2804a and 2804b, when the direct current voltage is applied between the center electrodes 2806a-1 and 2806a-2 and the ground electrodes 2806b, 2806c, and 2806d.

In the present embodiment, in the parallel waveguide 2804a, the electric field directed in the upward direction in the drawing is applied over the entire range of the modulation section 2808 between the center electrode 2806a and the ground electrode 2806b. In addition, in the parallel waveguide 2804b, the electric field directed in the downward direction in the drawing is applied over the entire range of the modulation section 2808 between the center electrode 2806a and the ground electrode 2806c.

However, in the present embodiment, each of the two parallel waveguides 2804a and 2804b is composed of two portions formed to pass through two portions where polarization directions are opposite to each other in the substrate 2802.

Specifically, in the substrate 2802, two polarization inverting portions 2820a and 2820b (shaded portions surrounded by two dotted lines illustrated in FIGS. 27 and 29) in which the polarization direction (Z-axis direction) is inverted with respect to other portions of the substrate within a range of the first modulation section 2808c are formed. That is, as illustrated in an upper portion in FIG. 27, in a portion other than the polarization inverting portions 2820a and 2820b in the substrate 2802, the +Z-direction which is the polarization direction is the upward direction in the drawing. In contrast, within a range of the polarization inverting portions 2820a and 2820b, the polarization direction (+Z-direction) directed in the downward direction in the drawing.

In FIG. 29, a thick arrow illustrated in a portion of the polarization inverting portions 2820a and 2820b indicates the polarization direction of the substrate 2802 in the polarization inverting portions 2820a and 2820b, and a thick arrow illustrated in a portion other than the polarization inverting portions 2820a and 2820b indicates the polarization direction in a portion of the substrate 2802 other than the polarization inverting portions 2820a and 2820b.

According to the above-described configuration, in the parallel waveguide 2804a, in a range of the second modulation section 2808a, the applied electric field directed upward in the drawing from the center electrode 2806a toward the ground electrode 2806b is the electric field in the +Z-direction, and in a range of the first modulation section 2808c having the polarization inverting portion 2820a, the applied electric field directed upward in the drawing is the electric field in the −Z-direction. Therefore, in the parallel waveguide 2804a, a refractive index change generated in the first modulation section 2808c by the control electrode 2806 has the sign opposite to the sign of a refractive index change generated in the second modulation section 2808a. As a result, in the parallel waveguide 2804a, the phase change generated in first modulation section 2808c has the sign opposite to the sign of the phase change generated in second modulation section 2808a.

On the other hand, in the parallel waveguide 2804b, in a range of the second modulation section 2808a, the applied electric field directed downward in the drawing from the center electrode 2806a toward the ground electrode 2806c is the electric field in the −Z-direction, and in a range of the first modulation section 2808c having the polarization inverting portion 2820b, the applied electric field directed downward in the drawing is the electric field in the +Z-direction. Therefore, in the parallel waveguide 2804b, the refractive index change generated in the first modulation section 2808c by the control electrode 2806 also has the sign opposite to the sign of the refractive index change generated in the second modulation section 2808a. As a result, in parallel waveguide 2804b, the phase change generated in first modulation section 2808c also has the sign opposite to the sign of the phase change generated in second modulation section 2808a.

Therefore, in the optical modulation element 2800, as in the optical modulation element 100, the phase change generated in the light waves of the parallel waveguides 2804a and 2804b in the first modulation section 2808c of the modulation section 2808 also has the sign opposite to the sign of the phase change generated in the second modulation section 2808a. According to a principle the same as that of the optical modulation element 100, the operation frequency band is widened, compared to the optical modulation element 200 in the related art illustrated in FIG. 2.

In particular, in the optical modulation element 2800, the substrate 2802 is formed of the thin plate having the thickness of 10 μm or smaller. Therefore, the electric field generated by applying the voltage to the electrode formed on the substrate 2802 is likely to concentrate in the substrate 2802. Therefore, in the optical modulation element 2800, for example, a pair of temporary electrodes are formed on the substrate 2802 before the control electrode 2806 is formed, and a high voltage is applied to the temporary electrodes. In this manner, the polarization inverting portions 2820a and 2820b can be relatively easily formed. For example, on the substrate 2802, the pair of temporary electrodes can be provided at positions which pinch each of portions in which the polarization inverting portions 2820a and 2820b need to be formed. In this case, for example, the control electrode 2806 can be formed at a desired position after the temporary electrodes on substrate 2802 are etched and removed.

Seventh Embodiment

Next, a seventh embodiment of the present invention will be described. Unlike the optical modulation element 100 according to the first embodiment illustrated in FIG. 1, in an optical modulation element according to the present embodiment, the modulation section does not include the U-turn waveguide, and is configured to linearly extend. The two parallel waveguides forming the pair intersect with each other in an intermediate portion of the modulation section. In this manner, a configuration is adopted so that the phase changes generated in each of the two parallel waveguides have signs opposite to each other across the intersecting location.

Figure 30:
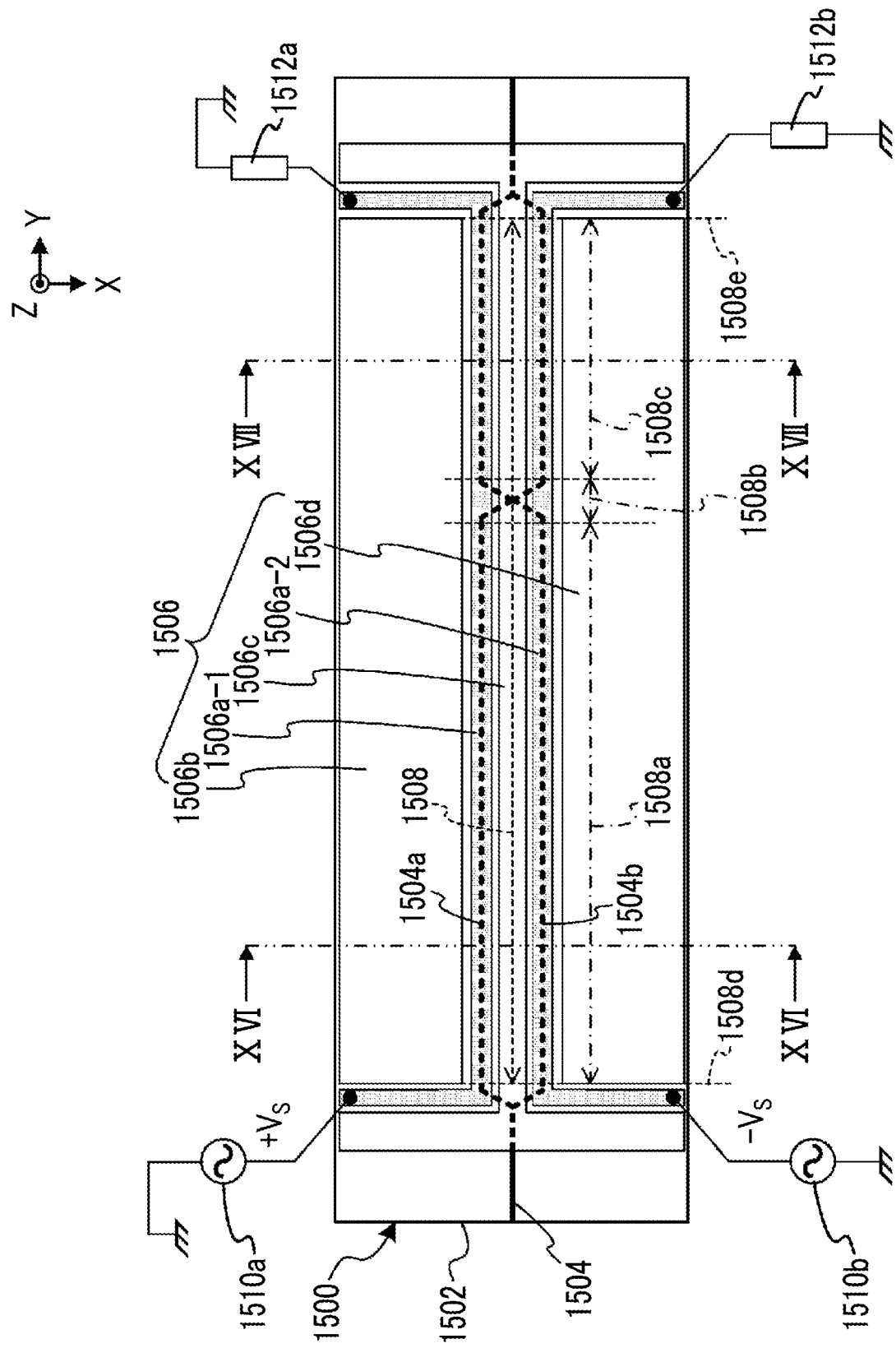
FIG. 30 is a view illustrating a configuration of an optical modulation element according to a seventh embodiment of the present invention.

FIG. 30 is a view illustrating a configuration of an optical modulation element 1500 according to the seventh embodiment of the present invention. The optical modulation element 1500 includes an optical waveguide 1504 formed on a substrate 1502 and a control electrode 1506 that controls the light wave propagating through the optical waveguide 1504. The substrate 1502 is a substrate having an electro-optic effect. For example, the substrate 1502 is an LN substrate the same as the substrate 102 of the optical modulation element 100 illustrated in FIG. 1. However, the substrate 1502 is a Z-cut substrate having a crystal orientation different from that of the substrate 102. The X-axis is directed in the downward direction in the drawing, and the Y-axis is directed in the rightward direction in the drawing.

As in the optical waveguide 104 of the optical modulation element 100 illustrated in FIG. 1, the optical waveguide 1504 is the Mach-Zehnder-type optical waveguide, for example, and has two parallel waveguides 1504a and 1504b forming a pair. Unlike the parallel waveguides 104a and 104b, the parallel waveguides 1504a and 1504b do not have the U-turn waveguide, and linearly extend in the Y-axis direction.

The control electrode 1506 is composed of center electrodes 1506a-1 and 1506a-2 and ground electrodes 1506b, 1506c, and 1506d. The ground electrodes 1506b, 1506c, and 1506d are formed at a predetermined constant distance from the center electrodes 1506a-1 and 1506a-2. In this manner, the center electrode 1506a-1 forms a distributed constant line together with the ground electrodes 1506b and 1506c, and the center electrode 1506a-2 forms a distributed constant line together with the ground electrodes 1506c and 1506d.

One end of the center electrode 1506a-1 is connected to a signal source 1510a that generates the modulation signal, and the other end is terminated by a terminator 1512a having a predetermined impedance. In addition, one end of the center electrode 1506a-2 is connected to a signal source 1510b that generates the modulation signal, and the other end is terminated by a terminator 1512b having a predetermined impedance. In this manner, the control electrode 1506 forms a traveling-wave electrode in which the electrical signal (hereinafter, also referred to as the modulation signal) is the traveling wave and propagates in one direction in each of the center electrodes 1506a-1 and 1506a-2. Here, the signal sources 1510a and 1510b output the same modulation signal. However, the signal voltage of the modulation signal output by the signal source 1510b is −Vs in which a curve is inverted with respect to the signal voltage +Vs of the modulation signal output by the signal source 1510a.

The center electrodes 1506a-1 and 1506a-2 are provided along the extending direction of the two parallel waveguides 1504a and 1504b, apply the electric fields to the parallel waveguides 1504a and 1504b, and generate the phase change in the light waves propagating through the parallel waveguides 1504a and 1504b. In this manner, for example, the input light input from the left end portion in the drawing of the substrate 1502 of the optical waveguide 1504 is modulated, and the modulated light is output from an end portion on the right side in the drawing.

Here, a portion where the control electrode 1506 controls the light waves of the parallel waveguides 1504a and 1504b, that is, a portion which applies the phase change to the light waves of the parallel waveguides 1504a and 1504b forms a modulation section 1508 (portion in a range indicated by a dashed arrow in the drawing in the center electrode 1506a). The modulation section 1508 has a first modulation section 1508c located within a predetermined distance range (range indicated by a dashed-dotted arrow in the drawing) from an end portion 1508e which is a downstream side end portion along the propagation direction of the traveling wave propagating through the control electrode 1506, and a second modulation section 1508*a* located within a predetermined distance range (range indicated by a dashed-dotted arrow in the drawing) from an input end 1508*d* of the electrical signal on the upstream side along the propagation direction. Here, the predetermined distance range means a range where the signs of the phase changes of the generated light are the same in each of the parallel waveguides 1504*a* and 1504*b*, when the direct current voltage is applied between the center electrodes 1506*a*-1 and 1506*a*-2 and the ground electrodes 1506*b*, 1506*c*, and 1506*d*.

In addition, the modulation section 1508 has an intersection portion 1508*b* where the parallel waveguides 1504*a* and 1504*b* intersect with each other, between the second modulation section 1508*a* and the first modulation section 1508*c*. In this manner, the optical modulation element 1500 is configured so that the phase change generated in the parallel waveguides 1504*a* and 1504*b* by the control electrode 1506 in the first modulation section 1508*c* has the sign opposite to the sign of the phase change in the second modulation section 1508*a*.

Figure 31:
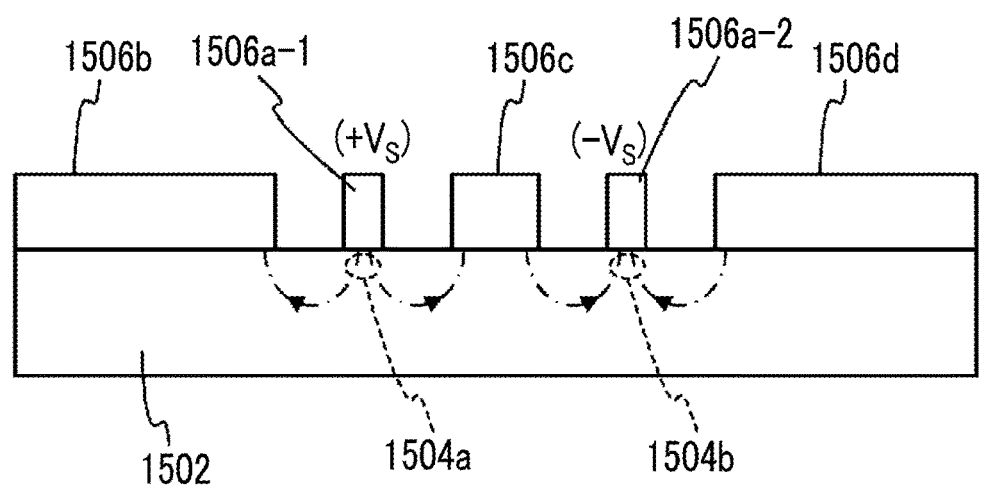
FIG. 31 is a sectional view taken along line XXXI-XXXI in the optical modulation element illustrated in FIG. 30.
Figure 32:
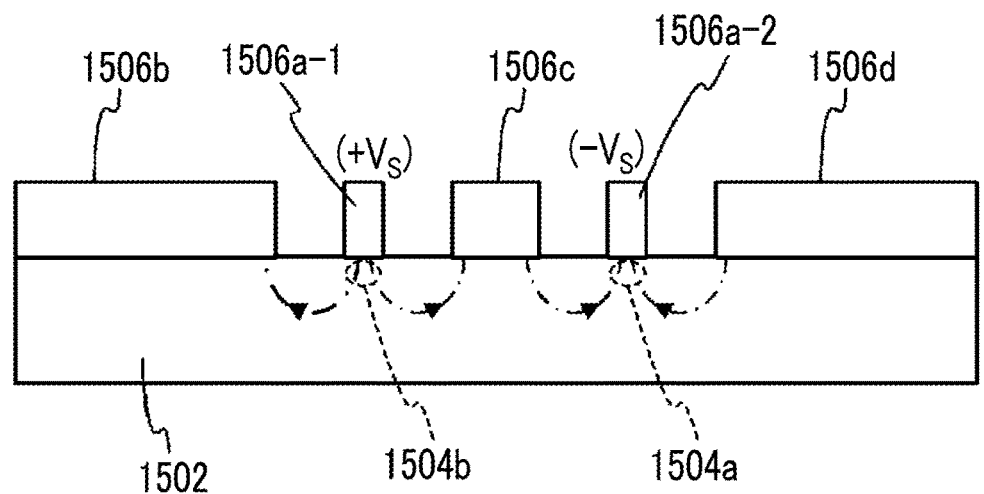
FIG. 32 is a sectional view taken along line XXXII-XXXII in the optical modulation element illustrated in FIG. 30.

FIG. 31 is a sectional view taken along line XXXI-XXXI in the optical modulation element 1500 in FIG. 30, that is, a sectional view of the optical modulation element 1500 in the second modulation section 1508*a*. In addition, FIG. 32 is a sectional view taken along line XXXII-XXXII in the optical modulation element 1500 in FIG. that is, a sectional view of the optical modulation element 1500 in the first modulation section 1508*c*.

As illustrated in FIG. 31, in the second modulation section 1508*a*, each of parallel waveguides 1504*a* and 1540*b* is formed in a lower portion of the center electrodes 1506*a*-1 and 1506*a*-2. In contrast, in the first modulation section 1508*c*, as illustrated in FIG. 32, each of parallel waveguides 1504*b* and 1540*a* is formed in a lower portion of the center electrodes 1506*a*-1 and 1506*a*-2.

In this manner, for example, in the parallel waveguide 1504*a*, in the second modulation section 1508*a* as illustrated in FIG. 31, the electric field (dashed-dotted arrow in the drawing) directed downward in the drawing, that is, directed in the −Z-direction is applied by the center electrode 1506*a*-1 propagating the modulation signal of the signal voltage +Vs. In contrast, in the first modulation section 1508*c* as illustrated in FIG. 32, the electric field directed upward in the drawing, that is, directed in the +Z-direction is applied by the center electrode 1506*a*-2 propagating the modulation signal of the signal voltage −Vs. In this manner, in the parallel waveguide 1504*a*, the phase change generated in the first modulation section 1508*c* has the sign opposite to the sign of the phase change generated in the second modulation section 1508*a*.

Similarly, in the parallel waveguide 1504*b*, in the second modulation section 1508*a*, the electric field directed upward in the drawing, that is, directed in the +Z-direction is applied by the center electrode 1506*a*-2 propagating the modulation signal of the signal voltage −Vs (FIG. 31). In contrast, in the first modulation section 1508*c*, the electric field directed downward in the drawing, that is, directed in the −Z-direction is applied by the center electrode 1506*a*-1 propagating the modulation signal of the signal voltage +Vs. In this manner, in the parallel waveguide 1504*b*, the phase change generated in the first modulation section 1508*c* has the sign opposite to the sign of the phase change generated in the second modulation section 1508*a*. Here, even when there is no ground electrode 1506*c*, the same advantageous effect can be obtained by performing a differential operation for causing the signal voltages +Vs and −Vs input to the center electrodes 1506*a*-1 and 1506*a*-2 to invert polarity. Hereinafter, when the Z-cut substrate is used, the Z-cut substrate can correspond to the above-described configuration in the same way.

As in the optical modulation element 100, the optical modulation element 1500 having the above-described configuration is configured so that the phase change generated in the light waves of the parallel waveguides 1504*a* and 1504*b* in the first modulation section 1508*c* of the modulation section 1508 has the sign opposite to the sign of the phase change generated in the second modulation section 1508*a*. Therefore, according to a principle the same as that of the optical modulation element 100, the operation frequency band is widened, compared to the optical modulation element 200 in the related art illustrated in FIG. 2.

In addition, in the optical modulation element 1500, the control electrode 1506 and the parallel waveguides 1504*a* and 1504*b* which form the modulation section 1508 are formed to linearly extend. Therefore, no bending loss occurs in the electrical signal propagating through the control electrode 1506 and the light waves propagating through the parallel waveguides 1504*a* and 1504*b*, and an efficient optical modulation operation having less loss in the electrical signal and the light waves can be realized.

Eighth Embodiment

Next, an eighth embodiment of the present invention will be described. An optical modulation element according to the present embodiment has the same configuration as the optical modulation element 1500 according to the eleventh embodiment illustrated in FIG. 30. However, a route of the parallel waveguide in a plane of the substrate 1502 is different.

Figure 33:
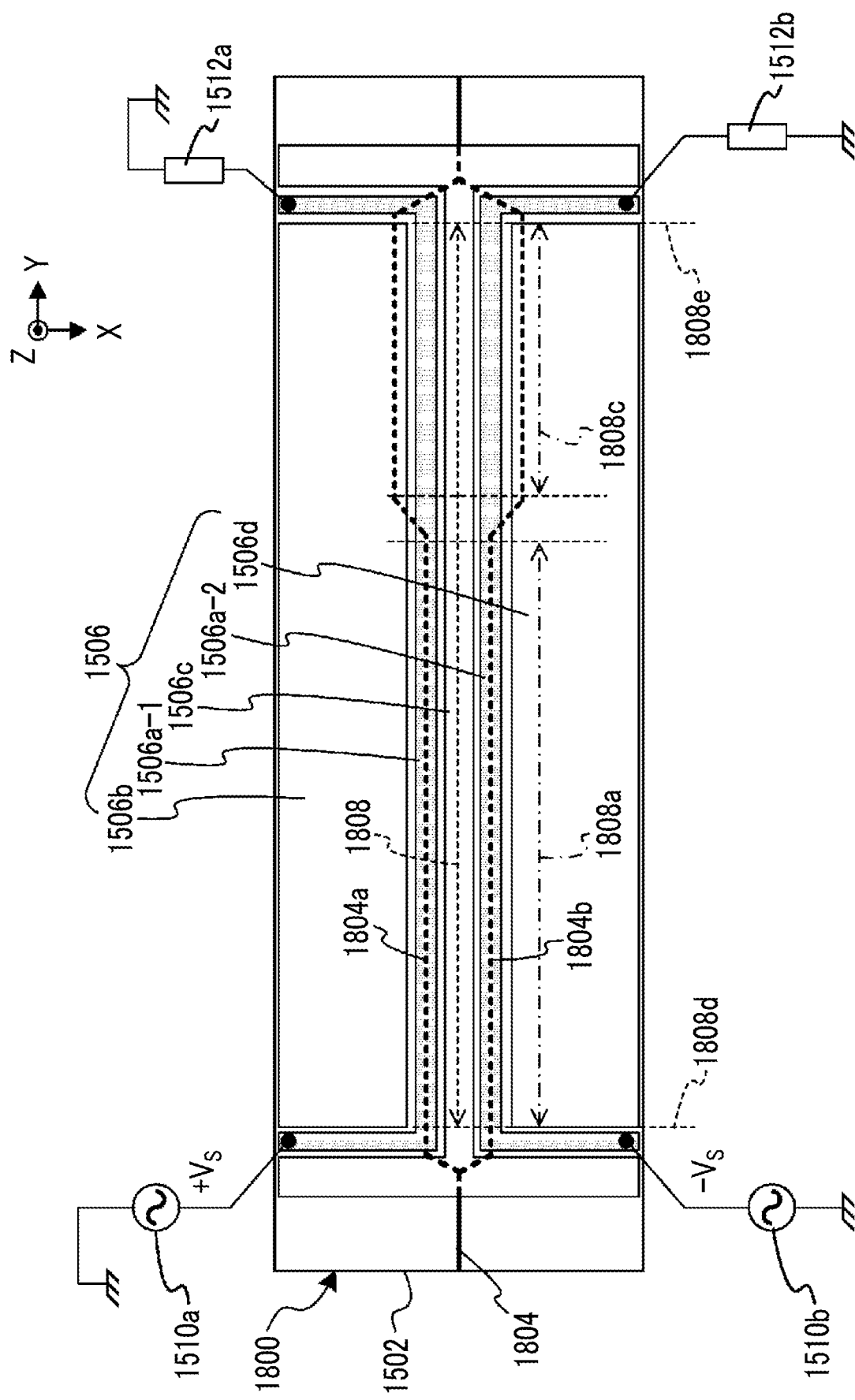
FIG. 33 is a view illustrating a configuration of an optical modulation element according to an eighth embodiment of the present invention.

FIG. 33 is a view illustrating a configuration of an optical modulation element 1800 according to the eighth embodiment of the present invention. In FIG. 33, the same reference numerals as those illustrated in FIG. 30 are used to denote the same configuration elements illustrated in FIG. 30, description in FIG. 30 described above will be incorporated by reference.

The optical modulation element 1800 has the same configuration as the optical modulation element 1500 illustrated in FIG. 30, but is different in that an optical waveguide 1804 is provided instead of the optical waveguide 1504. The optical waveguide 1804 has the same configuration as the optical waveguide 1504, but is different in that parallel waveguides 1804*a* and 1804*b* are provided instead of the parallel waveguides 1504*a* and 1504*b*.

A portion where the control electrode 1506 controls the light waves of the parallel waveguides 1804*a* and 1804*b*, that is, a portion which applies the phase change to the light waves of the parallel waveguides 1804*a* and 1804*b* is a modulation section 1808 (portion in a range indicated by a dashed arrow in the drawing in the ground electrode 1506*c*). The modulation section 1808 has a first modulation section 1808*c* located within a predetermined distance range (range indicated by a dashed-dotted arrow in the drawing) from an end portion 1808*e* which is a downstream side end portion along the propagation direction of the traveling wave propagating through the control electrode 1506, and a second modulation section 1808*a* located within a predetermined distance range (range indicated by a dashed-dotted arrow in the drawing) from an input end 1808*d* of the electrical signal on the upstream side along the propagation direction. Here, the predetermined distance range means a range where the signs of the phase changes of the generated light are the same in each of the parallel waveguides 1804a and 1804b, when the direct current voltage is applied between the center electrodes 1506a-1 and 1506a-2 and the ground electrodes 1506b, 1506c, and 1506d.

The modulation section 1808 has the same configuration as the modulation section 1508 of the optical modulation element 1500 illustrated in FIG. 30, but does not have the intersection portion where the parallel waveguides 1804a and 1804b intersect with each other, between the second modulation section 1808a and the first modulation section 1808c. That is, the parallel waveguides 1804a and 1804b have the same configuration as the parallel waveguides 1504a and 1504b, but do not have the portion where both intersect with each other, and have different routes in a plane of the substrate 1502.

Specifically, in the second modulation section 1808a, the parallel waveguides 1804a and 1804b are formed in a lower portion of the center electrodes 1506a-1 and 1506a-2, as in the optical modulation element 1500 illustrated in FIG. 30. However, in a portion of the first modulation section 1808c, each of the parallel waveguides 1804a and 1804b is formed to pass through a lower portion of the ground electrode 1506b adjacent to the center electrode 1506a-1 and a lower portion of 1506d adjacent to the center electrode 1506a-2.

In this manner, the optical modulation element 1800 is configured so that the phase change generated in the parallel waveguides 1804a and 1804b in the first modulation section 1808c has the sign opposite to the sign of the phase change generated in the second modulation section 1808a.

The optical modulation element 1800 having the above-described configuration is configured so that the phase change generated in the first modulation section 1808c of the modulation section 1808 has the sign opposite to the sign of the phase change generated in the second modulation section 1808a. Therefore, according to a principle the same as that of the optical modulation element 100, the operation frequency band is widened, compared to the optical modulation element 200 in the related art illustrated in FIG. 2.

In addition, in the optical modulation element 1800, the parallel waveguides 1804a and 1804b do not have the portion where both intersect with each other. Therefore, an optical modulation operation having further less optical loss can be realized, compared to the optical modulation elements 100 and 1500.

Ninth Embodiment

Next, a ninth embodiment of the present invention will be described. An optical modulation element according to the present embodiment has the same configuration as the optical modulation element 1500 according to the eleventh embodiment illustrated in FIG. 30. However, the two parallel waveguides linearly extend without having the intersection portion, and a shape of the control electrode in a plane of the substrate is different.

Figure 34:
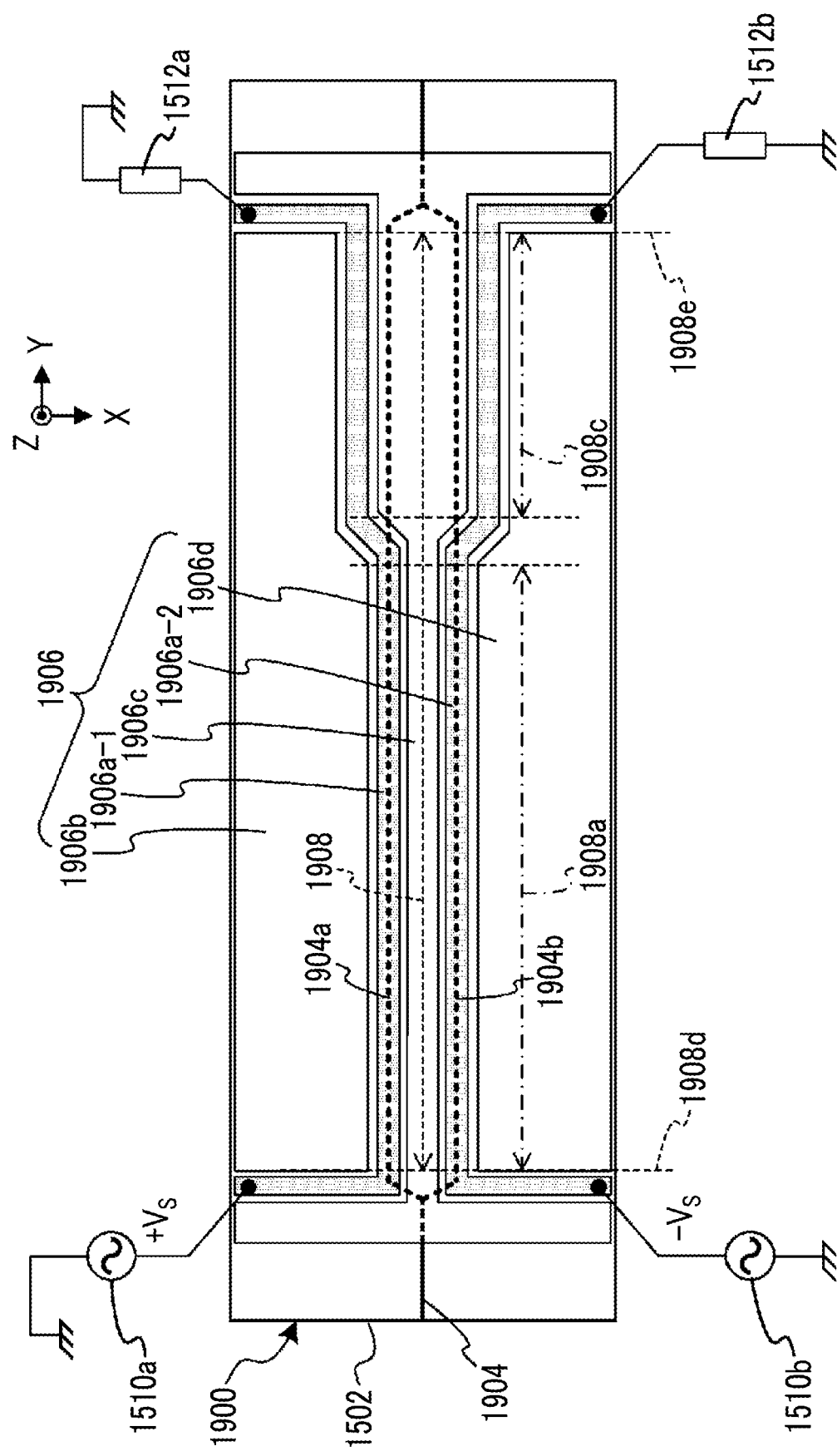
FIG. 34 is a view illustrating a configuration of an optical modulation element according to a ninth embodiment of the present invention.

FIG. 34 is a view illustrating a configuration of an optical modulation element 1900 according to the ninth embodiment of the present invention. In FIG. 34, the same reference numerals as those illustrated in FIG. 30 are used to denote the same configuration elements illustrated in FIG. 30, description in FIG. 30 described above will be incorporated by reference.

The optical modulation element 1900 illustrated in FIG. 34 has the same configuration as the optical modulation element 1500 illustrated in FIG. 30, but is different in that an optical waveguide 1904 and a control electrode 1906 are provided instead of the optical waveguide 1504 and the control electrode 1506. The optical waveguide 1904 has the same configuration as the optical waveguide 1504, but parallel waveguides 1904a and 1904b linearly extending without having the intersection portion are provided instead of the parallel waveguides 1504a and 1504b having the intersection portion.

The control electrode 1906 has the same configuration as the control electrode 1506, but pattern shapes of the center electrodes 1906a-1 and 1906a-1 and the ground electrodes 1906b, 1906c, and 1906d in a plane of the substrate 1502 are different from those of the center electrodes 1506a-1 and 1506a-1 and the ground electrodes 1506b, 1506c, and 1506d of the control electrode 1506.

Here, a portion where the control electrode 1906 controls the light waves of the parallel waveguides 1904a and 1904b, that is, a portion which applies the phase change to the light waves of the parallel waveguides 1904a and 1904b forms a modulation section 1908 (portion in a range indicated by a dashed arrow in the drawing in the center electrode 1906a). The modulation section 1908 has a first modulation section 1908c located within a predetermined distance range (range indicated by a dashed-dotted arrow in the drawing) from an end portion 1908e which is a downstream side end portion along the propagation direction of the traveling wave propagating through the control electrode 1906, and a second modulation section 1908a located within a predetermined distance range (range indicated by a dashed-dotted arrow in the drawing) from an input end 1908d of the electrical signal on the upstream side along the propagation direction. Here, the predetermined distance range means a range where the signs of the phase changes of the generated light are the same in each of the parallel waveguides 1904a and 1904b, when the direct current voltage is applied between the center electrodes 1906a-1 and 1906a-2 and the ground electrodes 1906b, 1906c, and 1906d.

As in the optical modulation element 1500 illustrated in FIGS. 30 and 31, the center electrodes 1906a-1 and 1906a-2 are formed in the upper portion of the parallel waveguides 1904a and 1904b in the second modulation section 1908a. However, particularly in the present embodiment, in the first modulation section 1908c, a width of the ground electrode 1906c is widened in the upward-downward direction in the drawing. In this manner, the ground electrode 1906c is formed in the upper portion of the parallel waveguides 1904a and 1904b.

In this manner, the optical modulation element 1900 is configured so that the phase change generated in the parallel waveguides 1904a and 1904b by the control electrode 1906 in the first modulation section 1908c has the sign opposite to the sign of the phase change at the second modulation section 1908a.

As in the optical modulation element 100, the optical modulation element 1500 having the above-described configuration is configured so that the phase change generated in the light waves of the parallel waveguides 1504a and 1504b in the first modulation section 1508c of the modulation section 1508 has the sign opposite to the sign of the phase change generated in the second modulation section 1508a. Therefore, according to a principle the same as that of the optical modulation element 100, the operation frequency band is widened, compared to the optical modulation element 200 in the related art illustrated in FIG. 2.

In addition, in the optical modulation element 1500, the control electrode 1506 and the parallel waveguides 1504a and 1504b which form the modulation section 1508 are linearly. Therefore, no bending loss occurs in the light waves propagating through the parallel waveguides 1904a and 1904b. For this reason, an optical modulation operation having further less optical loss can be realized, compared to the optical modulation elements 1500 and 1800.

Tenth Embodiment

Next, a tenth embodiment of the present invention will be described. Unlike the above-described optical modulation element 100 and the like, in an optical modulation element 2000 according to the present embodiment, the optical waveguide and the control electrode are formed on a semiconductor substrate.

Figure 35:
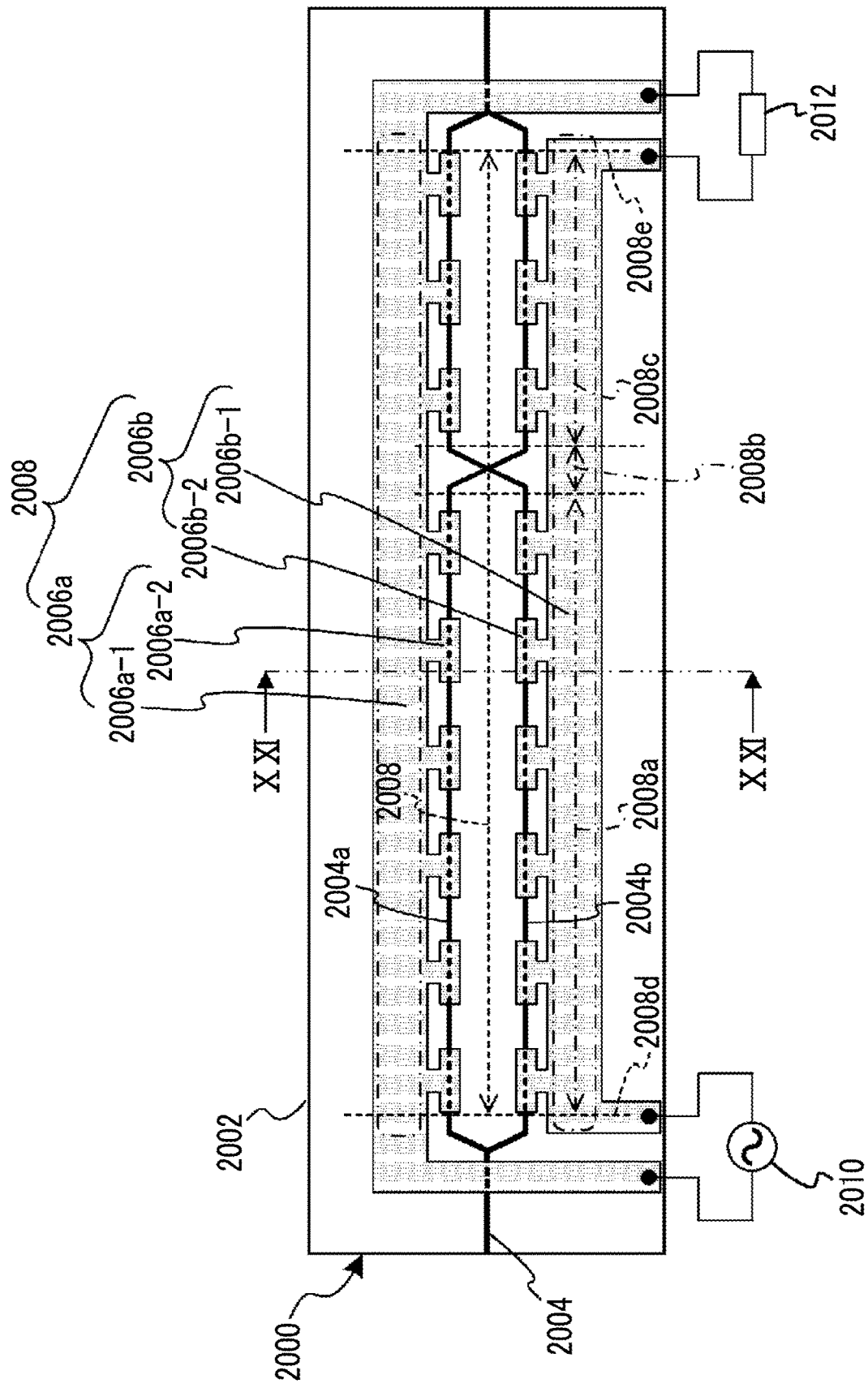
FIG. 35 is a view illustrating a configuration of an optical modulation element according to a tenth embodiment of the present invention.
Figure 36:
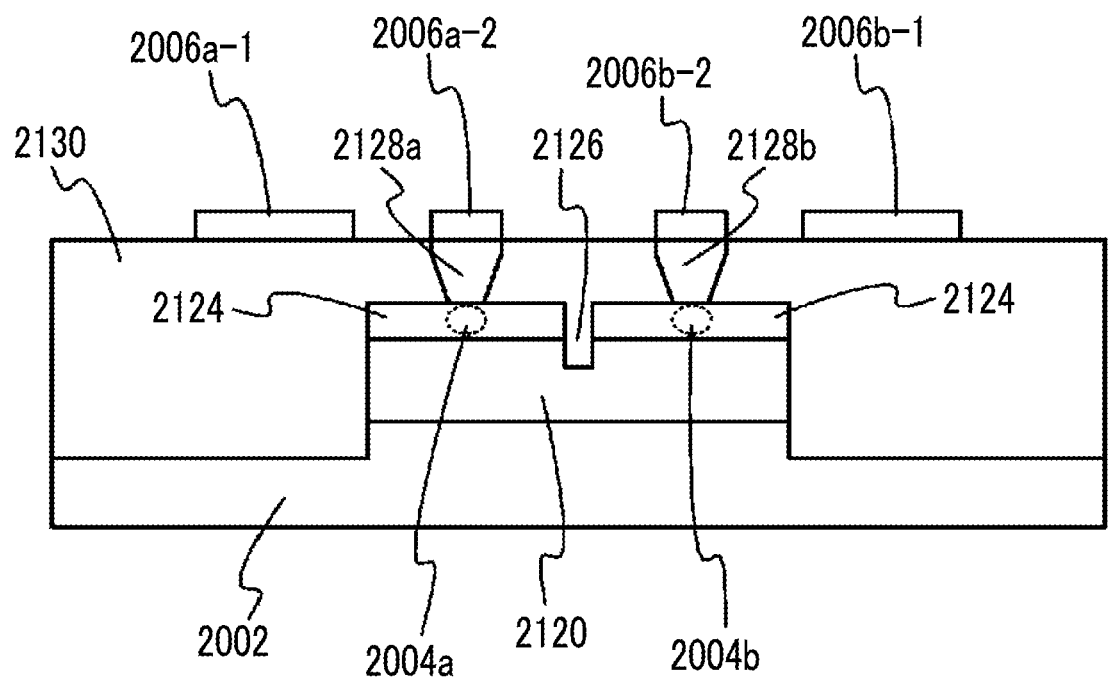
FIG. 36 is a sectional view taken along line XXXVI-XXXVI in the optical modulation element illustrated in FIG. 35.

FIG. 35 is a plan view illustrating a configuration of the optical modulation element 2000 according to the present embodiment, and FIG. 36 is a sectional view taken along line XXXVI-XXXVI in the optical modulation element 2000 illustrated in FIG. 35.

The optical modulation element 2000 includes an optical waveguide 2004 formed on a substrate 2002 and a control electrode 2006 that controls the light wave propagating through the optical waveguide 2004. The optical waveguide 2004 is the Mach-Zehnder-type optical waveguide, for example, and has two parallel waveguides 2004a and 2004b forming a pair.

The substrate 2002 is a substrate having an electro-optic effect, and is formed of a semiconductor such as InP, GaAs, Si, or the like, for example. Specifically, as illustrated in FIG. 36, an n-layer 2120 and an i-layer 2124 are formed on the substrate 2002, and the i-layer 2124 is divided into the right and left in the drawing by a trench 2126. In addition, p-type channels 2128a and 2128b are formed in each upper portion of the two i-layers 2124 divided to the right and left. In this manner, each of parallel waveguides 2004a and 2004b is formed in the two i-layers 2124 on the right and left in the drawing which are configured as an intermediate layer of a so-called p-i-n structure. The n-layer 2120, the i-layer 2124, and the p-type channels 2128a and 2128b are formed to be embedded in a clad portion 2130 provided on the substrate 2002. The clad portion 2130 is formed of a material having a lower refractive index than the i-layer 2124 in which the parallel waveguides 2004a and 2004b are formed, for example, such as benzo cyclobutene (BCB).

A semiconductor junction structure forming the parallel waveguides 2004a and 2004b is not limited to the p-i-n structure described above, and may be an n-p-i-n structure, an n-i-p-n structure, or a p-n-i-n structure.

The control electrode 2006 includes a first electrode 2006a and a second electrode 2006b which are two conductor patterns formed along each of the parallel waveguides 2004a and 2004b. The first electrode 2006a and the second electrode 2006b form a distributed constant line, and the right end in the drawing facing the left end in the drawing to which the signal source 2010 is connected is terminated by a terminator 2012 having a predetermined impedance. In this manner, the electrical signal (modulation signal) input from the signal source 2010 propagates as the traveling wave on the first electrode 2006a and the second electrode 2006b, and generates the phase change in the light wave propagating through each of the parallel waveguides 2004a and 2004b.

In this manner, for example, the input light input from the left end in the drawing of the optical waveguide 2004 is modulated, and the modulated output light (modulated light) is output from the right end in the drawing.

The first electrode 2006a includes a strip-shaped first main conductor portion 2006a-1 (portion surrounded by a rectangular shape of a dashed-dotted line in the drawing) extending to the right and left along the parallel waveguide 2004a, and a plurality of T-shaped first protruding conductor portions 2006a-2 extending downward in the drawing from the first main conductor portion 2006a-1 toward the parallel waveguide 2004a. Similarly, the second electrode 2006b includes a strip-shaped second main conductor portion 2006b-1 (portion surrounded by a rectangular shape of a dashed-dotted line in the drawing) extending to the right and left along the parallel waveguide 2004b, and a plurality of T-shaped second protruding conductor portions 2006b-2 extending downward in the drawing from the second main conductor portion 2006b-1 toward the parallel waveguide 2004b.

Here, in FIG. 35, in order to simplify the drawing and facilitate understanding, the reference numeral is assigned to only one protruding conductor portion extending from each of the first main conductor portion 2006a-1 and the second main conductor portion 2006b-1. However, it should be understood as follows. All portions protruding in the same T-shape from the first main conductor portion 2006a-1 are the first protruding conductor portions 2006a-2, and all portions protruding in the same T-shape from the second main conductor portion 2006b-1 are the second protruding conductor portions 2006b-2.

According to the above-described configuration, in the control electrode 2006, the first main conductor portion 2006a-1 and the second main conductor portion 2006b-1 cause the electrical signals to propagate as the traveling waves. Each potential in each portion of the first main conductor portion 2006a-1 and the second main conductor portion 2006b-1 is applied to each portion of the parallel waveguides 2004a and 2004b by the plurality of first protruding conductor portions 2006a-2 and the second protruding conductor portions 2006b-2. In this manner, the phase change is generated in the light waves propagating through the parallel waveguides 2004a and 2004b. For example, the configuration of this control electrode is disclosed in Japanese Laid-Open Patent Publication No. 2006-65085.

Here, a portion where the control electrode 2006 controls the light waves of the parallel waveguides 2004a and 2004b, that is, a portion which applies the phase change to the light waves of the parallel waveguides 2004a and 2004b forms a modulation section 2008 (portion in a range indicated by a dashed arrow in the drawing between the parallel waveguides 2004a and 2004b in FIG. 35). The modulation section 2008 has a first modulation section 2008c located within a predetermined distance range (range indicated by a dashed-dotted arrow in the drawing, which is illustrated on the second main conductor portion 2006b-1) from an end portion 2008e which is a downstream side end portion along the propagation direction of the traveling wave propagating through the control electrode 2006, and a second modulation section 2008a located within a predetermined distance range (range indicated by a dashed-dotted arrow in the drawing) from an input end 2008d of the electrical signal on the upstream side along the propagation direction. Here, the predetermined distance range means a range where the signs of the phase changes of the generated light are the same in each of the parallel waveguides 2004a and 2004b, when the direct current voltage is applied between the first electrode 2006a and the second electrode 2006b.

In particular, in the present embodiment, an intersection portion 2008b where the parallel waveguides 2004a and 2004b intersect with each other is provided between the second modulation section 2008a and the first modulation section 2008c. In this manner, the control electrode 2006 and the optical waveguide 2004 are configured so that the phase change generated in the light waves of the parallel waveguides 2004a and 2004b in the first modulation section 2008c of the modulation section 2008 has the sign opposite to the sign of the phase change generated in the second modulation section 2008a.

In addition, with regard to the lengths of the first modulation section 2008c and the second modulation section 2008a which are measured along the extending direction of the modulation section 2008, the first modulation section 2008c is shorter than the second modulation section 2008a. That is, the length of the portion of the control electrode 2006 working on the parallel waveguides 2004a and 2004b in the first modulation section 2008c is shorter than the length of the portion working on the parallel waveguides 2004a and 2004b in the second modulation section 2008a.

As in the optical modulation element 100 illustrated in FIG. 1, the optical modulation element 2000 having the above-described configuration is configured so that the phase change generated in the first modulation section 2008c in the modulation section 2008 by the control electrode 2006 and the parallel waveguides 2004a and 2004b has the sign opposite to the sign of the phase change generated in the second modulation section 2008a. Therefore, as in the optical modulation element 100, in the optical modulation element 2000, the phase change amount offset by the first modulation section 2008c out of the phase change amount generated in the second modulation section 2008a due to a conductor loss of the control electrode 2006 has frequency characteristics. As a result, the operation frequency band realized by the whole modulation section 2008 is widened.

Eleventh Embodiment

Figure 37:
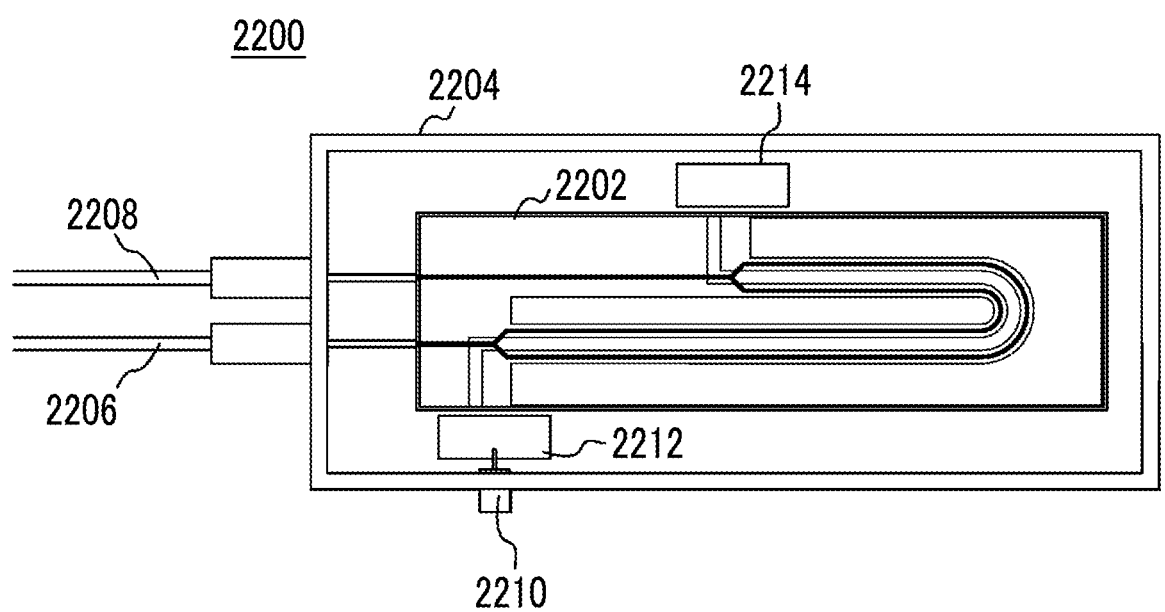
FIG. 37 is a view illustrating a configuration of an optical modulation device according to an eleventh embodiment of the present invention.

Next, an eleventh embodiment of the present invention will be described. The present embodiment is an optical waveguide device configured by using any one optical waveguide element from the above-described optical modulation elements 100 and the like. FIG. 37 is a view illustrating a configuration of an optical modulation device 2200 which is an optical waveguide device according to the present embodiment.

The optical modulation device 2200 includes an optical modulation element 2202, a housing 2204 that houses the optical modulation element 2202, an input optical fiber 2206 that introduces input light to the optical modulation element 2202 into the housing 2204, and an output optical fiber 2208 that guides the output light output from the optical modulation element 2202 to the outside of the housing 2204.

Here, the optical modulation element 2202 can be any one of the above-described optical modulation elements 100, 100-1, 100-2, 100-3, 1400, 1500, 1800, 1900, and 2000 (hereinafter, also referred to as the optical modulation element 100 or the like).

The housing 2204 is provided with a connector 2210 for inputting the electrical signal to be applied to a control electrode (not illustrated) serving as a traveling-wave electrode provided in the optical modulation element 2202. The electrical signal input from the connector 2210 is input to one end of the control electrode by wire bonding or the like (not illustrated) via a relay substrate 2212, and a terminator 2214 having a predetermined impedance is connected to the other end of the control electrode by wire bonding or the like (not illustrated).

The optical modulation device 2200 having the above-described configuration can realize a broadband modulation operation by using the above-described optical modulation element 100 and the like, compared to the related art.

Twelfth Embodiment

Next, a twelfth embodiment of the present invention will be described. The present embodiment is an optical transmission apparatus configured by using the optical modulation device 2200 according to the eleventh embodiment using any of the above-described optical modulation elements 100 and the like.

Figure 38:
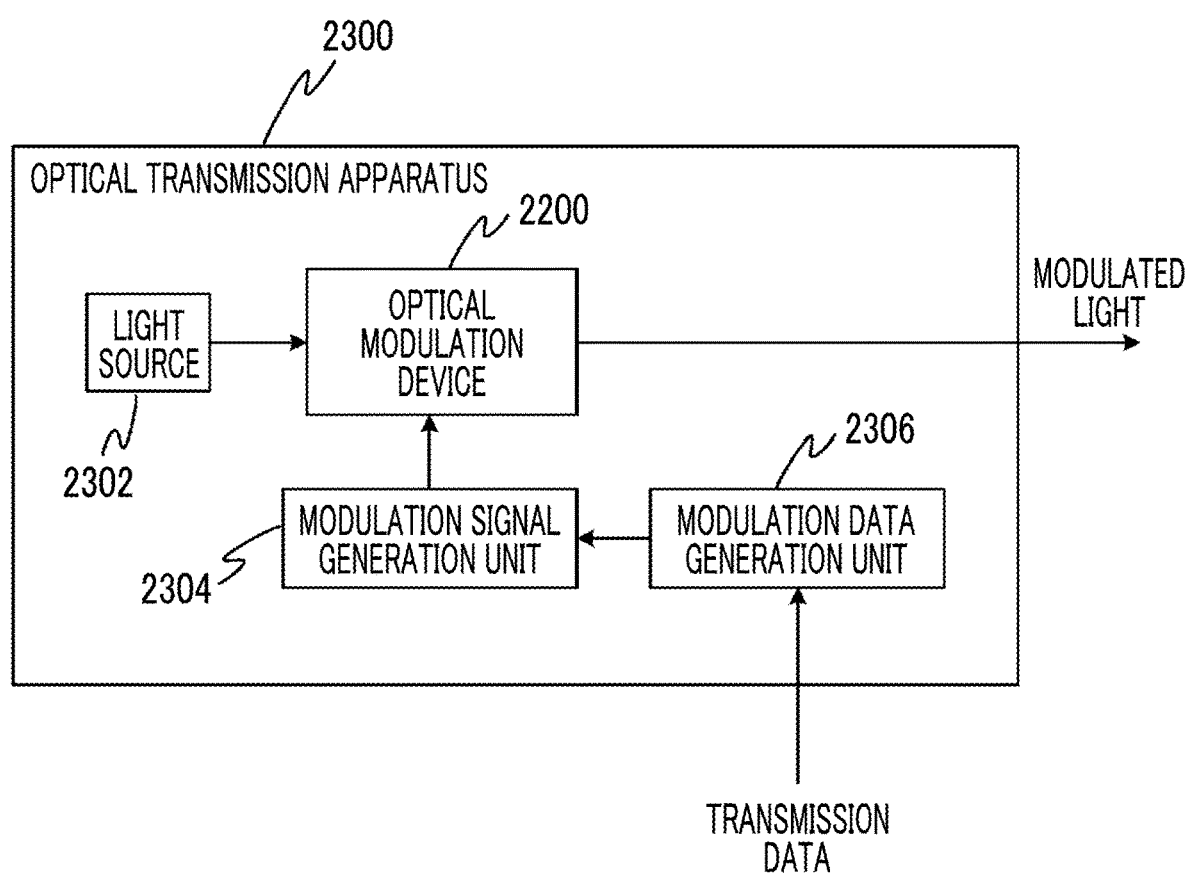
FIG. 38 is a view illustrating a configuration of an optical transmission apparatus according to a twelfth embodiment of the present invention.

FIG. 38 is a view illustrating a configuration of an optical transmission apparatus 2300 according to the present embodiment. The optical transmission apparatus 2300 has an optical modulation device 2200, a light source 2302 that causes the light to be input to the optical modulation device 2200, a modulation signal generation unit 2304, and a modulation data generation unit 2306.

For example, the light source 2302 is a semiconductor laser. The modulation data generation unit 2306 receives externally supplied transmission data, generates modulation data for transmitting the transmission data (for example, data obtained by converting or processing the transmission data into a predetermined data format), and outputs the generated modulation data to the modulation signal generation unit 2304.

The modulation signal generation unit 2304 is an electronic circuit (drive circuit) that outputs an electrical signal for causing the optical modulation device 2200 to perform a modulation operation. Based on the modulation data output from the modulation data generation unit 2306, the modulation signal generation unit 2304 generates a modulation signal which is an electrical signal for causing the optical modulation device 2200 to perform an optical modulation operation according to the modulation data, and inputs the modulation signal to the optical modulation device 2200. Here, the modulation signal generation unit 2304 corresponds to an electronic circuit that outputs the electrical signal for causing the optical waveguide device to perform the modulation operation.

The optical transmission apparatus 2300 having the above-described configuration includes the optical modulation device 2200 that realizes a broadband modulation operation, compared to the related art by using the above-described optical modulation element 100 or the like. Therefore, larger transmission capacity can be realized at low cost.

The present invention is not limited to the configurations of the above-described embodiments and modification examples thereof, and can be implemented in various forms within the scope not departing from the concept of the present invention.

For example, in FIGS. 1, 3, 6, 8, 10, 14, 15, 18, 21, 24, 27, 30, 33, 34, and 35 illustrating the configurations of the optical modulation elements according to the respective embodiments, the control electrode 106 and the like corresponding thereto is illustrated as follows. Only a portion along the parallel waveguide forms a distributed constant line (for example, a coplanar transmission line (configuration such as GSG, GSSG, GSGSG, and the like), a microstrip line transmission line, or the like) composed of the center electrode and the ground electrode. However, the configuration of the control electrode 106 and the like is not limited thereto. The control electrode 106 and the like can form the distributed constant line together with the ground electrode, over the whole center electrode formed on the substrate surface of the substrate 102 or the like according to the related art.

In addition, in each of the above-described embodiments, the optical modulation element 100 and the like using the Mach-Zehnder-type optical waveguide has been described as an example of the optical waveguide element. However, the optical waveguide element according to the present invention is not limited to the optical modulation element. The optical waveguide element can be an element having any operation function by causing the traveling-wave electrode to generate the phase change in the light wave propagating inside the optical waveguide. This optical waveguide element can be an optical switching element, a polarization rotation element, and the like.

In addition, in the above-described embodiments, each of the optical waveguides 104, 1404, 1504, 1804, 1904, 2004 can be formed by metal diffusion or impurity diffusion into the substrates 102, 1402, 1502, and 2002. However, a method for forming the optical waveguide in the substrates is not limited to the metal diffusion or the impurity diffusion. For example, the optical waveguides may be a rib-type waveguide or a ridge-type waveguide composed of a protruding portion formed on the surface of the substrate.

In the above-described embodiments, the LN substrate (for example, the substrate 102) or the semiconductor substrate (substrate 2002) such as InP, GaAs, Si, or the like is used as the substrate forming the optical waveguide element. However, a material of the substrate is not limited thereto. The substrate forming the optical waveguide element according to the present invention can be formed of any material such as a ferroelectric, a semiconductor, a polymeric material, or the like as long as the material has an electro-optic effect. For example, for the substrate, as crystal having a Pockels effect, inorganic crystal such as $LiNbO_3$ (LN), Mg-added $LiNbO_3$ (Mg:LN), Er-added $LiNbO_3$ (Er:LN), $LiTaO_3$ (LT), Mg-added $LiTaO_3$ (Mg:LT), Er-added $LiTaO_3$ (Er:LT), $KTiOPO_4$ (KTP), $KH_2PO_4$ (KDP), $NH_4H_2PO_4$ (ADP), $BaTiO_3$ (BT or BTO), (Pb, La) (Zr, Ti)O3 (PLZT), and the like, or organic materials such as polymers containing polarized molecules can be used.

In addition, for the substrate, Si, SiGe, or the like can be used as a material having a carrier plasma effect, and a material containing InGaAsP/InP, InAlGaAs/InGaAs, or the like can be used as a material having a quantum confined Stark effect. The material of the substrate is not limited to the listed materials as long as the material can have the above-described effects. The material may be those in which some or all of configuration elements are replaced with elements of the same group shown in a periodic table, those in which elements of a group IV are replaced with elements of group III-V, or those doped with other elements as trace additives.

Furthermore, in the embodiments described above, each of the optical waveguides 104, 1404, 1504, 1804, 1904, and 2004 is formed inside the substrates 102, 1402, 1502, and 2002, as a portion of the substrate. However, the present invention is not limited to a configuration in which the optical waveguides are formed inside the substrates as a portion of the substrates. For example, the optical waveguides may be formed of a polymeric material having an electro-optic effect, which is provided on a surface of the substrate that does not have the electro-optic effect. The optical modulation element composed of the optical waveguide can be a so-called Silicon-Organic Hybrid Modulator (for example, refer to Stefan Wolf et. al., "DAC-Less Amplifier-Less Generation and Transmission of QAM Signals Using Sub-Volt Silicon-Organic Hybrid Modulators" JOURNAL OF LIGHTWAVE TECHNOLOGY, VOL. 33, NO. 7, Apr. 1, 2015, Japanese Laid-Open Patent Publication No. 2016-71214).

In addition, in the above-described embodiment, as a modification example of the optical modulation element 100, the length of the first modulation section of the modulation section, a ratio m of the voltage attenuation coefficient of the control electrode between the first modulation section and the second modulation section, or a ratio g of the gap between the control electrode and the parallel waveguide in the first modulation section and the second modulation section is changed. However, the length of the first modulation section, the ratio m of the voltage attenuation coefficient, or the ratio g of the gap can be similarly changed in the optical modulation elements 1400, 1500, 1800, 1900, and 2000 to adjust peaking in the frequency response.

In addition, the characteristic configurations of the optical modulation element 100 and the like according to the above-described embodiments and modification examples can be diverted to each other. For example, a configuration of the control electrode 2006 having a T-shaped projection in the optical modulation element 2000 composed of the semiconductor substrate 2002 is also applicable to the optical modulation elements 100 or 1500 composed of the LN substrate 102 or 1502.

As described above, the optical modulation element 100, for example, which is the optical waveguide element, includes the substrate 102 serving as the LN substrate having the electro-optic effect, the optical waveguide 104 provided on the substrate 102 and for example, serving as the Mach-Zehnder-type optical waveguide. The optical waveguide 104 may be disposed inside the substrate 102 or may be disposed on the substrate surface of the substrate 102. In addition, the substrate 102 includes the control electrode 106 serving as the electrode provided along the parallel waveguides 104a and 104b forming the optical waveguide 104 and working on the parallel waveguides to generate the phase change in the light waves propagating through the parallel waveguides. Here, the control electrode 106 is the traveling-wave electrode in which the electrical signal is the traveling wave and propagates in one direction. The control electrode 106 and the parallel waveguides 104a and 104b are configured so that the phase change generated in the first modulation section 108c located within a predetermined distance range from the downstream side end portion 108e along the propagation direction of the traveling wave in the modulation section 108 where the light wave is controlled by the control electrode 106 has the sign opposite to the sign of the phase change generated in the second modulation section 108a located within a predetermined distance range from the input end 108d of the electrical signal on the upstream side along the propagation direction.

According to this configuration, in the optical waveguide element using the optical waveguide formed on the substrate, the frequency characteristics can be easily improved at low cost even in the substrate having various crystal orientations.

In addition, in the control electrode 106, the length of a portion working on the parallel waveguides 104a and 104b in the first modulation section 108c is shorter than the length of a portion working on the parallel waveguides 104a and 104b in the second modulation section 108a. According to this configuration, the operation frequency band can be widened while the modulation operation is ensured.

In addition, for example, the first modulation section 108c is configured so that the electric field applied to the parallel waveguides 104a and 104b is inverted to that of the second modulation section 108a. That is, for example, in the optical modulation element 100, the control electrodes 106 and 1506 and the optical waveguides 104 and 1504 are configured so that the electric field applied to the parallel waveguides 104a and 104b is inverted without changing the polarization direction of the substrate 102 or the like. In this manner, the operation frequency band can be easily widened.

In addition, in the optical modulation element 100-2 described above, the control electrode 106-2 is configured so that the voltage attenuation coefficient α2 of the electrical signal in the first modulation section 108-2c is different from the voltage attenuation coefficient α1 in the second modulation section 108-2a. According to this configuration, intensity of peaking in the frequency response characteristics can be adjusted by adjusting the ratio of α1 and α2.

In addition, for example, the optical waveguide 104 of the optical modulation element 100 is the Mach-Zehnder-type optical waveguide including the two parallel waveguides 104a and 104b forming a pair, and the modulation section 108 is composed of the two parallel waveguides 104a and 104b forming the pair. According to this configuration, the operation frequency band of the optical waveguide element, for example, the optical modulation element composed of the Mach-Zehnder-type optical waveguide can be easily improved at low cost regardless of the crystal orientation of the substrate.

In addition, the modulation section 108 has the U-turn waveguide 108b which is the first U-turn waveguide in which the light propagation direction is inverted, and the first modulation section 108c is configured as a region between the U-turn waveguide 108b and the end portion 108e. According to this configuration, the extending direction in a plane of the substrate 102 of the modulation section 108 composed of the control electrode 106 and the parallel waveguides 104a and 104b is folded back by the U-turn waveguide 108b. In this manner, the direction of the electric field applied to the parallel waveguides 104a and 104b from the control electrode 106 along a plane direction of the substrate 102 can be easily inverted.

In addition, in the above-described optical modulation element 1400, the second modulation section 1408a of the modulation section 1408 has the U-turn waveguide 1408f which is the second U-turn waveguide in which the light propagation direction is inverted, and the parallel waveguides 1404a and 1404b intersect with each other in the U-turn waveguide 1408f. According to this configuration, even when the second modulation section 1408a is folded back, it is possible to easily maintain the direction of the electric field applied to the parallel waveguides 1404a and 1404b in the second modulation section 1408a, therefore, so that the sign of the phase change generated in the parallel waveguides 1404a and 1404b is not opposite. Therefore, while the operation frequency band can be widened according to a principle the same as that of the optical modulation element 100, a size of the optical modulation element 1400 in a length direction can be reduced by folding the second modulation section 1408a.

In addition, in each of the optical modulation elements 1500 and 2000, the parallel waveguides 1504a, 1504b, 2004a, and 2004b forming the pair have the intersection portion where both intersect with each other. Each of the first modulation sections 1508c and 2008c is configured as the region between the intersection portion and the end portions 1508e and 2008e. According to this configuration, the control electrodes 1506 and 2006 can be formed in a simple straight line shape. Therefore, the operation frequency band can be widened while a radiation loss of the electrical signal in the control electrodes 1506 and 2006 can be reduced. In this manner, an efficient broad band modulation operation can be realized.

In addition, for example, in the optical modulation element 1800, the control electrode 1806 is composed of the center electrodes 1506a-1 and 1506a-2, and the ground electrodes 1506b, 1506c, and 1506d formed along the center electrodes at a predetermined distance. In the modulation section 1808 composed of the parallel waveguides 1804a and 1804b forming the pair, the center electrodes 1506a-1 and 1506a-2 are formed in the upper portion of the parallel waveguides 1804a and 1804b forming the second modulation section 1808a. Each of the ground electrodes 1506b and 1506d is formed in the upper portion of the parallel waveguides 1804a and 1804b forming the first modulation section 1808c. According to this configuration, for example, when the substrate 1502 which is the Z-cut LN substrate is used, the electric field applied to the parallel waveguides 1804a and 1804b in the thickness direction of the substrate 1502 is easily inverted in the second modulation section 1808a and the first modulation section 1808c. In this manner, the phase change generated in the parallel waveguides 1804a and 1804b can be opposite between the second modulation section 1808a and the first modulation section 1808c.

In addition, for example, the substrate 102 of the optical modulation element 100 is formed of lithium niobate (LN) crystal, and the control electrode 106 causes the optical waveguide 104 to perform the optical modulation operation. According to this configuration, in the optical modulation element composed of the substrate using the LN crystal, the frequency characteristics can be easily improved at low cost without being restricted by the crystal orientation of the substrate.

In addition, the substrate 102 may be formed of a ferroelectric, semiconductor, or polymeric material. The optical waveguide 104 is configured as a portion of the substrate 102, or may be formed of a polymeric material disposed on the surface of the substrate 102. The control electrode 106 causes the optical waveguide 104 to perform the optical modulation operation. According to this configuration, the optical modulation element 100 can be formed of various materials.

In addition, the optical modulation device 2200 which is the optical waveguide device has any one of the optical modulation element 100 and the like which are the optical waveguide elements, and the housing that houses the optical modulation element. According to this configuration, there is provided the optical waveguide device that can realize the broadband modulation operation compared to the related art by using the optical waveguide element which can easily improve frequency characteristics at low cost even in the substrate having various crystal orientations.

In addition, the optical transmission apparatus 2300 includes the optical modulation device 2200 which is the optical waveguide device. According to this configuration, the optical transmission apparatus having larger transmission capacity can be realized at low cost.

REFERENCE SIGNS LIST 100, 100-1, 100-2, 100-3, 200, 1400, 1500, 1800, 1900, 2000, 2202, 2400, 2400-1, 2600, 2700, 2800: Optical modulation element
102, 1402, 1502, 2002, 2402, 2602, 2702, 2802: Substrate
104, 1404, 1504, 1804, 1904, 2004, 2404, 2604, 2704, 2804: Optical waveguide 104a, 104b, 1404a, 1404b, 1504a, 1504b, 1804a, 1804b, 1904a, 1904b, 2004a, 2004b, 2404a, 2404b, 2604a, 2604b, 2704a, 2704b, 2804a, 2804b: Parallel waveguide
106, 106-1, 106-2, 106-3, 1406, 1506, 1906, 2006, 2406, 2506, 2606, 2706, 2806: Control electrode
106a, 106-1a, 106-2a, 106-3a, 1406a, 1506a-1, 1506a-2, 1906a-1, 1906a-2, 2406a-1, 2406a-2, 2506a, 2606a-1, 2606a-2, 2706a-1, 2706a-2, 2806a: Center electrode
106b, 106c, 106-1b, 106-1c, 106-3b, 106-3c, 1406b, 1406c, 1506b, 1506c, 1506d, 1906b, 1906c, 1906d, 2406b, 2406c, 2406d, 2506b, 2506c, 2606b, 2606c, 2606d, 2706b, 2706c, 2706d, 2806b, 2806c: Ground electrode
108, 108-1, 108-2, 108-3, 1408, 1508, 1808, 1908, 2008, 2408, 2608, 2708, 2808: Modulation section
108a, 108-1a, 108-2a, 108-3a, 1408a, 1508a, 1808a, 1908a, 2008a, 2408a, 2608a, 2708a, 2808a: Second modulation section
108b, 108-1b, 108-2b, 108-3b, 1408b, 1408f: U-turn waveguide
108c, 108-1c, 108-2c, 108-3c, 1408c, 1508c, 1808c, 1908c, 2008c, 2408c, 2608c, 2708c, 2808c: First modulation section
108d, 108-1d, 108-2d, 108-3d, 1408d, 1508d, 1808d, 1908d, 2008d, 2408d, 2608d, 2708d, 2808d: Input end
108e, 108-1e, 108-2e, 108-3e, 1408e, 1508e, 1808e, 1908e, 2008e, 2408e, 2608e, 2708e, 2808e: End portion
110, 210, 1410, 1510a, 1510b, 2010, 2410a, 2410b, 2610a, 2610b, 2710a, 2710b, 2810: Signal source
112, 212, 1412, 1512a, 1512b, 2012, 2214, 2412a, 2412b, 2612a, 2612b, 2712a, 2712b, 2812: Terminator
1508b, 2008b: Intersection portion
2006a: First electrode
2006b: Second electrode
2006a-1: First main conductor portion
2006a-2: First protruding conductor portion
2006b-1: Second main conductor portion
2006b-2: Second protruding conductor portion
2120: n-layer
2124: i-layer
2126: Trench
2128a, 2128b: p-type channel
2130: Clad portion
2200: Optical modulation device
2204: Housing
2206: Input optical fiber
2208: Output optical fiber
2210: Connector
2212: Relay substrate
2300: Optical transmission apparatus
2302: Light source
2304: Modulation signal generation unit
2306: Modulation data generation unit
2408b: Intersection portion
2708b: Transition portion
2820a, 2820b: Polarization inverting portion

The invention claimed is:

1. An optical waveguide element comprising:
a substrate;
an optical waveguide disposed inside the substrate or on the substrate; and
an electrode provided along the optical waveguide and working on the optical waveguide to generate a phase change in a light wave propagating through the optical waveguide,
wherein the electrode is a traveling-wave electrode, and
in a modulation section where the light wave is controlled by the electrode, the electrode and the optical waveguide are configured so that the phase change generated in a first modulation section located within a predetermined distance range from a downstream side end portion along a propagation direction of a traveling wave of an electrical signal propagating through the electrode has a sign opposite to a sign of the phase change generated in a second modulation section located within a predetermined distance range from an input end of the electrical signal on an upstream side along the propagation direction.

2. The optical waveguide element according to claim 1, wherein a length of a part of the electrode that work on the optical waveguide in the first modulation section is shorter than a length of a part of the electrode that work on the optical waveguide in the second modulation section.

3. The optical waveguide element according to claim 1, wherein the first modulation section is configured so that an electric field applied to the optical waveguide is inverted to the second modulation section.

4. The optical waveguide element according to claim 1, wherein the electrode is configured so that a voltage attenuation coefficient of the electrical signal in the first modulation section is different from a voltage attenuation coefficient in the second modulation section.

5. The optical waveguide element according to claim 1, wherein the optical waveguide is a Mach-Zehnder-type optical waveguide including two parallel waveguides forming a pair, and
the modulation section is composed of two parallel waveguides forming a pair.

6. The optical waveguide element according to claim 5, wherein the modulation section has a first U-turn waveguide in which a light propagation direction is inverted, and
the first modulation section is configured as a region between the first U-turn waveguide and the downstream side end portion.

7. The optical waveguide element according to claim 6, wherein the second modulation section has a second U-turn waveguide in which a light propagation direction is inverted, and
the parallel waveguides forming the pair intersect with each other in the second U-turn waveguide.

8. The optical waveguide element according to claim 5, wherein the parallel waveguides forming the pair have an intersection portion where both intersect with each other, and
the first modulation section is configured as a region between the intersection portion and the downstream side end portion.

9. The optical waveguide element according to claim 5, wherein the electrode is composed of a center electrode and a ground electrode formed along the center electrode at a predetermined distance, and
in the modulation section composed of the parallel waveguides formed on the substrate, the center electrode is formed in an upper portion of the parallel waveguide forming the second modulation section, and the ground electrode is formed in an upper portion of the parallel waveguide forming the first modulation section.

10. The optical waveguide element according to claim 1, wherein the substrate is formed of a ferroelectric substance, a semiconductor, or a polymeric material, the optical waveguide is configured as a part of the substrate or formed of a polymeric material disposed on the substrate, and the electrode causes the optical waveguide to perform an optical modulation operation.

11. An optical waveguide device comprising:

the optical waveguide element according to claim 1; and a housing that houses the optical waveguide element.

12. An optical transmission apparatus comprising:

the optical waveguide device according to claim 11; and an electronic circuit that outputs an electrical signal for causing the optical waveguide device to perform a modulation operation.

* * * * *